(12) United States Patent
Traub et al.

(10) Patent No.: US 8,935,249 B2
(45) Date of Patent: **\*Jan. 13, 2015**

(54) VISUALIZATION OF CONCEPTS WITHIN A COLLECTION OF INFORMATION

(75) Inventors: Omri Traub, Brookline, MA (US); Ray Kuo, Burnaby (CA); Vladimir Gluzman Peregrine, Chesnut Hill, MA (US); Vladimir V. Zelevinsky, Sharon, MA (US)

(73) Assignee: Oracle OTC Subsidiary LLC, Redwood Shores, CA (US)

( \* ) Notice: Subject to any disclaimer, the term of this patent is extended or adjusted under 35 U.S.C. 154(b) by 153 days.

This patent is subject to a terminal disclaimer.

(21) Appl. No.: 13/545,496

(22) Filed: Jul. 10, 2012

(65) Prior Publication Data

US 2012/0278321 A1 Nov. 1, 2012

Related U.S. Application Data

(63) Continuation-in-part of application No. 13/290,613, filed on Nov. 7, 2011, now Pat. No. 8,527,515, which is a continuation of application No. 13/189,745, filed on Jul. 25, 2011, now Pat. No. 8,560,529, which is a (Continued)

(51) Int. Cl.
*G06F 17/30* (2006.01)

(52) U.S. Cl.
CPC ............................... *G06F 17/30657* (2013.01)
USPC .................. 707/737; 707/777; 707/E17.046; 715/821

(58) Field of Classification Search
CPC ................................................ G06F 17/30657
USPC ................... 707/702, 849, 777; 715/849, 821
See application file for complete search history.

(56) References Cited

U.S. PATENT DOCUMENTS 6,122,628 A 9/2000 Castelli et al.
6,128,613 A 10/2000 Wong et al.

(Continued)

FOREIGN PATENT DOCUMENTS

WO 0042533 7/2000
WO 03098477 A1 11/2003

(Continued)

OTHER PUBLICATIONS

G. Kumaran et al., "A Case for Shorter Queries, and Helping Users Create Them", Center for Intelligent Information Retrieval, Department of Computer Science, University of Massachusetts, Amherst, MA, 2006.

(Continued)

*Primary Examiner* — Albert Phillips, III
(74) *Attorney, Agent, or Firm* — Miles & Stockbridge P.C.

(57) ABSTRACT

A system for visualizing concepts within a collection of information analyzes a set of materials from at least one collection of information and defines an attribute space associated with the set of materials. The system then determines automatically similarity of members of the attribute space. The system then generates a graphical model of the members of the attribute space, where the generating includes generating a display of the members of the attribute space, each of the members having a respective display distance from other respective members of the attribute space reflective of the determined similarity.

18 Claims, 43 Drawing Sheets

Related U.S. Application Data continuation of application No. 12/146,185, filed on Jun. 25, 2008, now Pat. No. 8,024,327.

(60) Provisional application No. 60/946,310, filed on Jun. 26, 2007.

(56) References Cited

U.S. PATENT DOCUMENTS

| | | | |
|---|---|---|---|
| 6,233,575 | B1 | 5/2001 | Agrawal et al. |
| 6,282,532 | B1 | 8/2001 | Sandell |
| 6,507,840 | B1 | 1/2003 | Ionnidis et al. |
| 6,567,936 | B1 | 5/2003 | Yang et al. |
| 6,642,940 | B1 | 11/2003 | Dakss et al. |
| 6,651,057 | B1 | 11/2003 | Jin et al. |
| 6,704,725 | B1 | 3/2004 | Lee |
| 6,862,559 | B1 | 3/2005 | Hogg |
| 6,910,037 | B2 | 6/2005 | Gutta et al. |
| 7,269,545 | B2 | 9/2007 | Agichtein et al. |
| 7,392,250 | B1 | 6/2008 | Dash et al. |
| 7,530,020 | B2 | 5/2009 | Szabo |
| 7,536,384 | B2 | 5/2009 | Venkataraman et al. |
| 7,574,659 | B2 | 8/2009 | Szabo |
| 7,599,945 | B2 | 10/2009 | Ames et al. |
| 7,752,184 | B2 * | 7/2010 | Kagawa .................. 707/702 |
| 8,051,073 | B2 | 11/2011 | Tunkelang et al. |
| 8,051,084 | B2 | 11/2011 | Tunkelang et al. |
| 2002/0091671 | A1 | 7/2002 | Prokoph |
| 2002/0169595 | A1 | 11/2002 | Agichtein et al. |
| 2003/0068097 | A1 | 4/2003 | Wilson et al. |
| 2003/0078686 | A1 | 4/2003 | Ma et al. |
| 2003/0093411 | A1 | 5/2003 | Minor |
| 2003/0149727 | A1 | 8/2003 | Jaschek et al. |
| 2004/0006736 | A1 | 1/2004 | Kawatani |
| 2004/0059736 | A1 | 3/2004 | Willse et al. |
| 2004/0220907 | A1 | 11/2004 | Camarillo |
| 2005/0022106 | A1 | 1/2005 | Kawai et al. |
| 2005/0044487 | A1 | 2/2005 | Bellegarda et al. |
| 2005/0055341 | A1 | 3/2005 | Haahr et al. |
| 2005/0086252 | A1 | 4/2005 | Jones et al. |
| 2005/0124010 | A1 | 6/2005 | Short |
| 2005/0209987 | A1 | 9/2005 | Beres et al. |
| 2005/0246328 | A1 | 11/2005 | Zhang et al. |
| 2006/0020594 | A1 | 1/2006 | Garg et al. |
| 2006/0026152 | A1 | 2/2006 | Zeng et al. |
| 2006/0059138 | A1 | 3/2006 | Milic-Frayling et al. |
| 2006/0080314 | A1 | 4/2006 | Hubert et al. |
| 2006/0085399 | A1 | 4/2006 | Carmel et al. |
| 2006/0167930 | A1 | 7/2006 | Witwer et al. |
| 2006/0200461 | A1 | 9/2006 | Lucas et al. |
| 2006/0230035 | A1 | 10/2006 | Bailey et al. |
| 2006/0242139 | A1 | 10/2006 | Butterfield et al. |
| 2006/0248073 | A1 | 11/2006 | Jones et al. |
| 2006/0248074 | A1 | 11/2006 | Carmel et al. |
| 2006/0259163 | A1 | 11/2006 | Hsiung |
| 2006/0259481 | A1 | 11/2006 | Handley |
| 2007/0016574 | A1 | 1/2007 | Carmel et al. |
| 2007/0053513 | A1 | 3/2007 | Hoffberg |
| 2007/0106658 | A1 | 5/2007 | Ferrari et al. |
| 2007/0208730 | A1 | 9/2007 | Agichtein et al. |
| 2007/0214131 | A1 | 9/2007 | Cucerzan et al. |
| 2007/0294225 | A1 | 12/2007 | Radlinski et al. |
| 2008/0133479 | A1 | 6/2008 | Zelevinsky et al. |
| 2008/0154878 | A1 | 6/2008 | Rose et al. |
| 2009/0006384 | A1 | 1/2009 | Tunkelang et al. |
| 2011/0029530 | A1 | 2/2011 | Knight et al. |

FOREIGN PATENT DOCUMENTS

| | | |
|---|---|---|
| WO | 2004029826 A1 | 4/2004 |
| WO | 2006036127 A1 | 4/2006 |

OTHER PUBLICATIONS

W. Croft et al., "Relevance Feedback and Personalization: A Language Modeling Perspective", Computer Science Department, University of Massachusetts, Amherst, MA, 2001.

D. Carmel et al., What Makes a Query Difficult?, IBM Haifa Research Labs, University Campus, Haifa 31905 Israel, SIGIR'06, Aug. 6-11, 2006, Seattle, Washington, pp. 390-397.

E. Agichtein et al., "Predicting Accuracy of Extracting Information From Unstructured Text Collections", Microsoft Research, Text Mining Search and Navigation Group, 2005.

E. Agichtein et al., "Predicting Extraction Performance Using Context language Models", Microsoft Research, Redmon, WA, SIGIR'05, Workshop on Methodologies and Evaluation of Lexical Cohersin Techinques in Real-World Applications: Beyond Bag of Words (ELECTRA), Aug. 19, 2005, Salvador, Brazil.

E. Agichtein et al., "Predicting Accuracy of Extracting Information from Unstructured Text Collections", Microsoft Research, One Microsoft Way, Redmond, WA, CIKM'05, Oct. 31-Nov. 5, 2005, Bremen, Germany, pp. 413-420.

S. Robertson et al., "On Relevance Weights with Little Relevance Information", SIGIR'97: Proceedings of the 20th Annual International ACM SIGIR Conference on Research and Development in Information Retrieval, Jul. 27-31, 1997, Philadelphia, PA, http://dblp.uni-trier.de.

J. He et al., "Using Coherence-Based Measures to Predict Query Difficulty", ISLA, University of Amsterdam, 2008.

S. Cronen-Townsend et al., "Quantifying Query Ambiguity", Center for Intelligent Information Retrieval, Department of Computer Science, University of Massachusetts, Amherst, MA, HLT'02, 2002.

A. Turpin et al., "Do Clarity Scores for Queries Correlate with User Performance?", Australian Computer Society, Inc. Fifteenth Australian Database Conference, Dunedin, New Zealand, vol. 27, 2004.

R. Radhakrishan et al., "Generation of Sports Highlights Using a Combination of Supervised & Unsupervised Learning in Audio Domain", Mitsubishi Electric Research Labs, Cambridge, MA, 2003, pp. 1-5.

E. Yom-Tov et al., "Experiments with Predication of Query Difficulty", IBM RAifa Research Labs, University Campus, Haifa, Israel.

V. Vinay et al., "On Ranking the Effectiveness of Searches", SIGIR'06, Aug. 6-11, 2006, Seattle, Washington.

H. Nottelmann et al., "Evaluating Different Methods of Estimating Retrieval Quality for Resource Selection", Institute of Informatics and Interactive Systems, University of Duisburg-Essen, Germany, SIGIR'03, Jul. 28-Aug. 1, 2003, Toronto, Canada, pp. 290-297.

S. Cronen-Townsend et al., "Predicting Query Performance", Center for Intelligent Information Retrieval, Department of Computer Science, University of Massachusetts, Amherst, MA, SIGIR'02, Aug. 11-15, 2002, Tampere, Finland, pp. 299-306.

E. Gabrilovich et al., "Nesjunkie: Providing Personalized Newsfeeds Via Analusis of Information Novelty", Microsoft Research, WWW2004, May 17-24, 2004, New York, New York, pp. 482-490.

B. He et al., "A Query-Based Pre-Retrieval Model Selection Approach to Information Retrieval", Department of Computing Science, 2004, University of Glasgow, Glasgow, United Kingdom.

S. Cronen-Townsen et al., "Precision Prediction Based on Ranked List Coherence", University of Massachusetts, Amherst, MA Jul. 5, 2005, pp. 1-41.

C. MacDonald et al., "Predicting Query Performance in Intranet Search", University of Glasgow, Glasgow, United Kingdom, ACM SIGIR'05, Query Prediction Workshop, Aug. 19, 2005, Salvador, Brazil.

G. Amati et al., "AQuery Difficulty, Robustness and Selective Application of Query Expansion", Fondazione Ugo Bordoni, Rome, Italy, 2004.

B. He et al., "Query Performance Prediction", Department of computing Science, University of Glasgow, Glasgow, United Kingdom, May 30, 2005.

Y. Zhou et al., Ranking Robustness: Novel Framework to Predict Query Performance, Department of Computer Science, University of Massachusetts, Amherst, CIKM'06, Nov. 5-11, 2006, Arlington, Virginia.

(56) References Cited

OTHER PUBLICATIONS

N. Belkin et al., "Rutgers Information Interaction Lab at TREC 2005: Trying Hard", the State University of New Jersey Rutgers.

D. Harman et al., "The NRRC Reliable Information Access (RIA) Workshop", SIGIR'04, Jul. 25-29, 2004, sheffield, South Yorkshire, United Kingdom, pp. 528-529.

J. Allan et al., "Using Part-of-speech Patterns to Reduce Query Ambiguity", Center for Intelligent Information Retrieval, Department of Computer Science, University of Massachusetts, Amherst, MA, SIGIR'02, Aug. 11-15, 2002, Tampere, Finland.

F. Diaz et al., "Using Temporal Profiles of Queries for Precision Predication", SIGIR'04, Jul. 25-29, 2004, Sheffield, South Yorkshire, United Kingdom.

R. Forsyth, "Deriving Document Descriptors from Data", 1997, pp. 1-28.

P. Genua, "A Cache Primer", Freescale Semiconductor, Inc., Oct. 2004, pp. 1-16.

S. Robertson et al., "On Relevance Wights with Little Relevance Information", SIGIR'1997, pp. 16-24.

S. Cronen-Townsend et al., "A Language Modeling Framework for Selective Query Expansion", Center for Intelligent Information Retrieval Department of Computer Science University of Massachusetts, Amherst, MA, 2002, pp. 1-9.

* cited by examiner

Search: *iraq*

1990 1991 2002 2003 2004 Administration

Armament, Defense and Military Forces

Atlanta, Ga Atomic Weapons Biological and Chemical Warfare Bush, George W Crime and Criminals Economics Editorial Desk Elections Finances Foreign Desk Hussein, Saddam Industry Profiles International International Relations Iraq Kuwait MIDDLE EAST National Desk officials Presidential Elections (US)

Summary Terrorism The New York Times UNION OF SOVIET SOCIALIST REPUBLICS United Nations

United States Armament and Defense war weapons

FIG. 18B

Your search: *storage*

Possible high-salience refinements:

Toys: chests & storage     salience score: 7.186

Category: computers        salience score: 23.141
                           salience score: 18.836

*FIG. 19*

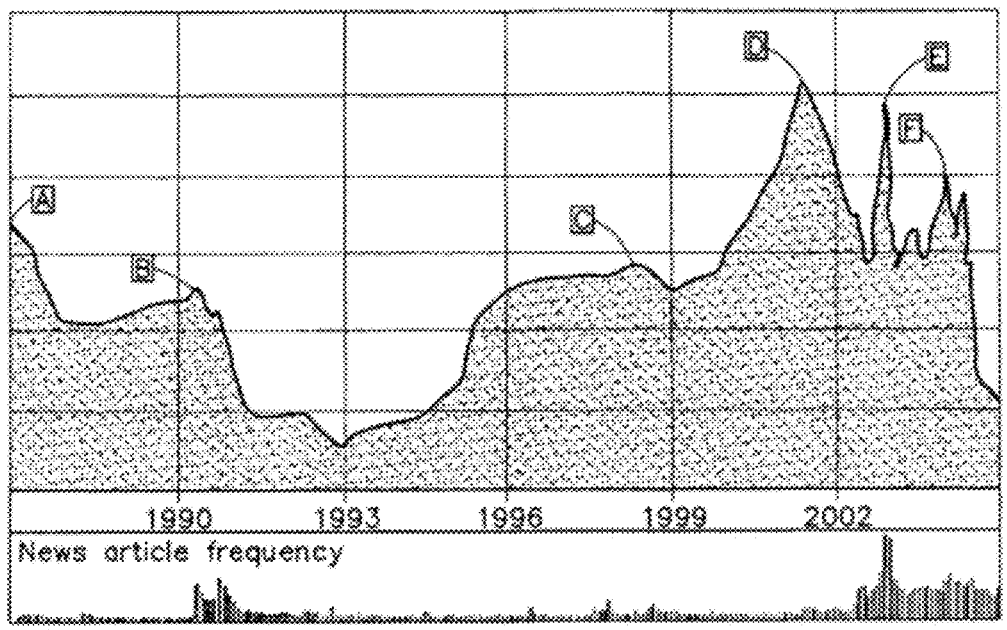

A  May 9, 1987
   Soviet Ship Attacked by Iran in Gulf
   Persian Gulf; Iran; tanker ship B  August 26, 1990
   Iraq and Kuwait
   Iraq; Saudi Arabia; Kuwait; Gulf; oil C  November 16, 1998
   Clinton Accepts Iraq's Promise to Allow Weapons Inspections
   Inspectors; Clinton, Bill; Inspections; Biological and Chemical Warfare; United Nations; Iraq D  October 7, 2001
   Military Analysis: Al Qaida in Iraq
   attack; Pentagon Building; Afghanistan; World Trade Center; Hijacking; terrorist E  April 2, 2003
   Prisoners of War
   soldiers; troops; Biological and Chemical Warfare; Iraq; Atomic weapons F  May 14, 2004
   The Struggle for Iraq: The Whistle-blower
   prisoners; soldiers; Abu Ghraib; Prisoners of War; War Crimes; Genocide and Crimes Against Humanity; Iraq Salience curve, frequency histogram, and events for search IRAQ

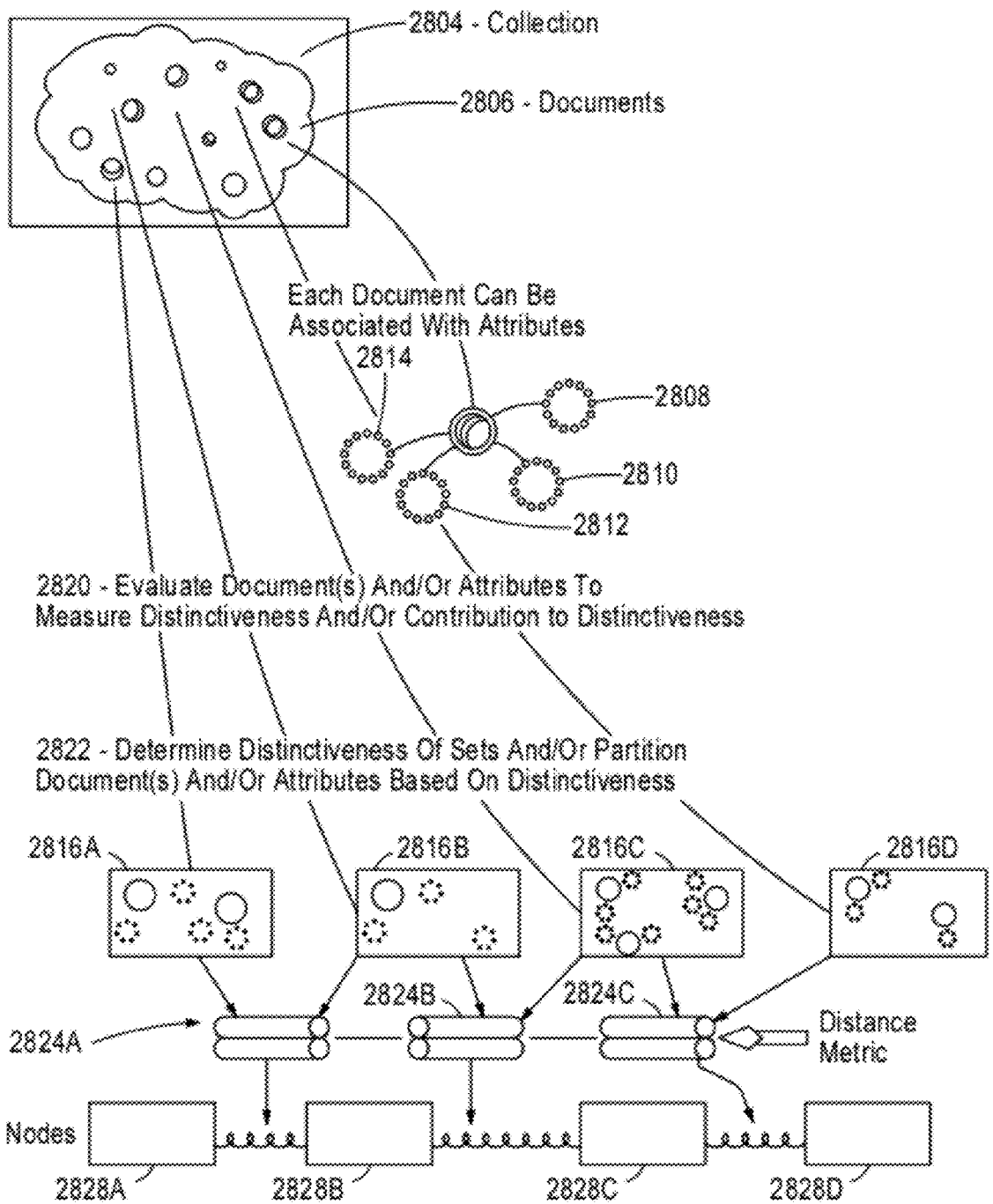

VISUALIZATION OF CONCEPTS WITHIN A COLLECTION OF INFORMATION

CROSS REFERENCE TO RELATED APPLICATIONS

This application is continuation-in-part of and claims priority under 35 U.S.C. §120 to U.S. patent application Ser. No. 13/290,613 entitled "SYSTEM AND METHOD FOR CONCEPT VISUALIZATION," filed on Nov. 7, 2011, which application is a continuation of and claims priority under 35 U.S.C. §120 to U.S. patent application Ser. No. 13/189,745 entitled "System and Method for Measuring the Quality of Document Sets," filed on Jul. 25, 2011 which application is a continuation of and claims priority under 35 U.S.C. §120 to U.S. patent application Ser. No. 12/146,185, entitled "System and Method for Measuring the Quality of Document Sets," filed on Jun. 25, 2008, issued as U.S. Pat. No. 8,024,327 on Sep. 20, 2011, which claims priority under 35 U.S.C. §119(e) to U.S. Provisional Application Ser. No. 60/946,310, entitled "System and Method for Measuring the Quality of Document Sets," filed on Jun. 26, 2007, each of which applications are herein incorporated by reference in their entirety.

FIELD

This application relates generally to information retrieval systems and, more particularly, to a system and method for visualizing concepts within an attribute space.

BACKGROUND INFORMATION

Information retrieval systems are known in the art. Such systems generally offer users a variety of means of expressing user intentions through queries. These include text search, parametric search, structured queries, selection from alternatives (i.e., browsing or navigation), and range specification. In general, the systems offer users a means of expressing queries using either a structured language (e.g., a language like SQL) or an informal input mechanism (e.g., an English keyword search). When the input mechanism is informal, the problems of ambiguity may arise from the language itself. But, even when the input mechanism is formal, the user may not always succeed in expressing his or her intention in the formal query language.

Information retrieval systems may use a variety of techniques to determine what information seems most relevant to a user's query. For some queries, the choice of technique is not particularly important: for example, if the user enters a query that is the exact title of a document, most techniques will retrieve that document as the most relevant result. For other queries, the choice of technique can be very significant, as different techniques may differ considerably in the results they return. Unfortunately, it is not always clear how to select the best technique for a particular query.

Given the challenges that information retrieval systems encounter in handling ambiguous queries, a variety of techniques have been proposed for estimating or measuring query ambiguity—that is, the likelihood that a particular query formulation or interpretation will provide meaningful results. Recognizing and measuring query ambiguity is a first step to mitigating these problems. The known techniques for estimating or measuring query ambiguity fall primarily into two general categories: query analysis and results analysis. Generally speaking, query analysis techniques focus on the query itself, and consider factors like query length, query term informativeness, and the tightness of relationships among query terms, while results analysis techniques focus on the results for the query, and consider factors like the distinctiveness or coherence of the results, and the robustness of the results in the face of perturbation of the retrieval model. One such technique is the "query clarity" approach of Cronen-Townsend and Croft, which aims to predict query performance by computing the relative entropy between a query language model and the corresponding collection language model.

SUMMARY

One embodiment is a system for visualizing concepts within a collection of information, the system analyzes a set of materials from at least one collection of information and defines an attribute space associated with the set of materials. The system then determines automatically similarity of members of the attribute space. The system then generates a graphical model of the members of the attribute space, where the generating includes generating a display of the members of the attribute space, each of the members having a respective display distance from other respective members of the attribute space reflective of the determined similarity.

BRIEF DESCRIPTION OF THE DRAWINGS

The accompanying drawings are not intended to be drawn to scale. In the drawings, each identical or nearly identical component that is shown in various figures is represented by a like numeral. For the purpose of clarity, not every component may be labeled in every drawing. In the drawings:

FIG. 18B illustrates a user interface presenting a summarized view to a user according to one embodiment of the present invention;

FIG. 19 illustrates a user interface for displaying options regarding query interpretation and guiding according to one embodiment of the present invention;

FIG. 21 illustrates a user display for rendering events detected within a collection of information according to one embodiment of the present invention;

FIG. 22 illustrates a user display for displaying rules and associated triggers according to one embodiment of the present invention;

FIG. 28A illustrates an example of a conceptual model of process flow and data interactions according to one embodiment of the present invention;

DETAILED DESCRIPTION

Figure 23:
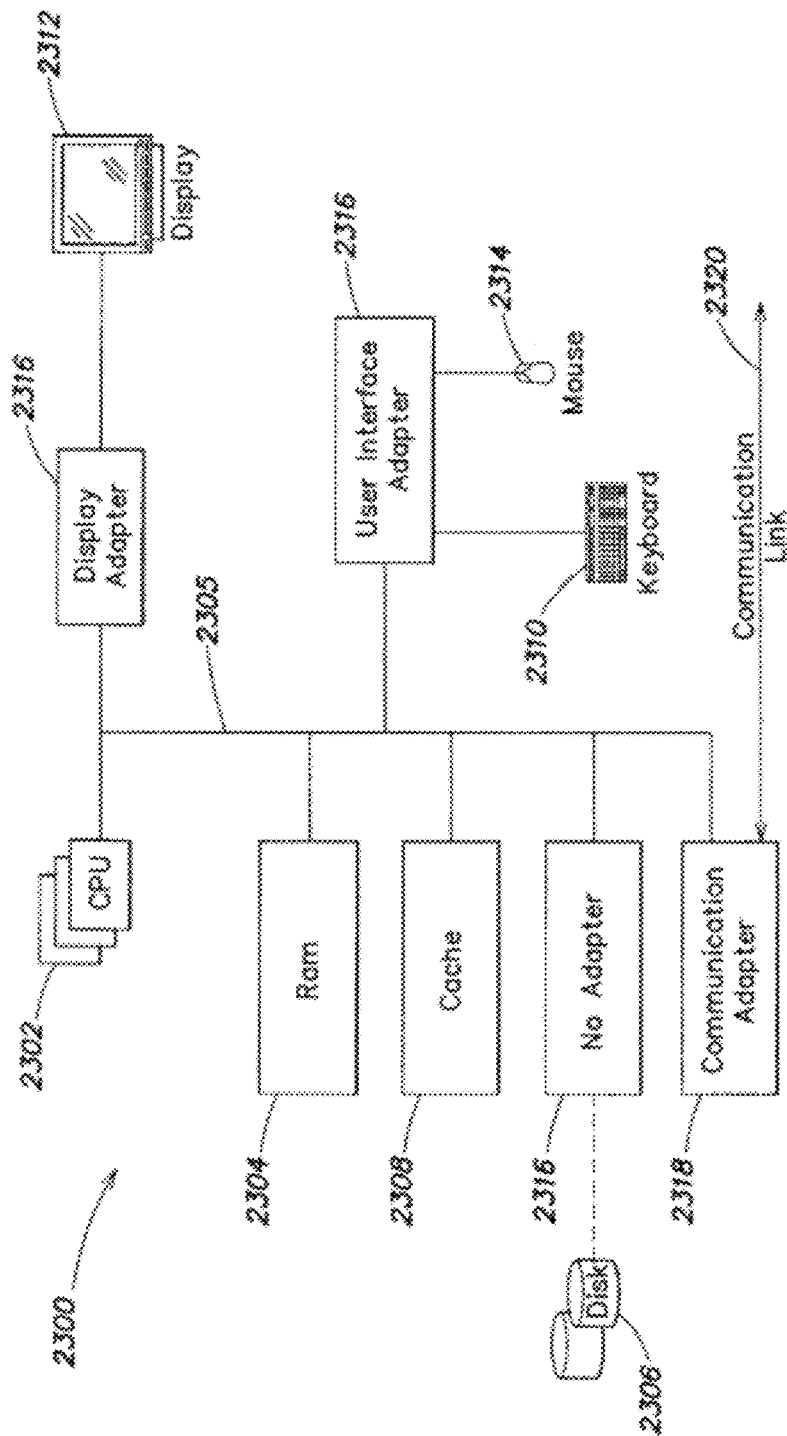
FIG. 23 is a block diagram of a representative information retrieval system in which the subject matter herein may be implemented, comprising a data processing system.

FIG. 23 is a simplified block diagram of a representative information retrieval system on which various aspects of the invention may be implemented. As seen in FIG. 23, a data processing system 2300 suitable for storing and/or executing program code will include at least one processor 2302 coupled directly or indirectly to memory elements through a system bus 2305. The memory elements can include local memory 2304 employed during actual execution of the program code, bulk storage 2306, and cache memories 2308 that provide temporary storage of at least some program code to reduce the number of times code must be retrieved from bulk storage during execution. Input/output or I/O devices (including but not limited to keyboards 2310, displays 2312, pointing devices 2314, etc.) can be coupled to the system either directly or through intervening I/O controllers 2316. Network adapters 2318 may also be coupled to the system to enable the data processing system to become coupled to other data processing systems or devices through intervening private or public networks 2320.

Figure 24:
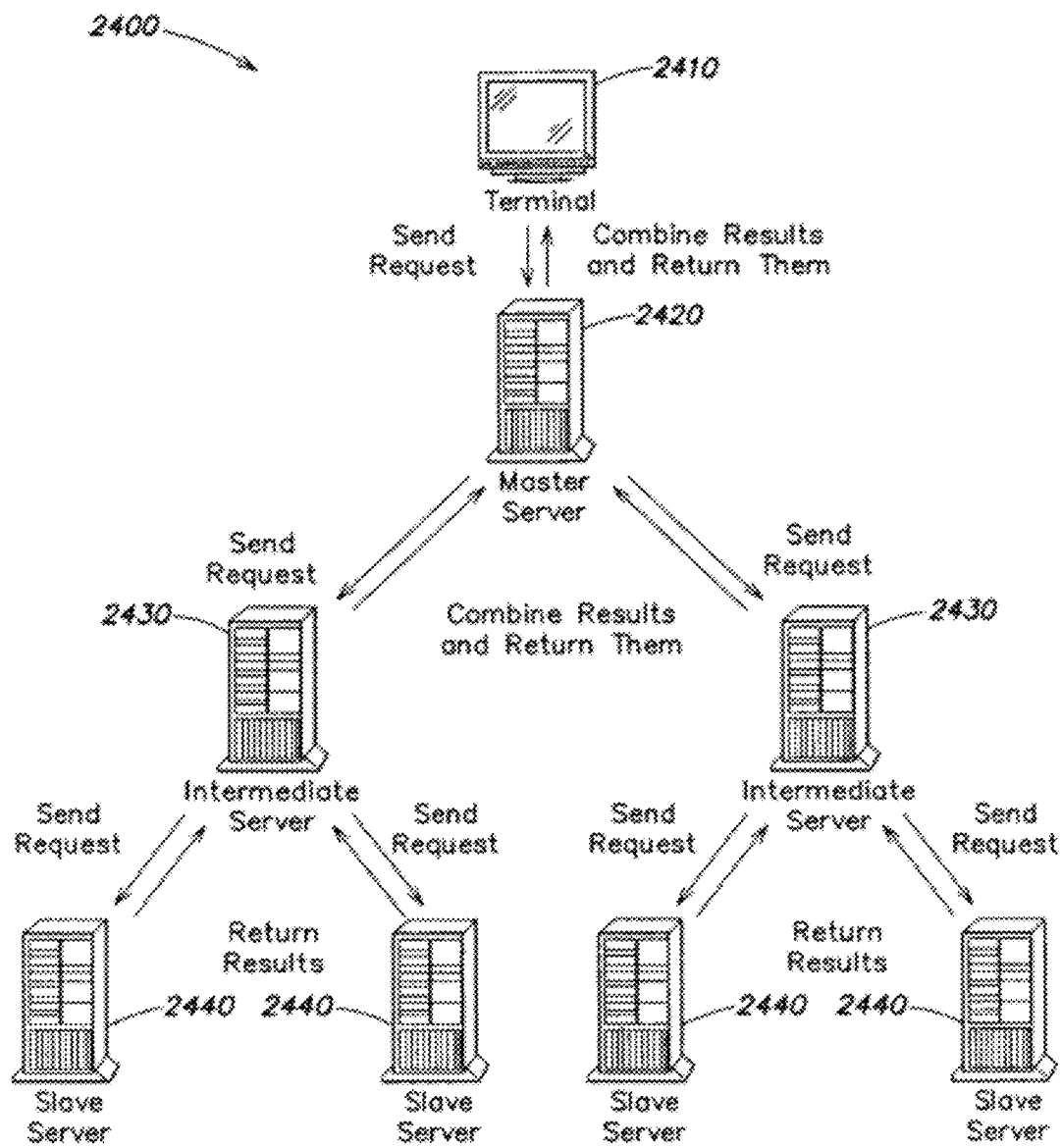
FIG. 24 is a graphical representation of a multi-computer distributed information retrieval system, in which other embodiments of the subject matter herein may be implemented.

In some embodiments, the techniques described herein may task the limitations of a single computational server's resources, and thus it is contemplated that one or more process steps or functions may be distributed onto a set or hierarchy of multiple computational servers. Of course, any other hardware, software, systems, devices and the like may be used. More generally, the subject matter described herein may be implemented with any collection of one or more autonomous computers (together with their associated software, systems, protocols and techniques) linked by a network or networks. A representative implementation is illustrated in FIG. 24. Referring to FIG. 24, system 2400 contains a terminal 2410, that may be used to send a request to a master server 2420, which in turn may send a request to intermediate servers 2430, which are operatively connected to slave servers 2440, for sending requests. The slave servers 2440 return results to the intermediate servers 2430 which return results to the master server 2420. FIG. 24 illustrates one example architecture, one should appreciate that additional layers and/or servers may be employed for distributing workload, computational effort, and storage.

In one particular embodiment, the various aspects of the invention are implemented in a computer-aided search system used for interactive document retrieval and/or summarization.

As is well-known, information retrieval (IR) systems aim to solve the problems associated with searching for information in a collection of documents. Generally, they comprise technologies for searching for documents, as well as searching for metadata that describes documents. It is convenient to think of these documents in the usual sense, i.e., as discrete text files that may also be associated with metadata, such as a name, author, and date of creation. However, documents may also represent other addressable and selectable media, including non-textual data, such as sound and visual recordings, database records, and composite entities such as might be described using HTML and XML encoding. Similarly, although the term "document set" may describe the entire collection of documents available to the information retrieval system, it may be applied equally well to a subset of the whole; for example, all documents permitted to be accessed within a currently active security, privacy or confidentiality regime, or a collection of documents previously selected by the user to be manipulated by the information retrieval system. Thus, both individual documents and collections of documents may take many forms, including file systems, relational databases, hypertext collections (such as the World Wide Web), or the like.

A goal of IR systems is to reduce information overload. IR systems generally serve as an interface between human end users and automatically indexed collections, although it is equally valid to consider such IR systems being controlled by an automated process performing a sequence of actions. Thus, a query may represent a user's interaction with the IR system, or an equivalent operation as performed by an automated process in a so-called "offline" or non-user-interactive mode. The primary effectiveness measure of an IR system is the extent to which it enables users to find relevant or useful information in the collection it has indexed. Many information retrieval (IR) researchers have observed that IR systems perform better on some queries than others. In particular, IR systems struggle with ambiguous queries, because retrieval models generally cannot simultaneously optimize for two or more query interpretations. By identifying and measuring the degree of query ambiguity, a system can inform the overall approach to query processing, thus delivering a more effective user experience.

In one aspect, as described herein the distinctiveness of a set of documents that match a query (i.e., the query results) is used as a measure of query ambiguity. The distinctiveness can be relative to the overall document collection or some other baseline, such as the results of previous query in a context of iterative query reformulation. Compared to measuring ambiguity based on analysis of the query, the techniques described herein have an advantage of being able to leverage unanticipated relationships that are latently expressed by the results of the query. This aspect of the described subject matter is also highly flexible, allowing for distinctiveness to be measured relative to any baseline set of documents.

In another aspect, as described herein similar distinctiveness measures may be applied to document sets drawn from the overall collection by means other than interactive user queries, for example, as part of an offline data mining operation driven by a script.

In one illustrative embodiment, an information entropy measurement is used to determine the quality of an information retrieval system query.

Obtaining a Statistical Distribution from a Set of Documents

To measure the distinctiveness of a set of documents, an embodiment may use a representation of the document set that is amenable to statistical manipulation. In one aspect, a set of documents is analyzed to obtain statistical distributions that can be compared to each other to ascertain the distinctiveness of a set of documents with respect to a baseline distribution. The distribution can be based on document text, metadata (e.g., categories assigned to the document), or any other information derived from the documents. The distribution can be approximate, as long as it is representative of the set of documents. For example, the set of documents can be examined for term or phrase frequency, and that frequency can be used as the statistical distribution model of identifying characteristics for the document set. Term or phrase frequency is one example of an identifying characteristic associated with a set of documents.

While using approximation introduces the risk of approximation error, the efficiency benefits may compensate for that risk by avoiding comprehensive analysis of the document set. Examples of approximate distribution calculation include
  using sampling to compute the statistical distribution for a set of documents,
  adding a limited number of documents to the initial document set without recomputing the distribution,
  examining similar document sets to provide an expected distribution, in order to bypass analysis of the primary document set.

In one embodiment, the statistical distribution may be univariate; in this case, each document of a set of documents is assigned a value from a set of possible values for that distribution, as well as an associated weight. Specifically, the distribution can be constrained to be a probability distribution by requiring that the sum of weights for the set of documents is equal to 1. For example, in a unigram language model, the values in the distribution are words, and their weights reflect their frequency in the set of documents, as a fraction of the total number of words in the set of documents. In this embodiment, the statistical distribution may be based on correlated values associated with the document.

In another embodiment, the statistical distribution may be multivariate. In this embodiment, the statistical distribution may be based on correlated values associated with the document. Representations of such a distribution may be based on:
  Values represented as n-tuples, or a set of related values. Instead of a single set of values, there may be multiple sets of values. For example, each document may have a subject, a document type, and an author. In that case, there may be a set of values for subjects, a set of values for document types, and a set of values for authors.
  Values represented by both the presence and absence of the value. For example, if a value occurs on 80% of the documents in a set; then the set could have a weight of 0.8 for the presence of the value and a weight of 0.2 for the absence of the value.
  Correlated values. For example, the presence of a specific value might be indicative of the presence or absence of another value.

In yet another embodiment, each document in a set may be associated with a score or weight. For example, in a ranked retrieval model, each of the results for a query may each be associated with a score reflecting that document's estimated relevance to the query. These weights may be incorporated into the procedure for obtaining a distribution for the set of documents, e.g., as coefficients in a weighted sum.

In some embodiments, the choice of a distinctiveness measure, i.e. salience measure, may require or benefit from smoothing of the statistical distribution. For example, salience measures may have singularities for value associated with a weight of zero; this is because such measures often employ mathematical operations such as logarithms and division, and the log(x) and 1/x functions have singularities when x=0. To avoid such singularities, and, more generally, to correct salience measures that are poorly behaved in particular regions of the distribution space, weights in the distribution may be smoothed. For example, a weight of 0 may be replaced by a low, but non-zero weight, e.g., typically a weight that is smaller than some or perhaps all of other positive weights occurring in the unsmoothed distribution. Another technique to avoid singularities is to apply a small random perturbation to the distribution. Other smoothing techniques that are known in the art may be used to improve the suitability of statistical distribution as inputs to the salience measure.

Figure 11:
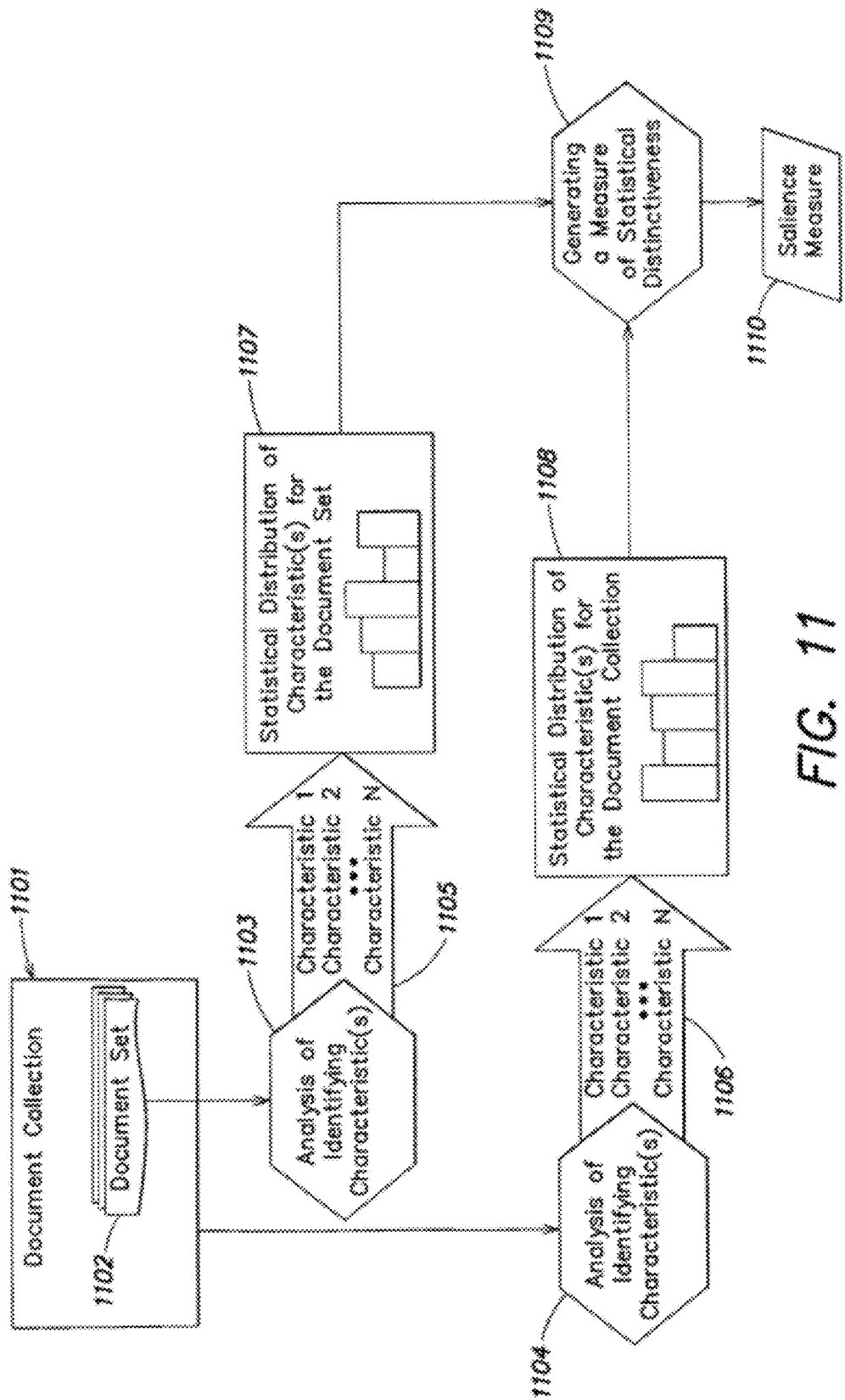
FIG. 11 shows a logical diagram for determining a salience measure according to another embodiment of the present invention.

FIG. 11 illustrates a logical flow for determining a salience measure. A document collection 1101 is analyzed 1104 to determine identifying characteristics, 1106. The identifying characteristic determined depends at least in part on the make up of the set being analyzed. For example, "traditional" documents (with text, author(s), and a subject) have identifying characteristics that may be determined based on the text, the author(s), and the subject of the documents. As another example, identifying characteristics may correspond to keywords in the text of a document, author(s) of documents, the subject of the document, and as a further example an identifying characteristic may correspond to any combination thereof.

A document set 1102 from within the document collection is analyzed 1103 to determine its identifying characteristics 1105. A statistical distribution for the identifying characteristics are determined at 1108 for the document collection, and at 1107 for the document subset, to generate a measure of distinctiveness at 1109, i.e. a salience measure 1110.

As shown in FIG. 11, a salience measure may be determined between one set of materials and the collection of materials as a whole. In one embodiment, one document set 1102 is analyzed for identifying characteristics 1103. The document collection 1101 is also analyzed for identifying characteristics 1104. Statistical distributions 1107 and 1108 are made of identifying characteristics 1105 and 1106, and the distributions are then used to generate a measure of statistical distinctiveness 1109, i.e. a salience measure 1110 of distinctiveness between set 1102 and the document collection as a whole 1101. As such a measure is relative to a consistent or unchanging reference, it is often referred to as an "absolute" salience measure. In one example, absolute salience can be thought of as salience of set X relative to the complete collection of documents, or, for simplicity's sake, S(X). The use of absolute measures of distinctiveness is discussed in greater detail below.

Relative Entropy

As noted above, according to one aspect an information entropy measurement is used to determine the quality of an information retrieval system query. Preferably, relative entropy is used as a measure of the distinctiveness of a set of documents relative to a baseline distribution. Relative entropy is also known as information gain, or Kullback-Leibler divergence (DKL). Relative entropy is an asymmetric statistical measure that can be applied to any two probability distributions to determine how distinct the first is from the second. Relative entropy may also be turned into a symmetric measure, e.g., by summing or averaging the relative entropies of the two distributions with respect to one another.

For probability distributions P and Q of a discrete random variable the relative entropy of P relative to Q is defined to be:

$$D_{KL}(P\|Q) = \sum_i P(i) \log \frac{P(i)}{Q(i)}$$

In the above, the summation is over all the values i that can be assumed by probability distributions P and Q. When probability distributions P and Q are identical, the relative entropy of P relative to Q is zero. One of ordinary skill will appreciate that the greater the divergence between the distributions, the higher the relative entropy. The logarithm can use any base: decimal, natural, etc. In the examples below, base 2 is used. The log base used is merely exemplary and should not be taken to limit the disclosed subject matter.

Relative entropy is best understood through a concrete example. Consider a population that is 60% male and 40% female. Now, consider a subset of that population that is 80% male and 20% female. The "relative entropy" between the subset distribution and the overall population distribution can then be computed as follows. As noted above, the relative entropy between probability distributions P and Q is defined as:

$$\sum_i P(i) \log \frac{P(i)}{Q(i)}$$

Note that this distribution is not symmetric: the relative entropy between P and Q is not the same as the relative entropy between Q and P. In the example above, the relative entropy is:

0.8*log₂(0.8/0.6)+0.2*log₂(0.2/0.4)=0.132.

Consider, for contrast, a subset of the population that is 10% male and 90% female. Now, the relative entropy is:

0.1*log₂(0.1/0.6)+0.9*log₂(0.9/0.4)=0.794.

This calculation indicates that the second population is more distinct, and further that this is the case because the female population is significantly different from the world set.

In the context of the subject matter described herein, relative entropy expresses how different a probability distribution associated with the query result set is different from the corresponding probability distribution associated with the baseline set. In some embodiments the baseline set could be either the overall collection or the result set for a different query. Stated another way, relative entropy is a basis for a measure of distinctiveness/salience; that is, of how interesting, or distinctive, that result set is, compared to other sets.

In some embodiments, the salience of a set X relative to a set Y is the relative entropy of set X given set Y, and denoted as:

Salience(X|Y)=S(X|Y).

Absolute salience can be thought of as salience of set X relative to the complete collection of documents, or, for simplicity's sake, S(X). In some embodiments, each dimension value may contribute two terms to the sum, one for the presence of the dimension value, and one for its absence. This embodiment treats each dimension value as a binary-valued distribution.

For example, consider a collection of books for which Subject is a dimension with values Art, Math, and Science. In the overall collection, 20% of the records are associated with Art, 50% with Math, and 50% with Science. Now, consider a result set for which 60% of the records are associated with Art, 25% with Math, and 30% with Science. The salience score is:

$$0.6*\log_2(0.6/0.2)+0.4*\log_2(0.4/0.8)+$$

$$0.25*\log_2(0.25/0.5)+0.75*\log_2(0.75/0.5)+$$

$$0.3*\log_2(0.3/0.5)+0.7*\log_2(0.7/0.5)=0.858$$

In contrast, the relative salience for a result set for which 90% of the records are associated with Art, 10% with Math, and 10% with Science is:

$$0.9*\log_2(0.9/0.2)+0.1*\log_2(0.1/0.8)+$$

$$0.1*\log_2(0.1/0.5)+0.9*\log_2(0.9/0.5)+$$

$$0.1*\log_2(0.1/0.5)+0.9*\log_2(0.9/0.5)=2.715$$

As can be seen from these examples, the more distinctive the distribution from that of the overall collection, the higher the salience score. The salience score is additive; each dimension value makes its own contribution, and this enables a determination of what in particular makes this set distinctive. Some embodiments may sum the contributions of all dimension values that belong to the same dimension to determine the overall contribution of that dimension to the salience score.

Result Set Size

A consequence of using relative entropy to calculate salience is that small sets of records tend to have higher salience. The reason is that a smaller set of records tends to be more distinctive than a larger one. In particular, a set comprised of a single record will have extremely high salience. This consequence is undesirable. Rather, as described below, it is preferable in some embodiments, to be able to measure the salience of the given set relative to other sets, irrespective of the sizes of the given set and the other sets. Thus, according to one aspect, it is desired to normalize the salience relative to the number of records in the set being measured and the number of records in the other sets.

According to some aspects, it is desirable that the salience of a random subset of X should be the same or substantially the same as the salience of X. In other words, when the set is made smaller without adding any extra information to it, preferably there should be no observed change in salience. There is, however, an increase in relative entropy due to the noise introduced by only looking at a random subset. To quantify this noise factor, one can take random subsets of varying sizes from a data set and observe the behavior of salience scores. Thus, for example, the average salience of a subset X' of x records selected randomly from X could be fitted to the following parameterized function (as just one example):

$$S(X')=S(X)+ax^b$$

where the two parameters a and b may be obtained through a regression or fitting procedure, conducted offline or at query time.

As noted above, salience is correlated inversely to the size of the set being measured. All else equal, smaller result sets will tend to have higher salience than larger ones. In the example above, this will translate into the negative value of b.

Consider a Boolean retrieval model for a query that returns a result set R. Now, consider second Boolean retrieval model that returns a random subset R' of R, for example, half the documents in R, selected at random. Intuitively, it can be seen that the first retrieval model is superior to the second. The two retrieval models offer the same expected precision, but the second model will only offer half of the recall of the first. In a Boolean retrieval model, there is no reason to sacrifice recall if it does not improve precision. However, salience will not favor R over R', at least in the expected case. In fact, R' will generally have higher salience than R because the random selection will introduce spurious information into the language model.

To ensure that R' is not favored over R, there is a need to modify the salience measure so that, given a choice two differently sized sets of equal salience as candidate responses to a query, the larger set is favored.

Figure 13:
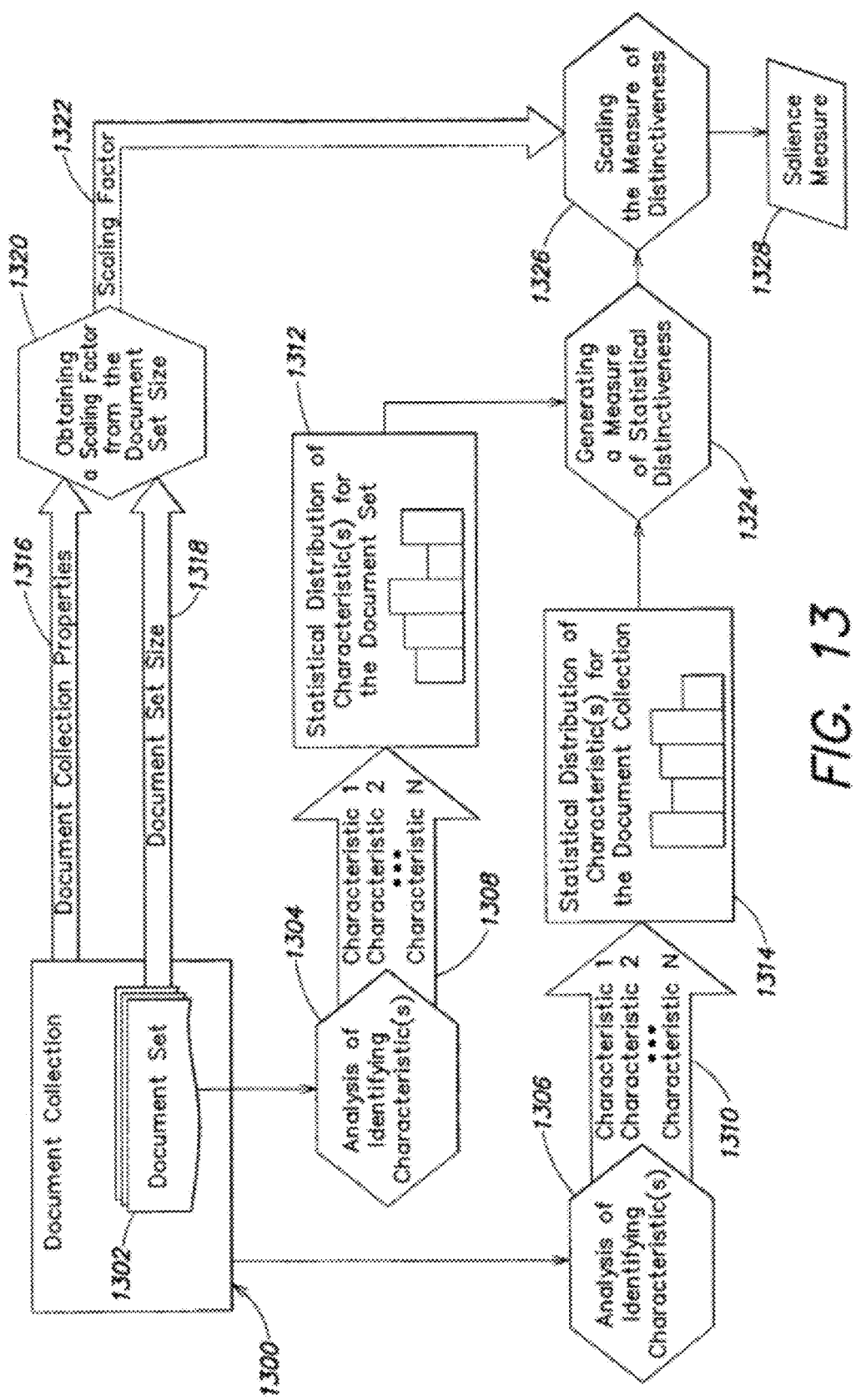
FIG. 13 shows a logical diagram for determining a salience measure according to another embodiment of the present invention.

FIG. 13 illustrates a logical diagram of a system and method for determining a salience measure according to some aspects of the present invention. Shown is a document collection 1300 from which document collection properties 1316 are extracted to obtain a scaling factor 1322 to account for document set size 1318. According to one embodiment, obtaining a scaling factor may include analysis of sampled subsets 1302 within the document collection for properties associated with, for example, set size. Identifying characteristics are analyzed 1306 and determined with respect to the entire collection at 1310 and with respect to documents sets within the document collection at 1304 and 1308. One or more characteristics may be identified for both the document collection and each document set analyzed. A statistical distribution of the identifying characteristics is determined 1312 for the characteristic(s) of the document set 1302 and at 1314 for the document collection 1300 to generate a measure of statistical distinctiveness 1324. Using the scaling factor determined from the properties of the document collection and document set sizes at 1322, the measure of statistical distinctiveness is scaled 1326 and a normalized salience measure 1328 is obtained.

According to one embodiment of the present invention, the salience measures of two or more sets are compared to one another without necessarily computing the normalized salience measures of the sets. In such an embodiment, one or more of the sets are reduced in size using random selection of set members, so that the sets being compared are of the same or approximately the same size. Once the sets to be compared have been thus reduced in size, the measurement of salience of those reduced sets does not require any adjustment for differences in set size. Because the random selection process introduces non-determinism into the measurement process, according to one embodiment, the process may be repeated, in another the random selection may be repeated, and values averaged to reduce the effects of said non-determinism. In another embodiment, one or more of the sets are increased in size (supersizing) using sampling. Such sampling may proceed by sampling from the collection.

Figure 14:
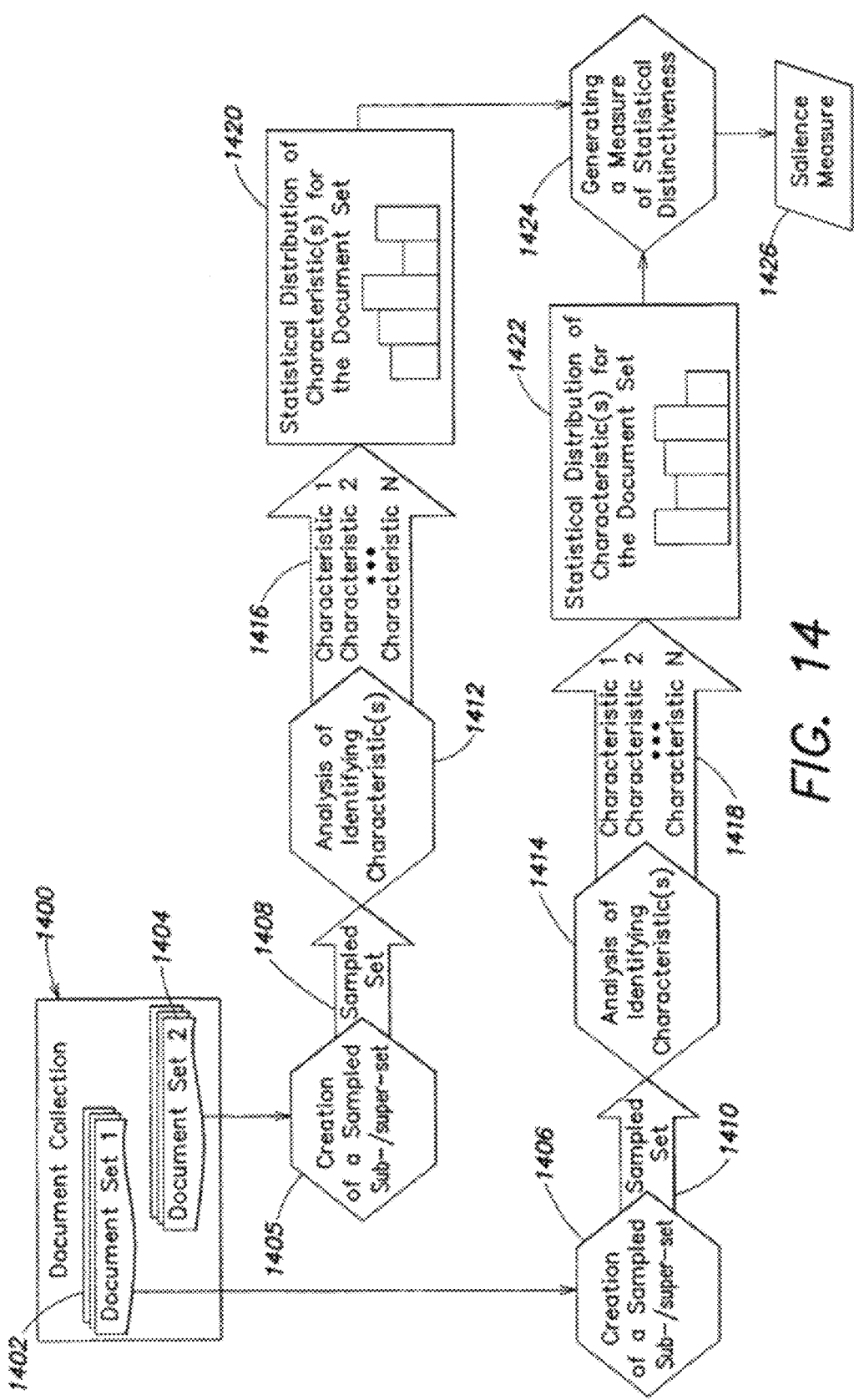
FIG. 14 shows a logical diagram for determining a salience measure according to another embodiment of the present invention.

FIG. 14 shows a logical diagram for determining a relative salience measure between two document sets according to some aspects of the present invention. Document collection 1400 contains two document sets 1404 and 1402, which are acted upon by sampling processes 1405 and 1406, which in various embodiments may sub-set, super-set, or take in the whole one or both of the document sets, producing two sampled sets 1408 and 1410 of substantially equivalent size. As an example, one embodiment utilizes random statistical sampling upon both document sets 1404 and 1402, to create smaller equal-sized sampled sets 1408 and 1410, respectively. In another embodiment one of the sampled sets is increased in size using sampling to generate equal-sized sets.

These sampled sets are analyzed 1412, 1414 to determine their identifying characteristic(s) at 1416 and 1418, respectively. Statistical distributions of the identifying characteristic(s) are obtained at 1420 and 1422, which are then used to generate a measure of statistical distinctiveness 1424. The resulting salience measure 1426 does not require any normalization adjustment for differences in set size.

Figure 15:
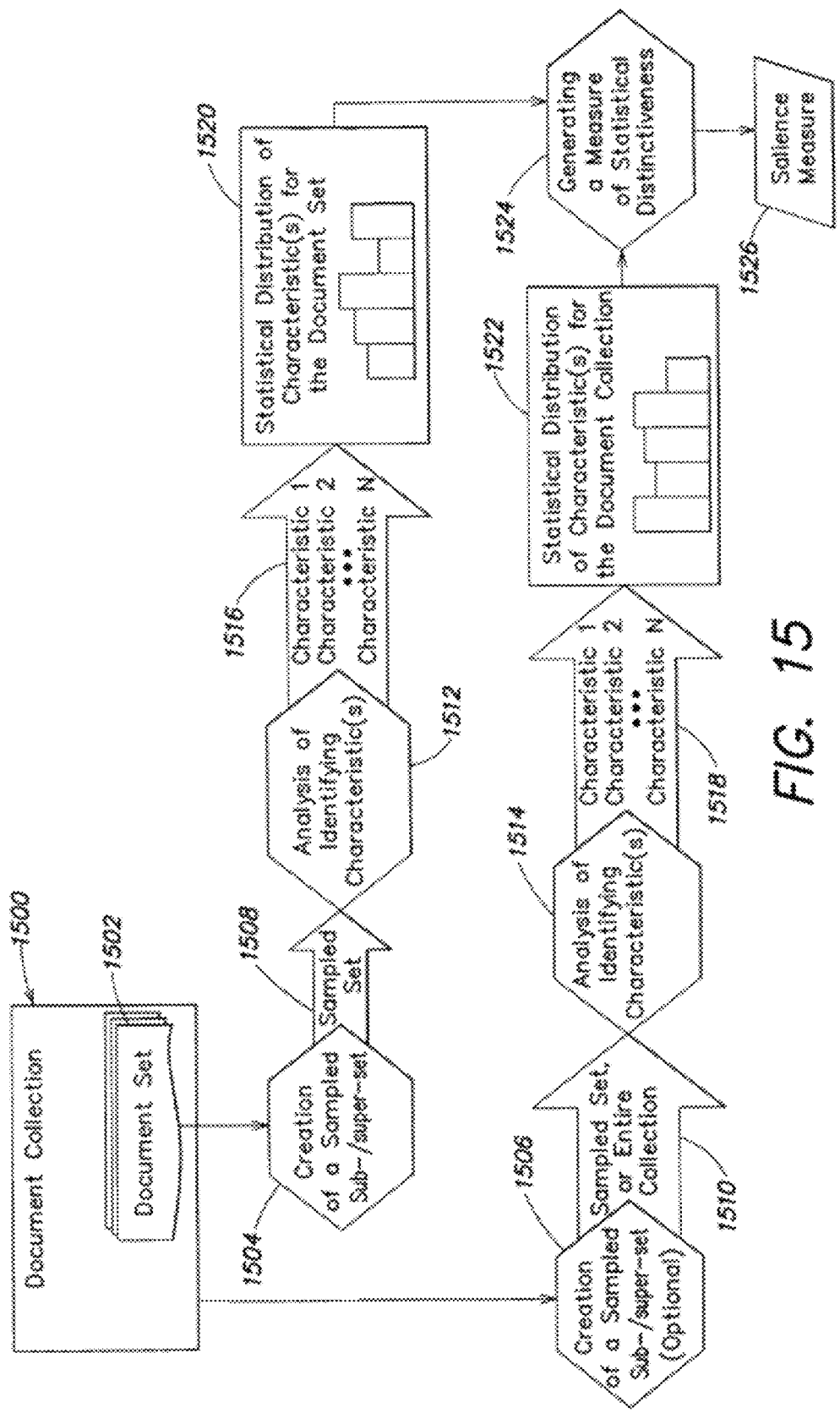
FIG. 15 shows a logical diagram for determining a salience measure according to another embodiment of the present invention.

Another embodiment is show in FIG. 15, with one document set 1502 drawn from document collection 1500. Sampling operations 1504 and (optionally) 1506 create sampled sub-/super-sets of substantially similar size 1508 and 1510 from document set 1502 and the document collection 1500 respectively. According to one embodiment, sampling 1506 of the document collection is optional. The sampled sets are analyzed to determine identifying characteristic(s) 1512 and 1514, and statistical distributions of the characteristics produced 1520 and 1522, which are subsequently used to generate a measure of statistical distinctiveness 1524 producing an absolute salience measure 1526, i.e. of set 1502 relative to the document collection 1500 as a whole. In one embodiment As sampled sub-/super-sets of substantially similar size were created prior to calculation of the salience measure, and the resulting absolute salience measure is independent of the size of the original document set 1502 and document collection 1500.

Salience as a Random Variable

The above discussion illustrates that the size of a result set is important. To combine this concept with salience, we define the variable $S_x$ to be the salience of a set of x records selected randomly from the entire corpus of n records. Some embodiments may sample with or without replacement. The expected value of the random variable $S_x$ as a function of x has some notable properties. On one hand, when x is small, one can expect $S_x$ to be quite large. In particular, any terms that are sparse in the corpus but dense in the selected record set will make significant contributions to salience.

For example, if $P(w|Q)=c_1$ and $P(w)=c_2/n$, then $$P(w|Q)\log_2 \frac{P(w|Q)}{P(w)}$$

is $\Theta(\log_2 n)$. On the other hand, when x is large, one can expect $S_x$ to converge to zero, because $P(w|Q)$ approaches $P(w)$. The following sections describe other properties of $S_x$.

Normalized Salience

As observed, the expected value of $S_x$ is greater than zero for finite values of x. In other words, a set of records selected randomly from the corpus generally yields non-zero salience. However, a retrieval model that returns a random subset of the corpus is worse than a retrieval model than returns the whole corpus. Thus, according to the subject matter described herein, it is desirable to modify the salience measure to at least ensure that the system does not favor a random subset of the corpus over the whole corpus and, by extension, that for any set R the system does not favor a random subset of R over R.

Embodiments of Normalized Salience

In one example, a desirable approach is to normalize salience by modifying the salience scores of R based on its size. One way to accomplish this goal is to define the normalized salience of R as the number of standard deviations by which the salience score for R exceeds the mean salience score for sets of the same size (or concentration of relevance) as R:

$$S_{normalized}(R)=(S(R)-E(S_{|R|}))/stddev(S_{|R|})$$

This normalized measure has some very useful properties:

If R is a set of records selected randomly from the entire corpus, then $S_{normalized}(R)=0$, regardless of the size of R. More generally, if R' is a set of records selected randomly from R, then $S_{normalized}(R')=S_{normalized}(R)$, regardless of the cardinalities of R and R'.

Normalized salience (i.e. normalized distinctiveness) compensates for the noise associated with small result sets by subtracting the expected salience of a randomly selected set of the same size. Dividing by the standard deviation is not strictly necessary, but it provides the benefit of making the measure have a dimensionality that is independent of the size of the corpus. Indeed, in other embodiments of the subject matter described herein, one can normalize salience by simply subtracting the mean salience score for sets of the same size, without dividing by the standard deviation.

There are other ways to accomplish normalization. For example, rather than expressing salience scores in terms of the number of standard deviations from their mean, it is possible to use the percentile rank within the distribution. For example, if the salience score for R exceeds the salience scores of 90% of sets of the same size (or concentration of relevance, as described below) as R, then the normalized salience score would be 90. There are numerous variations on this theme of leveraging the distribution of salience scores to properly factor in the size of concentration of relevance of R. These variations should be considered within the scope of the subject matter herein.

Modeling the Distribution

To implement a normalized salience measure, some embodiments compute the expected value of $S_x$ as a function of x. Other embodiments may also utilize standard deviation of $S_x$ as a function of x. Typically, these functions are not available in closed form because they depend on the statistical distribution of data in the corpus. One can empirically observe values of $S_x$, however, and fit them to a parameterized family of functions. These values converge to zero as x increases, but they can be quite high for low values of x. After considering various functional forms that may be used as approximations to the measured results for the expected value and standard deviation of $S_x$, functions in the form of $ax^b$, where b<0, were found to be both convenient to calculate and to provide an acceptably good fit to the measured data. Other embodiments may use different approximating functions, including explicitly measured, statistically derived, or theoretically derived from the prior knowledge of statistical distributions associated with the documents in the corpus.

In summary, according to this aspect of the described subject matter, the size of a set of documents is used as a factor in measuring the distinctiveness of a set of documents relative to a baseline distribution. In particular, the distinctiveness of smaller sets is discounted or normalized to reflect the expected lack of representativeness of small subsets of a collection.

In some embodiments, the distribution of a distinctiveness measure, such as relative entropy, may be known or modeled for document sets of a given size, i.e., for a given set size, there may be a known or modeled probability distribution of the distinctiveness measure over all sets of that size. In such embodiments, the distinctiveness of a set can be discounted or normalized by comparing it to the distribution of the distinctiveness measure for sets of the same size.

In other embodiments, the normalization procedure described above may replace the distinctiveness measure of a document set with the number of standard deviations by which the set's measure differs from the mean distinctiveness measure for document sets of its size. In still other embodiments, the normalization procedure may replace the distinctiveness measure of a document set with the percentile rank of the set's distinctiveness measure relative to document sets of its size.

While one preferred embodiment uses normalized relative entropy as its salience measure, other embodiments could employ other functions to measure the differences between distributions. Examples of other salience functions include, but are not limited to: Euclidean (L2) distance, Manhattan (L1) distance, Hellinger distance, diversity difference, cosine difference, Jaccard distance, and Jenson-Shannon divergence, and skew divergence. Also, similarity functions and correlation measures, such as the Pearson correlation coefficient, Dice coefficient, overlap coefficient, and Lin similarity, can be converted into difference functions by inverting their sense (i.e., a higher similarity score implies a smaller difference between the distributions). Other functions familiar to those skilled in the art of statistical methods can be incorporated into the disclosed methods.

Figure 1A:
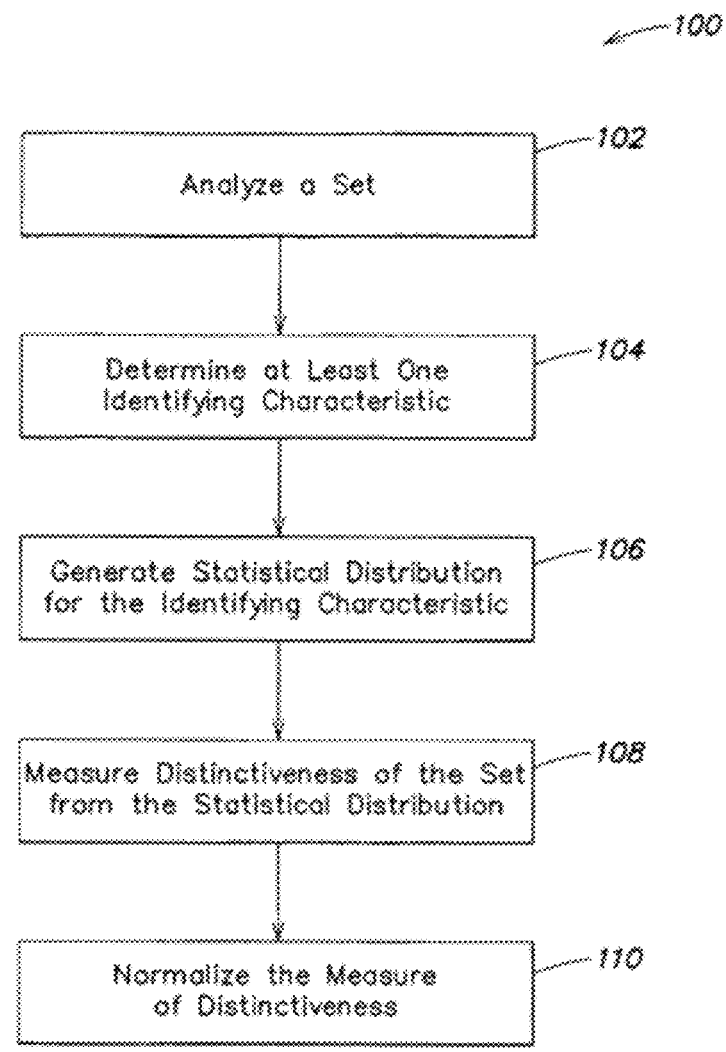
FIG. 1A shows a process for generating a normalized measurement of the distinctiveness of a set according to one embodiment of the present invention.

Referring to FIG. 1A shown is an example of a process, 100, for generating a normalized measurement of the distinctiveness of a set. At step 102, a set is analyzed to determine at least one identifying characteristic within the set, at 104. One should appreciate that a set can be virtually any collection of electronic information. Typically, a collection of information comprises information stored for later use/access, i.e. not a transient collection of information. However, transient data may also be analyzed as discussed in greater detail below.

In one example, the set being analyzed is made up of documents. Documents can be thought of in traditional sense as discrete text files that may also be associated with metadata, such as an author, date of creation, a subject, and date of modification as examples; however, a set of documents and a document itself is intended to be more comprehensive, and should be understood to include other addressable and selectable media, including for example non-textual data, such as sound and visual recordings, database records, and composite entities such as might be described using HTML and XML encoding. Individual documents and collections of documents may take many forms, including file systems, relational databases, hypertext collections (such as the World Wide Web), or the like.

The at least one identifying characteristic determined at step 104 depends at least in part on the make up of the set being analyzed at 102. In one example, the set is made of "traditional" documents, with text, author(s), and a subject. There, at least one identifying characteristic may be determined based on the text, the author(s), and the subject of the documents. As another example, identifying characteristics may correspond to keywords in the text of a document, author(s) of documents, the subject of the document, and as a further example the identifying characteristic corresponds to any combination thereof. In one embodiment, each of the preceding identifying characteristics may be treated in more detail, for example, the presence of multiple authors may be used as an identifying characteristic, as may the presence of multiple topics, or the presence of certain key words and/or groups of words or phrases. One should appreciate that the absence of certain characteristics in elements of the set may also be used in determining the at least one identifying characteristic at step 104. The determination of the at least one identifying characteristic may include analysis of any identifying information regarding the elements of the analyzed set. In one example, the metadata associated with the elements of a set are analyzed. In one embodiment, the analysis of identifying information includes consideration of date of creation, date of modification, date of last access, title, file extension, file type, file size, file composition, author(s), editor(s), keyword, containing specific information, containing a specific element, subject(s), summary information, derivable information, all or part of the file name, a word or a phrase within a file, location on storage media, physical location, relational information, non-textual data, as some examples. One should appreciate that information associated with and/or derivable from electronically stored information can include any information that may be stored and associated with a collection of information, including information stored by operating systems and information typically considered "metadata" and may also include other system information regarding more fundamental operations/information on electronically stored information, for example memory location, operating system access information, associated driver and device information, as some examples.

Figure 1B:
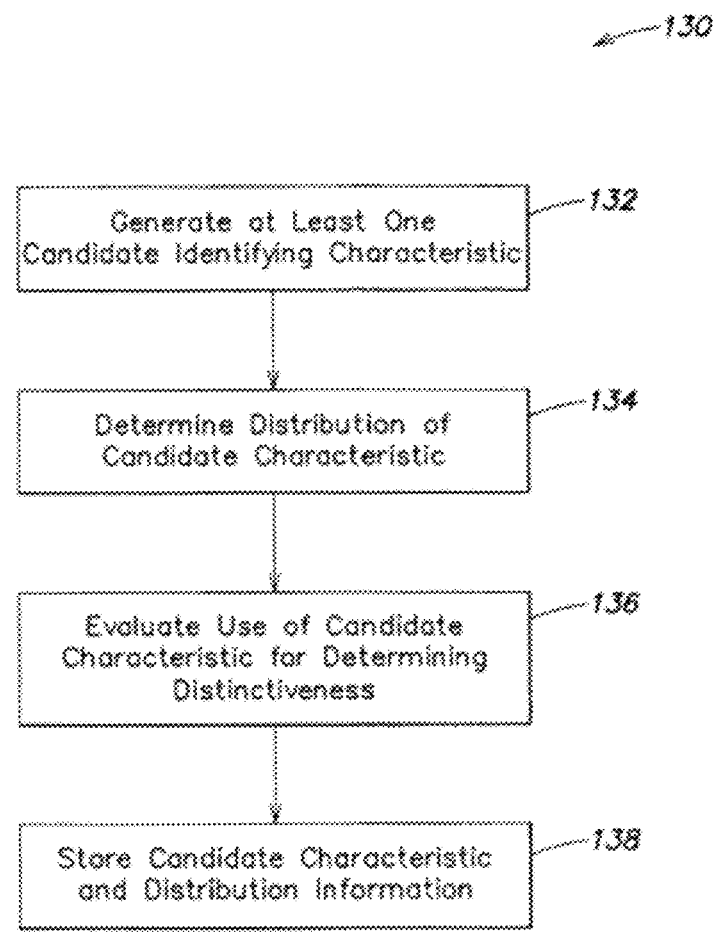
FIG. 1B shows a process for determining at least one identifying characteristic according to one embodiment of the present invention.
Figure 1C:
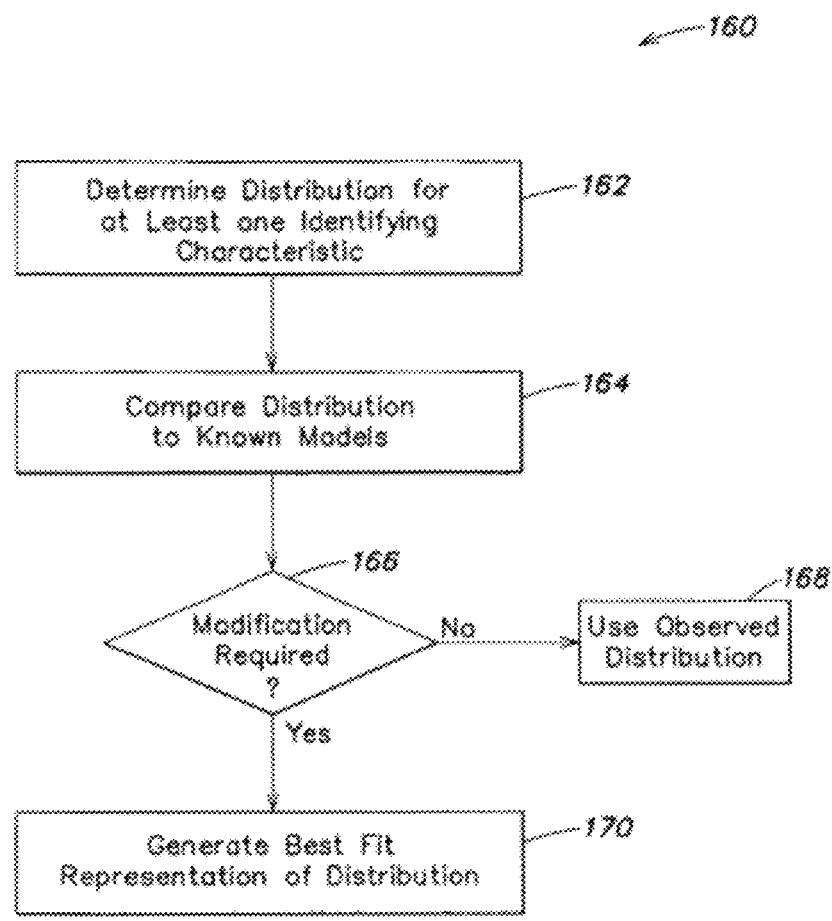
FIG. 1C shows a process for modeling the statistical distribution of an identifying characteristic according to one embodiment of the present invention.

The determination of at least one identifying characteristic and any associated analysis may occur as part of another process, for example, process 130 FIG. 1B, wherein a candidate identifying characteristic is determined for elements of a set, at 132. The determination of a candidate identifying characteristic may be based on review of all possible information associated with the elements of the set, for example the metadata for the elements of the set, or may be based on a subset of all the possible information associated with the elements of the set. In one example, certain characteristics are expected to be found in a set, and those characteristics are used in the analysis to determine identifying characteristics. In another example of a particular embodiment, the set is a collection of information pertaining to a winery, and the expected characteristics on which information is stored and/or associated may include the type of wine, a year of bottling, the year the grapes were grown used to make the wine, weather patterns for the growing season, information on soil (nutrient content, etc.) in which the grapes were grown, location, among a number of other characteristics. In another embodiment, various subsets of the preceding expected characteristics may also be used. One should appreciate that "expected" characteristics need not be used, and the analysis of the set and its contents may exclusively determine the identifying characteristics that are used or may contribute to the determination of the identifying characteristics that are used.

At step 134, the statistical distribution for a candidate identifying characteristic is determined. The determination of the statistical distribution for a candidate identifying characteristic may involve manipulation of the set that is analyzed. In one example, a representation of the set is used that is adapted to statistical manipulation. Using the representation of the set, a statistical distribution is determined. In one example, the statistical distribution is obtained based, at least in part, on text, metadata (e.g. categories assigned to the document), or other information derived from the elements of the set. In another example, the statistical distribution is an approximation of the incidents of the identifying characteristic. In one example, the statistical distribution is determined using sampling on the set; in another example, modification of the set is permitted without need for recalculation of the statistical distribution. In some embodiments, a threshold is established for determining when recalculation of a modified set is required. The threshold may be based on a specific number of changes made to the set, and/or a percentage of change with respect to the set (for example percent change in size).

Other approximation techniques include examining a similar set(s) and the statistical distribution(s) obtained on the similar set(s) to provide an expected distribution for the set being analyzed. In one example, the statistical distribution is univariate, that is, based on one variable. In one embodiment, the univariate distribution is assigned a weight value. In another embodiment, the weight value constrains the distribution to reflect a probability distribution, in other words, the sum of the weights for the set is equal to 1. In an embodiment where the set comprises textual information, the identifying characteristics are words within the text, and the weights associated with them reflect the frequency of the words in the set as a fraction of the total number of words in the set. Candidate identifying characteristics may be analyzed to determine Correlated values within a particular set; for example, this may occur at step 136. Correlated values represent a distinct challenge in determining identifying characteristics. In one example, certain identifying characteristics have too many dependencies to appropriately model the statistical distribution. In another example, the number of dependencies makes the calculation and/or approximation of the statistical distribution intractable. According to one embodiment, a determination is made that a candidate is not worth the computation cost associated with generating the statistical distribution. The determination may distinguish between candidates that are computationally intractable and candidates that are too computationally expensive. In one embodiment, the candidates that are determined to be too expensive and/or intractable are stored, so that those candidates may be excluded before additional analysis is performed. Additional analysis may include subsequent determinations of identifying characteristics; in one example it includes repetition of process 130; in another example, information stored may be used in other processes, for example, process 100, FIG. 1A.

Referring again to FIG. 1B, in another embodiment, the candidates that are simply too expensive, rather than intractable, may be associated with a trigger that causes and/or permits re-evaluation of the candidate in response to changes to the set. Changes may include, for example, the addition of elements to the set, deletion of elements, modification of elements of the set, among others. Using the statistical distribution, obtained at step 134, candidate identifying characteristic can be evaluated by modeling and/or evaluating the set using the candidate identifying characteristic, at 136. In one example, thresholds are established to determine if an identifying characteristic is worth the computational effort needed to derive the characteristic. Some potential identifying characteristics may be excluded in advance, as, for example, the word "the" in a document may be particularly unsuited to identifying distinctiveness. In another example, analysis determines that a set is made up of documents of identical file type; in such an example file type yields little or no information on distinctiveness of sets.

One should appreciate that exclusion rules may be generated as part of the analysis of identifying characteristics, and such exclusion rules may be used as a default, or may have criteria associated with them to provide for execution. According to one embodiment, exclusion rules are themselves excluded for particular analysis.

In one example, a candidate identifying characteristic may be deemed unsuitable, where it is determined this candidate identifying characteristic has too many dependencies to be computationally tractable. According to one embodiment, unsuitable candidate identifying characteristics are excluded from further consideration. In another embodiment, unsuitable candidate characteristics are stored for use with exclusion rules.

According to one aspect, it is realized that reducing the computational complexity and overhead associated with determining identifying characteristics and statistical distributions is beneficial in many embodiments. In particular, utilization of approximation rather than direct measurement (in one example, employing processes of curve fitting to the determination of statistical distribution), while introducing possible approximation error, yields benefits for some embodiments. A balancing may occur between reducing computational effort and achieving a higher level of precision.

According to another aspect, such balancing is affected by the characteristics of the set being analyzed and the activity that is being performed. In one example, determination of candidate identifying characteristics may tolerate a greater degree of possible approximation error, where the evaluation of the set based on those characteristics occurs with a greater degree of precision. In another example, correlated values for identifying characteristics are identified, and only one of the correlated values for identifying characteristics is used for later analysis. In one example, where correlated values are determined, only one member of the correlated values is used for determining statistical distributions for the correlated values. In another example, only one distribution for the correlated values is stored.

Information on the statistical distribution of candidate identifying characteristics is stored at step 138. In one embodiment the stored information is used as part of a process for measuring the distinctiveness of a set. In one example, the stored information may be accessed as part of process 100, shown in FIG. 1A, for example, during steps 102-106. In some embodiments, only portions of the distribution information related to candidate identifying characteristics are stored. The storing of distribution information may involve a determination regarding the value of the statistical information. In one example, a determination is made based, at least in part, on the computational effort involved in generating the statistical information. In another embodiment, the value of the statistical information is compared for a plurality of candidate identifying characteristics, and the statistical information is stored based on the comparison. Typically, information requiring greater computation effort is treated preferentially over information of less computational effort; however, other factors may be used in the determination. In one embodiment, factors include, for example, computational effort, age of the information, resource usage, or a combination thereof.

Referring again to FIG. 1A, process 100 continues at step 106, where a statistical distribution for the at least one identifying characteristic is generated. As discussed above, the at least identifying characteristic may be determined through a sub process, for example, process 130, and in conjunction with the sub-process a statistical distribution may be calculated and stored for the at least one identifying characteristic. In one embodiment, generation of the statistical distribution for the at least one identifying characteristic involves retrieval of a stored statistical distribution. Optionally, (not shown) when the statistical distribution is retrieved from storage, a check against age may be made to determine if the statistical distribution should be generated independently from any stored information. Additionally, a check may be performed to determine if any changes have occurred with respect to the analyzed set that warrant (re)generation of the statistical distribution rather than retrieval from storage. In one example, a limited number of documents may be added to a set without requiring re-computation of the statistical distribution. One should appreciate that, although process 100 is shown as singular process, repetitive invocation is contemplated and even in some embodiments expected. Further, the individual steps that make up process 100 may be invoked in a different order or be combined into a fewer number of steps.

In one example, it is determined that the number of changes to the underlying set exceeds tolerance for changes, and the statistical distribution for the at least one identified characteristic is generated at step 106. In another example, no data exists on the at least one identifying characteristic and the statistical distribution is generated at step 106. The determination of the statistical distribution for the at least one identifying characteristic may involve manipulation of the set that is analyzed. In one example, a representation of the set is used that is adapted to statistical manipulation. Using the representation of the set, a statistical distribution is determined at 106. In another example, the statistical distribution is obtained based, at least in part, on text, metadata (e.g. categories assigned to the document), or other information derived from the elements of the set. In another example, the statistical distribution is an approximation of the incidents of the at least one identifying characteristic. The statistical distribution may be determined using sampling on the set; in another example, a best fit approach is used to model the distribution according to a known distribution curve. In yet another example, regressions are performed to determine the best model for the statistical distribution.

In one embodiment, modification of the set is permitted without need for recalculation of the statistical distribution. It is realized that permitting some variation in the analyzed set without undergoing expensive computation may improve some implementations, and, in particular, reduce computational burden and expense. In some embodiments, a threshold is established for determining when recalculation of a modified set is required. The threshold may be based on a specific number of changes made to the set, and/or a percentage of change with respect to the set (for example, percent change in size).

Other approximation techniques include examining a similar set(s) and the statistical distribution(s) obtained on the similar set to provide an expected distribution for the at least one identifying characteristic being analyzed.

Step 106 may include another process for obtaining a model of the distribution adapted to statistical manipulation. In one example, process 160 is called to model the statistical distribution of the at least one identifying characteristic. At step 162, a statistical distribution is obtained for the at least one identifying characteristic. At step 164, the measured distribution is compared to a known distribution curve and/or model. Known distributions may be in the form of parameterized functions axb, as one example. Such known distributions may be calculated in advance, calculated offline, obtained through regression analysis, calculated from a fitting procedure, and may be determined on demand. At step 166, it is determined if modification to the measured statistical distribution is required. At step 166(NO), it is determined that the measure distribution correlates sufficiently to a smooth distribution curve so that modification is unnecessary, and the measured distribution is stored at 168 for later use.

At step 166(YES), it is determined that modification should be performed on the measured distribution. Modification of the measured distribution may take many forms. In one example, modification of the measured statistical distribution takes the form of "smoothing" of the distribution to eliminate singularities. Singularities may result from operations that employ logarithms and division, since such functions may result in values of infinity for a particular portion of a distribution, precluding numeric computation of the statistical distribution through the region including the singularity. In one example, singularities are eliminated by replacing the values with approximate values. In another example, a zero weight is replaced by a small but non-zero weight. In another example, the value may be replaced by a value characteristic of the distribution surrounding the singularity. Modification of the distribution may take the form of a fitting process, where the observed/measured distribution is fit to a known model of a statistical distribution. Modification of the statistical distribution may also involve approximation of the distribution, for example, by examining similar sets of elements to provide expected distributions in order to bypass analysis of the primary set (not shown). At step 170, a best fit representation of the distribution is obtained and may be used for further analysis of distinctiveness. In one example, the best fit representation is used as part of a larger process for calculation of a distinctiveness measure for a set.

Using the statistical distribution for the at least one identifying characteristic, a measure of distinctiveness is determined at step 108. The measure of distinctiveness may be determined from a univariate distribution, that is, based on one value (i.e. one identifying characteristic). In one embodiment, the univariate distribution is assigned a weight value to generate the measure of distinctiveness. In another embodiment, the weight value constrains the distribution to reflect a probability distribution; in other words, the sum of the weights for the set is equal to 1. In an embodiment where the set comprises textual information and the at least one identifying characteristic is generated from words within the text, the weights associated with the at least one identifying characteristic may reflect the frequency of the words in the set as a fraction of the total number of words in the set.

In another embodiment, the measure of distinctiveness may be determined from a multivariate distribution; that is, based on a set of values (i.e. identifying characteristics). In one example, values are represented by n-tuples, relations based on a group of values. The multivariate distribution may also be based on multiple sets of values. In one example, the set is made up of documents comprising subject, type, and an author, thus, a set of values corresponds to each subject, type, and author. In one implementation, values are represented by both the presence and absence of the value. For example, if a value is present in 60% of the elements of the analyzed set, the absence of that value occurs in 40% of the elements of that set.

As discussed above, correlated values represent distinct challenges in determining identifying characteristics and the resulting measure of distinctiveness. In one example, certain identifying characteristics have too many dependencies to appropriately model the statistical distribution. In one example, the number of dependencies makes the calculation and/or approximation of the statistical distribution intractable. One should appreciate that steps 106 and 108 may take place simultaneously and, in one example, occur as one step, rather than as discrete steps.

Process 100 continues at step 110, and the measure of distinctiveness of the set is normalized. According to one aspect, normalization accounts for noise introduced by analyzing a set derived from a larger set. It is realized that a measure of distinctiveness may be given an improper weight due to the size of the set being analyzed. If one considers a comparison of the initial set and its measure of distinctiveness against a set comprised of a smaller number of elements from the initial set, the set comprised of a smaller number of elements typically will have a higher salience. Even in the example where the smaller set is a random sampling of the initial set, a higher salience score will often result. In one example, step 110 includes acts of computing measures of distinctiveness obtained from random subsets of varying sizes from an initial set in order to quantify a correction factor. The set of these computed distinctiveness scores is then fit to a parameterized function as discussed above. In one example, the parameterized function is obtained through a regression; in another, a fitting procedure is used. The analysis of average distinctiveness score may be performed in advance, or on demand; it also may be conducted offline.

In one example, normalization ensures that smaller sets are not favored over larger sets due to set size. This is accomplished by modifying the measure of distinctiveness to account for the size of the analyzed set. In one embodiment, the normalized measure of distinctiveness is determined from the amount by which the distinctiveness measure exceeds a mean score for sets of similar size. In another embodiment, the normalized measure of distinctiveness is determined from the number of standard deviations by which the distinctiveness measure exceeds a mean score for sets of similar size. In one example, if the analyzed set is a set randomly derived from an initial set, then the normalized measure of distinctiveness will be the same for the derived set as the initial set. According to another embodiment, the normalized measure is determined by removing the contribution to distinctiveness obtained from a randomly selected set of the same size. In another example, step 110 occurs by calculating the percentage by which the distinctiveness score of the analyzed set exceeds the distinctiveness score of random sets of the same and/or similar size.

In one embodiment, step 110 may replace the distinctiveness measure of a set with the amount by which the set's measure differs from the mean distinctiveness measure for sets of the same and/or similar size. In another embodiment, step 110 may replace the distinctiveness measure of a set with the number of standard deviations by which the set's measure differs from the mean distinctiveness measure for sets of the same and/or similar size. In still other embodiments, step 110 may include replacing the distinctiveness measure of a set with the percentile rank of the set's distinctiveness relative to sets of the same and/or similar size.

Examples of functions that may be used to derive a distinctiveness measure include, but are not limited to: Kullback-Leibler divergence, Euclidean (L2) distance, Manhattan (L1) distance, Hellinger distance, diversity difference, cosine difference, Jaccard distance, Jenson-Shannon divergence, and skew divergence. Also, similarity functions and correlation measures, such as the Pearson correlation coefficient, Dice coefficient, overlap coefficient, and Lin similarity, can be converted into distinctiveness functions by inverting their sense (i.e., a higher similarity score implies a smaller difference between the distributions). Other functions familiar to those skilled in the art of statistical methods can be incorporated into the disclosed methods.

Concentration of Relevance

The foregoing discussion of result set size is particularly suitable for document sets obtained from Boolean retrieval models. A Boolean retrieval model is a model where, in response to a query, each document in the collection is determined to match or not match, i.e., assigned a score of 1 or 0. In contrast, a ranked retrieval model is a model where, in response to a query, each document in the collection is assigned a score so that the documents can be sorted by this score. In a Boolean retrieval model, a query serves as a filter on the collection; in a ranked retrieval model, a query serves as a sort on the collection. A model can combine Boolean and ranked retrieval, filtering the document collection and sort the results of that filtering by a scoring function.

For ranked retrieval models, concentration of relevance is a generalization of result set size. While result set size applies to Boolean retrieval models (a document either matches or does not match a query), concentration of relevance can be used for ranked retrieval models, where every document in the collection may be assigned a relevance score for every query.

According to one embodiment, a way to measure concentration of relevance is to choose a threshold relevance score and count the number of documents whose score exceeds that threshold. This thresholding process, in effect, converts the ranked retrieval model into a Boolean retrieval model. The choice of threshold depends on the nature of the relevance scores. If relevance scores are probabilities between 0 and 1 (i.e., a relevance score of p means that the associated document is relevant with probability p), then the threshold might be an absolute number like 0.5 (i.e., 50% probability of being relevant). If relevance scores are not probabilities, a threshold can be obtained by analyzing the distribution of values, e.g., a standard deviation above the mean relevance score. Because every ranked retrieval model has its own associated method for scoring the relevance of retrieved results, the choice of a threshold is likely to be highly specific to the retrieval model.

Another way to measure concentration of relevance, according to some embodiments, is to model the distribution of relevance scores as a mixture of two distributions, the distribution of scores for more relevant documents and the distribution of scores for less relevant documents, and to compute the separation between the two distributions. For example, the distribution of relevance scores can be modeled as a mixture of two Gaussian distributions, and the separation can be computed as the difference between their means. This mixture model approach has the benefit of not imposing any requirements of the relevance scores; in particular, the scores are not required to correspond to probabilities.

Like result set size, concentration of measure can be used to discount or normalize the distinctiveness (i.e., salience) measure. For example, the distinctiveness of a set can be discounted or normalized by comparing it to the distribution of the distinctiveness measure for sets of the same or comparable concentration of measure.

One of ordinary skill will appreciate that because concentration of measure can be a continuous quantity, the distribution of the distinctiveness measure as a function of the concentration of measure is more amenable to being interpolated or modeled (as opposed to computed exactly). Those skilled in the art will appreciate that techniques exist to adapt the search results of ranked retrieval model for salience computation, including, but not limited to, trimming the result set to top N results (for N either constant or variable), based on the number of results, the distribution of the relevance scores, or other parameters.

Figure 10:
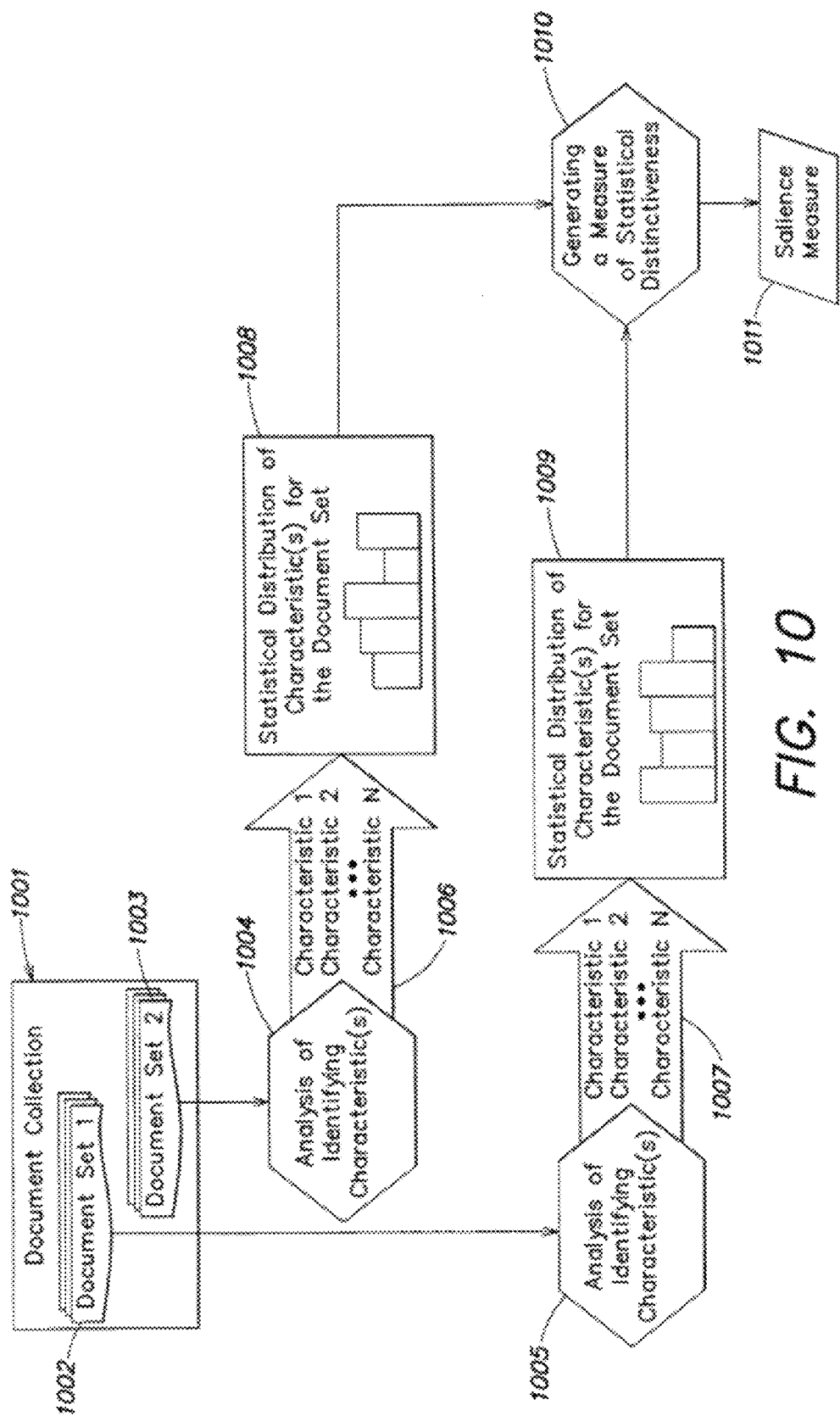
FIG. 10 shows a logical diagram for determining a salience measure according to another embodiment of the present invention.

FIG. 10 shows a logical diagram of a system and method for deriving a salience measure. Given a collection of documents 1001, a salience measure may be obtained showing the distinctiveness of one document set compared to another document set from within the collection of documents. The first and second document sets 1002 and 1003 are analyzed to determine identifying characteristic(s) 1007 and 1006 at 1005 and 1004. Statistical distributions 1009 and 1008 are determined for the characteristic(s) 1007 and 1006, to generate a measure of statistical distinctiveness 1010, corresponding to a salience measure 1011 of document set 1002 relative to document set 1003.

Figure 12:
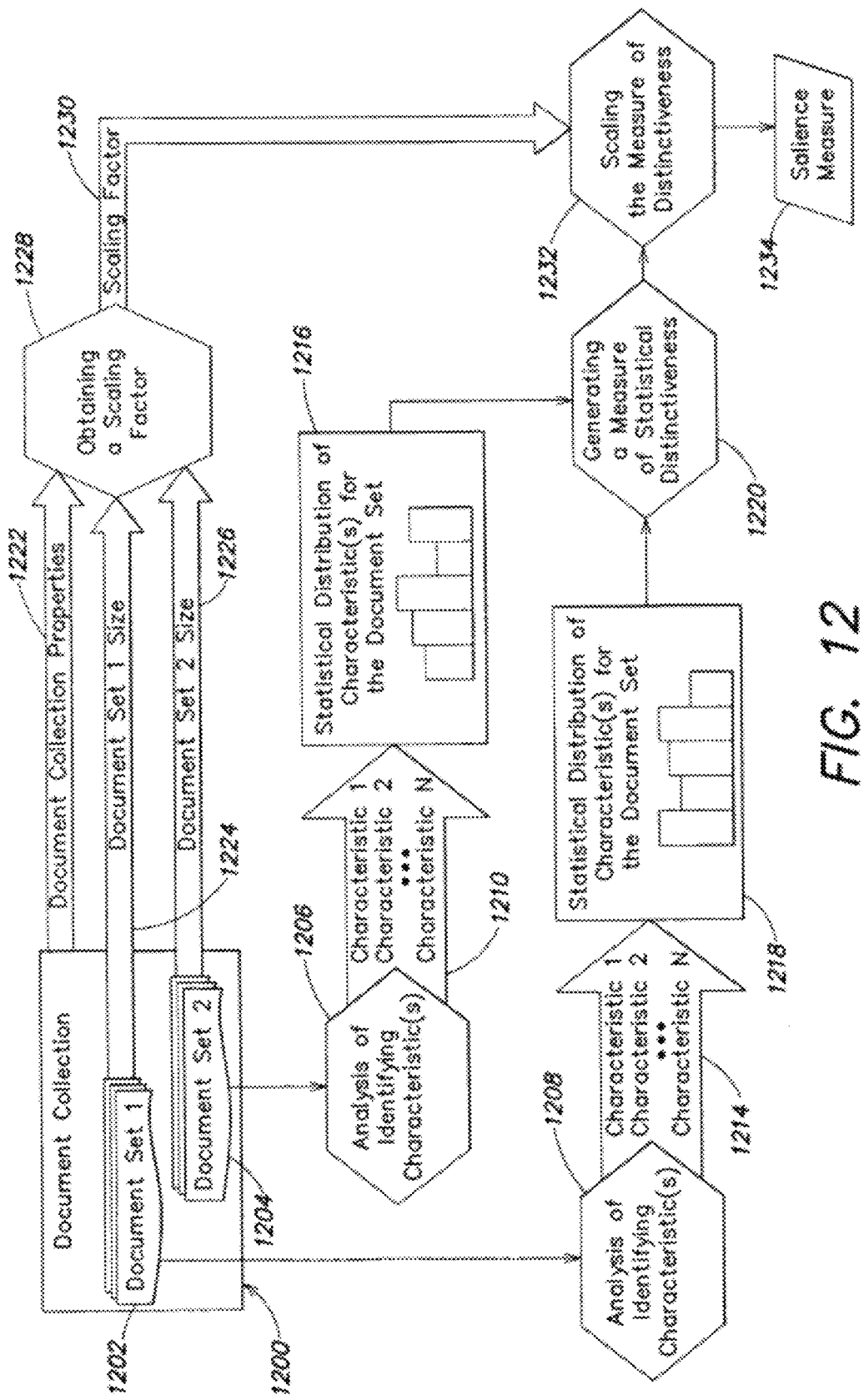
FIG. 12 shows a logical diagram for determining a salience measure according to another embodiment of the present invention.

FIG. 12 shows a logical diagram of another system and method for deriving a normalized salience measure. Given a collection of documents 1200, a salience measure may be obtained showing the distinctiveness of one document set 1202 compared to another document set 1204 from within the collection of documents. Properties from the document collection are extracted 1222, as is set size information related to a first document set 1224 and a second document set 1226. The collection properties and the set sizes are used to obtain at 1228 a scaling factor 1230 to account for set sizes. The first and second document sets are analyzed at 1208 and 1206 to determine identifying characteristic(s) 1214 and 1210, and statistical distributions are determined at 1218 and 1216 for the characteristic(s), to generate a measure of statistical distinctiveness at 1220. The measure of statistical distinctiveness is scaled using the determined scaling factor at 1232 to derive a normalized salience measure 1234.

Figure 2A:
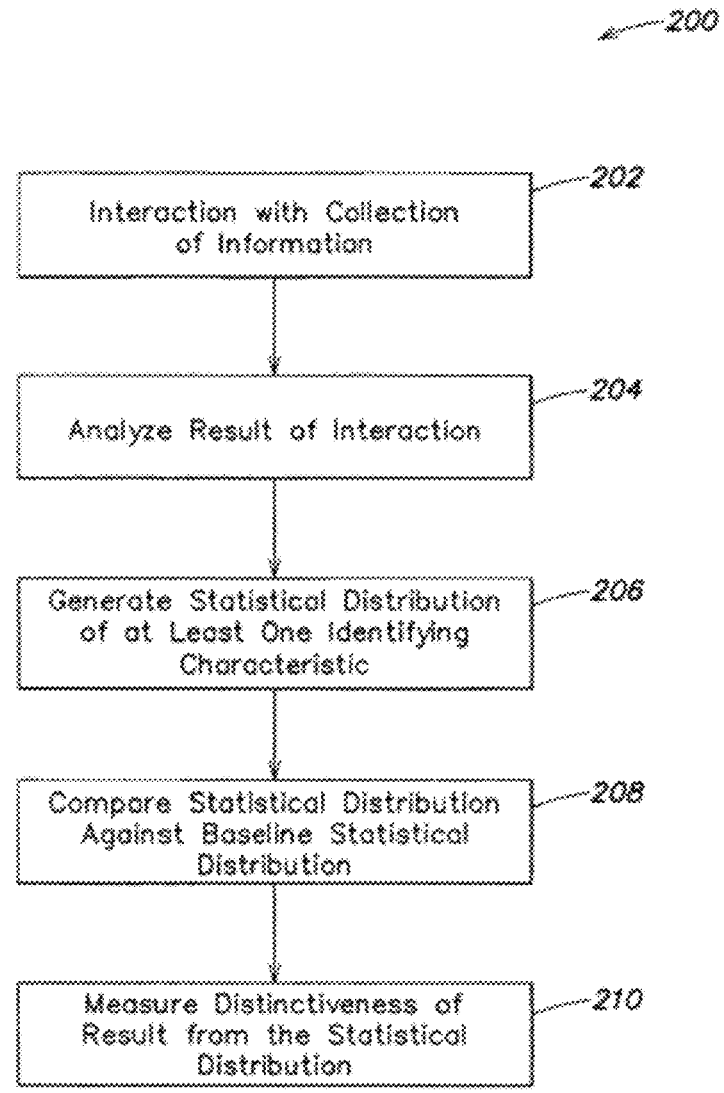
FIG. 2A shows a process for generating a measurement of distinctiveness of a result according to another embodiment of the present invention.

Referring to FIG. 2A, shown is an example of a process, 200, for generating a measurement of distinctiveness of a result obtained from interaction with a collection of information. At step 202, an entity interacts with a collection of information. Typically an entity represents a user or users, but may be a process or search engine, or other mechanism that operates on a collection of information to return a result. One should appreciate that a collection of information can be virtually any collection of electronic information. Typically, a collection of information comprises information stored for later use/access, although transient data sets may be accommodated using techniques that maintain the coherence of the data set for the duration of the query interaction. Examples of such techniques include data snapshots, generational versioning, and time-stamping.

In one example, the collection of information is a database containing records that a user is performing searches on. The interaction of step 202 includes, but is not limited to, searches performed by the user, navigation within the database records (navigation may occur through intermediaries—for example, links in a web-based interface), queries executed by a query engine, sorts, and selections on the database. Interaction with the collection of information should encompass the subclass of all possible interactions with the collection of information where a result is returned from within the collection of information. In another example, the collection of information is a set of documents. As discussed, documents can be thought of in traditional sense as discrete text files that may also be associated with metadata, such as a name, author(s), date of creation, a subject, date of modification; however, the notions of a set of documents and a document itself are intended to be more comprehensive, and should be understood to include other addressable and selectable media, including, for example, non-textual data, such as sound and visual recordings, database records, and composite entities such as might be described using HTML and XML encoding. Individual documents and collections of documents may take many forms, including file systems, relational databases, hypertext collections (such as the World Wide Web), or the like.

In another example, interaction at step 202 with the collection of information comprises browsing by a user through an interface: the interface requests and receives information from the collection of information in response to the user's browsing, and the process comprises the interaction between the user and the collection of information. In one embodiment, the collection of information includes collections of faceted information. A faceted information space comprises a collection of information where each unit of information contains information identifying it, i.e. a facet; alternatively, a facet may be associated with a unit of information rather than contained within. A facet may comprise, to provide some examples, an identifier of data content, data context, meta data, tags, and/or source information. A facet may be a dimension, field, and/or attribute within a database. A facet may also be a record or n-tuple. In one example, a database for a winery stores records in a database regarding price, type of wine, region, and each record alone or in combination may comprise a facet. Stated generally, a facet is a means of categorizing information. The concept of information facets is derived from library science—faceted classification addresses the problem that a single taxonomy is too rigid to categorize the world. Facets are often referred to as dimensions, fields, or attributes comprised of a collection of values.

Typically interaction with the collection of information will return a subset of the information contained in the collection, where that subset may range from zero results to the entire collection. It should also be noted that elements of the collection may represent excerpts or elements of larger informational data outside the collection; thus the total amount of information represented may be substantially greater than the amount of information directly available for interaction in the collection alone.

At step 204, the result of the interaction with the collection of information is analyzed. According to some embodiment's, step 204 may occur at a number of times during the course of interaction with the collection of information, and repetitive interaction, sequential, and concurrent interactions are contemplated. According to one embodiment, the analysis on a result includes determination of at least one identifying characteristic within the set of results. The at least one identifying characteristic determined at step 204 may depend on the makeup of the collection of information. In one example, the collection of information comprises "traditional" documents, with text, author(s), and a subject, for example. The at least one identifying characteristic may be determined based on the text, the author(s), and the subject of the documents. In one example, identifying characteristics correspond to keywords in the text of a document, author(s) of documents, the subject of the document, and in another example the identifying characteristic corresponds to any combination thereof.

The determination of the at least one identifying characteristic may include analysis of any identifying information regarding the elements of the collection of information. In one example, metadata associated with the elements of the collection of information are analyzed. In one embodiment, the analysis of the result of the interaction with the collection of information includes consideration of date of creation, date of modification, date of last access, title, file extension, file type, file size, file composition, author(s), editor(s), keyword, containing specific information, containing a specific element, subject(s), summary information, derivable information, all or part of the file name, word or phrase within a file, location on storage media, physical location, relational information, non-textual data, as some examples. One should appreciate that information associated with and/or derivable from electronically stored information can include any information that may be stored and associated with a collection of information, including information stored by operating systems and information typically considered "metadata" and may also include other system information regarding more fundamental operations/information on electronically stored information, for example, memory location, operating system access information, associated driver and device information, as some examples. Any of the foregoing may also comprise alone or in combination a facet of information that may be used to analyze a set of results obtained from interaction with a collection of information.

Figure 2B:
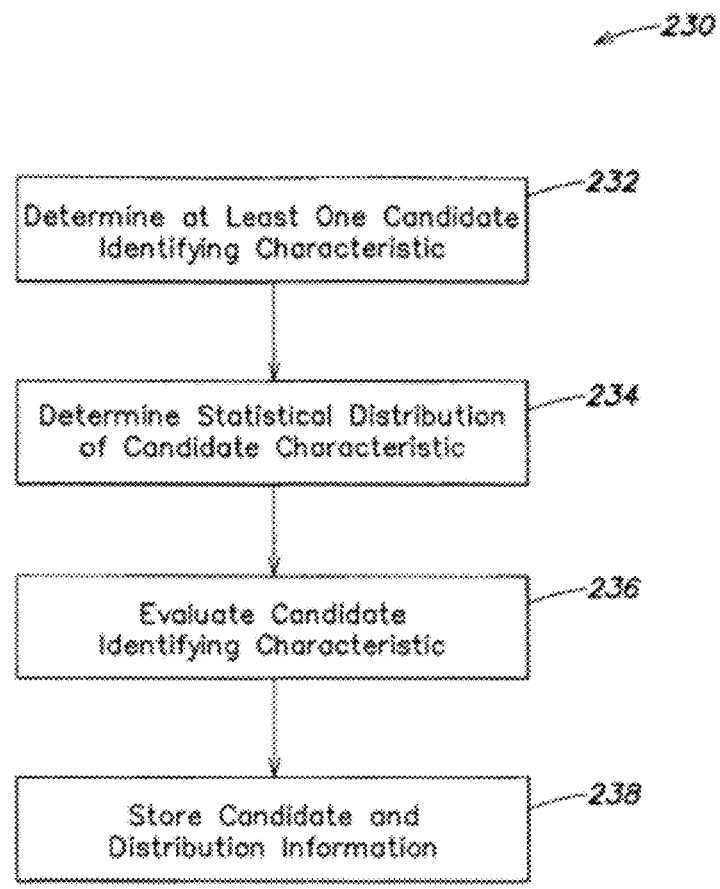
FIG. 2B shows a process for process for determining at least one identifying characteristic according to one embodiment of the present invention.
Figure 2C:
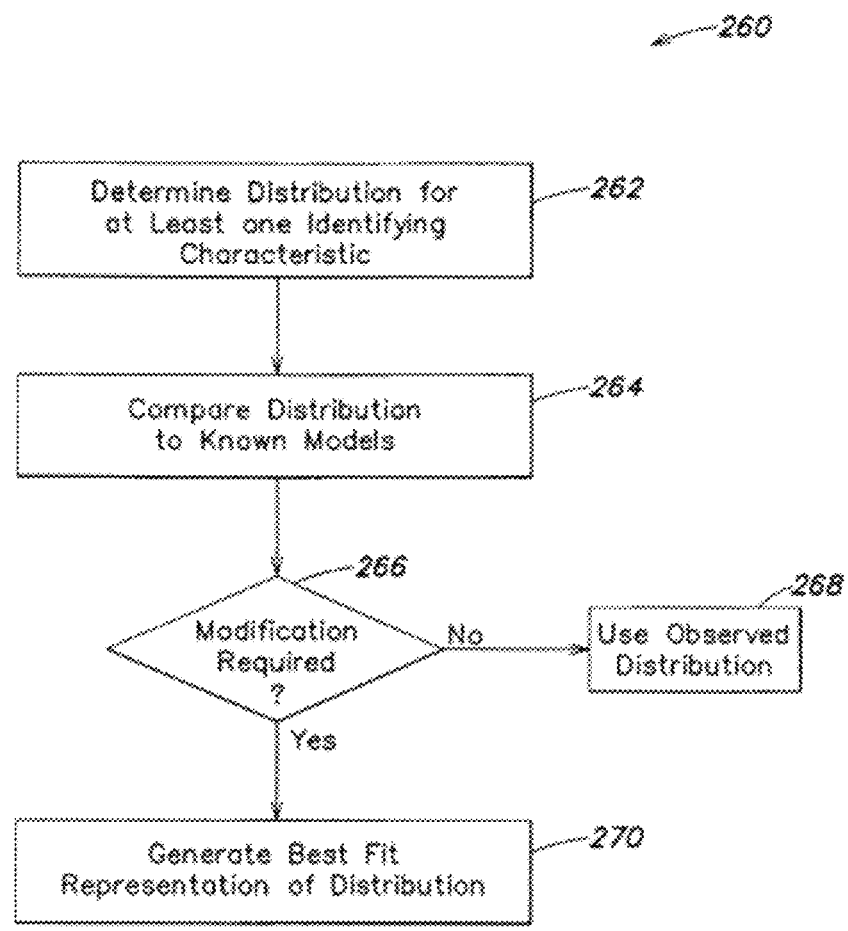
FIG. 2C shows a process for modeling the statistical distribution of an identifying characteristic according to one embodiment of the present invention.

The analysis of the result of the interaction, at step 204, may include another process, for example, process 230 FIG. 2B, wherein a candidate identifying characteristic is determined for elements of a set of results, at 232. The determination of a candidate identifying characteristic may be based on review of all possible information associated with the interaction between an entity and a collection of information. In one example, the interaction comprises queries executed against a database (collection of information). The content of the query may determine the identifying characteristic(s) employed during, for example, process 200, for generating a measurement of distinctiveness of a result obtained from user interaction with a collection of information. The context in which the query was executed may also be a factor in determining identifying characteristics.

Referring to FIG. 2B, the statistical distribution of the candidate characteristic within the result set is determined at 234, and the candidate identifying characteristic is evaluated for use in determining the distinctiveness of the result set. In one example, certain characteristics are expected to be found in a result set, and those characteristics are used in the analysis of the result set to determine identifying characteristics. In one particular embodiment, the result set is obtained from collection of information pertaining to a winery, and the expected characteristics may include the type of wine, a year of bottling, the year the grapes were grown used to make the wine, weather patterns for the growing season, information on soil (nutrient content, etc.) in which the grapes were grown, location, among a number of other characteristics on which information is stored and/or associated. These expected identifying characteristics may be established as a default, and used automatically; also, the expected characteristics may be learned through multiple interactions with the collection of information over time. In one embodiment, learned identifying characteristics are automatically evaluated in addition to candidate characteristics obtained from the interaction with the collection of information. In another embodiment, subsets/combinations of the expected characteristics may also be used. One should appreciate that "expected" characteristics need not be used, and the interaction between an entity and the collection of information may exclusively determine the identifying characteristics that are used, or may contribute to the determination of the identifying characteristics that are used in determining the distinctiveness of a particular result set.

The determination of the statistical distribution for a candidate identifying characteristic at 234 may involve manipulation of the result set that was returned. In one example, a representation of the result set is used that is adapted to statistical manipulation. In another example, the generated statistical distribution is an approximation of the incidents of the identifying characteristic. In one example, the statistical distribution is determined using sampling on the result set; in another example, modification of the result set is permitted without need for recalculation of the statistical distribution. Other approximation techniques include examining a similar result set(s) and the statistical distribution(s) obtained on the similar result to provide an expected distribution for the result set being analyzed. In one example, the statistical distribution is univariate, that is, based on one variable. In another example, the statistical distribution is multivariate, that is, based on more than one variable.

Referring again to FIG. 2B, using the statistical distribution, obtained at step 234, candidate identifying characteristics can be evaluated by modeling and/or evaluating the result set using the candidate, at 236. In one example, thresholds are established to determine if an identifying characteristic(s) is worth the computational effort needed to derive the distribution for the characteristic. Some potential identifying characteristics may be excluded in advance, as for example, the word "the" in a document may be particularly unsuited to identifying distinctiveness.

Information on the statistical distribution of candidate identifying characteristic(s) is stored at step 238. In one embodiment, the stored information is used as part of a process for measuring the distinctiveness of a set of results. In one example, the stored information may be accessed as part of process 200, shown in FIG. 2A, during steps 204-206. In some embodiments, only portions of the distribution information related to candidate identifying characteristic(s) are stored. The storing of distribution information may involve a determination regarding the value of the statistical information. In one example, a determination is made based, at least in part, on the computational effort involved in generating the statistical information. In another embodiment, the value of the statistical information is compared for a plurality of candidate identifying characteristics and the statistical information is stored based on the comparison. Typically, information requiring greater computation effort is treated preferentially over information of less computational effort; however, other factors may be used in the determination. In one embodiment, factors include, for example, computational effort, age of the information, resource usage, or a combination thereof. One should appreciate that process 230, is an optional process, and one that is not necessarily invoked.

With particular reference to process 200, FIG. 2A, in a typical embodiment, interaction with collection of information, 202, may occur after a baseline statistical distribution(s) is determined for the collection of information, for example, as part of process 300, shown in FIG. 3A (discussed in greater detail below). In step 204, analysis of the result of the interaction yields identifying characteristics in common with those of already determined baseline distributions. In another embodiment, identifying characteristics obtained from the interaction with the collection of information are used to obtain a baseline distribution either at the time of the interaction or thereafter. In one example, process 330 FIG. 3B (discussed in greater detail below), determines a baseline statistical distribution for an identifying characteristic from the collection of information. The identifying characteristic is determined from the result of an interaction with a collection of information, for example, a result returned as part of process 200, FIG. 2A.

Referring again to FIG. 2A, process 200, continues with the generation of a statistical distribution for at least one identifying characteristic within the result set returned from interaction with the collection, at 206.

As discussed above, the at least one identifying characteristic may be determined through a sub process, for example, using process 230; in conjunction with the sub-process, a statistical distribution may be calculated and stored for the at least one identifying characteristic. In one alternative, the identifying characteristic(s) used to analyze the result set is determined from existing distributions of identifying characteristics for the collection of information as a whole. In another alternative, such characteristic(s) may be determined from other sets, including random samples of the collection of information as a whole and random samples of other sets which, for example, may have been obtained during previous process invocations. In one embodiment, generation of the statistical distribution for the at least one identifying characteristic, 206, involves retrieval of a stored statistical distribution. Optionally, (not shown) a check may be performed to determine if it is appropriate to use the stored values or if a new calculation should be used. In one example, it is determined that the number of changes to the underlying set exceeds tolerance for changes, and the statistical distribution for the at least one identified characteristic is generated at step 206. In another example, no data exists on the at least one identifying characteristic, and the statistical distribution is generated at step 206. The determination of the statistical distribution for the at least one identifying characteristic may involve manipulation of the result set that is being analyzed. In one example, a representation of the result set is used that is adapted to statistical manipulation. In an embodiment that uses a representation of the result set, a statistical distribution is determined at 206. In another example, the statistical distribution is obtained based, at least in part, on text, metadata (e.g. categories assigned to the document), or other information derived from the elements of the result set. In another example, the statistical distribution comprises an approximation of the incidents of the at least one identifying characteristic. The statistical distribution may be determined using sampling on the result set; in another example, a best fit approach is used to model the distribution according to a known distribution curve. In yet another example, regressions are performed to determine a best model for the statistical distribution.

In one embodiment, a determination may be made that a present result set is substantially similar to a prior result set with stored distribution information. The distribution information obtained may be employed without recalculating the distribution information for the present result set to save computational effort. In other words, similar results generated from interactions with the collection of information may be used to provide statistical distributions for at least one identifying characteristic where there is substantial overlap between the present result set and one that had previously been determined without requiring recalculation. It is realized that permitting some variation between the present result set and one that had previously been analyzed without undergoing expensive computation may improve some implementations and, in particular, reduce computational burden and expense. In some embodiments, a threshold is established for determining when recalculation is required. The threshold may be based on a specific number of differences and/or a percentage of difference with respect to the result sets (for example, percent difference in size).

Other approximation techniques that may be used at 206 for generating a statistical distribution include, but are not limited to, examining a similar result set(s) and the statistical distribution(s) obtained on the similar result set to provide an expected distribution for the at least one identifying characteristic being analyzed.

Step 206 may include another process for obtaining a model of the distribution for the result set adapted to statistical manipulation. In one example, process 260 is called to model the statistical distribution of the at least one identifying characteristic within the result set. At step 262, a statistical distribution is obtained for the at least one identifying characteristic. At step 264, the measured/observed distribution is compared to a known distribution curve and/or model. Known distributions may be in the form of parameterized functions axb, as one example. Such known distributions may be calculated in advance, calculated offline, obtained through regression analysis, calculated from a fitting procedure, and may be determined on demand. At step 266, it is determined if modification to the measured/observed statistical distribution is required. At step 266(NO), it is determined that the measure distribution correlates sufficiently to a smooth distribution curve that modification is unnecessary, and the measured/observed distribution is stored for later use at 268.

At step 266(YES), it is determined that modification should be performed on the measured distribution. Modification of the measure/observed distribution may take many forms. In one example, modification of the measured statistical distribution takes the form of "smoothing" of the distribution to eliminate singularities. Singularities may result from operations that employ logarithms and division, since such functions may result in values of infinity for a particular portion of a distribution, precluding numeric computation of the statistical distribution through the region including the singularity. In one example, singularities are eliminated by replacing the values with appropriate values. In another example, a zero weight is replaced by a small but non-zero weight. In another example, the value may be replaced by a value characteristic of the distribution surrounding the singularity. One should appreciate that the discussion of smoothing the measured/observed distribution may take place independently of the steps discussed for process 260. A number df embodiments will realize improvements in processing by incorporating smoothing of distributions where singularities are present. The discussion of the use of smoothing should not be interpreted to be limited to the process discussed or read to require the steps identified in order to provide for smoothing of distributions. In one particular example, even where process 260 is not used, smoothing may be invoked as part of a process for generating a measurement of distinctiveness of a result obtained from user interaction with a collection of information, for example at part of step 206.

Modification of the distribution may take the form of a fitting process, where the observed/measured distribution is fit to a known model of a statistical distribution. Modification of the statistical distribution may also involve approximation of the distribution, for example, by examining similar result sets to provide expected distributions in order to bypass analysis of the primary result set (not shown). At step 270, a best fit representation of the distribution is obtained and may be used for further analysis of distinctiveness. In one example, the best fit representation is used as part of a larger process for generating a measurement of distinctiveness of a result obtained from user interaction with a collection of information.

Using the statistical distribution for the at least one identifying characteristic, a measure of distinctiveness for the result set is determined at step 208. The measure of distinctiveness may be determined from a univariate distribution, that is, based on one value (i.e. identifying characteristic). In one embodiment, the univariate distribution is assigned a weight value to generate the measure of distinctiveness. In another embodiment, the weight value constrains the distribution to reflect a probability distribution; in other words, the sum of the weights for the result set is equal to 1. In an embodiment where the result set comprises textual information and the at least one identifying characteristic is generated from words within the text, the weights associated with the at least one identifying characteristic may reflect the frequency of the words in the result set as a fraction of the total number of words in the result set.

Examples of functions that may be used to derive a distinctiveness measure include, but are not limited to: Kullback-Leibler divergence, Euclidean (L2) distance, Manhattan (L1) distance, Hellinger distance, diversity difference, cosine difference, Jaccard distance, Jenson-Shannon divergence, and skew divergence. Also, similarity functions and correlation measures, such as the Pearson correlation coefficient, Dice coefficient, overlap coefficient, and Lin similarity, can be converted into distinctiveness functions by inverting their sense (i.e., a higher similarity score implies a smaller difference between the distributions). Other functions familiar to those skilled in the art of statistical methods can be incorporated into the disclosed processes and methods.

In another embodiment, the measure of distinctiveness may be determined from a multivariate distribution, that is, based on a set of values (i.e. identifying characteristics). In one example, values are represented by n-tuples, that is, relations based on a group of values. The multivariate distribution may also be based on multiple sets of multiple values. In one example, the result set is made up of documents comprising subject, type, and an author, thus, a set of values corresponds to each subject, type, and author. In one implementation values are represented by both the presence and absence of the value. For example, if a value(s) is present in 60% of the elements of the analyzed set, the absence of that value(s) occurs in 40% of the elements of that result set.

As discussed above, correlated values represent distinct challenges in determining identifying characteristics and the resulting measure of distinctiveness. In one example, certain identifying characteristics have too many dependencies to appropriately model the statistical distribution. In one example, the number of dependencies makes the calculation and/or approximation of the statistical distribution intractable. One should appreciate that steps 206 and 208 may take place simultaneously, and, in one example, occur as one step, rather than as discrete steps.

Process 200 continues at step 210, and the measure of distinctiveness obtained for the result set is compared against a baseline measure of distinctiveness. A baseline measure for distinctiveness may be predetermined before process 200 begins, or a baseline measure of distinctiveness may be generated on demand at step 210. The baseline measurement for distinctiveness provides a comparison measurement to generate a relative score of distinctiveness for a particular set of results obtained from interaction with a collection of information. In one example, the baseline measure is derived from the statistical distribution of at least one identifying characteristic taken from the collection of information as a whole. In another example, the baseline measure is determined from sets of varying sizes randomly sampled from the collection of information. In one alternative, using a known result set size, random samplings may be obtained from the collection of information of the same or similar size, and a distinctiveness scoring determined for the random sampled sets to generate a baseline measure. In one example, process 300 may be invoked to determine a baseline measure of distinctiveness.

Figure 3A:
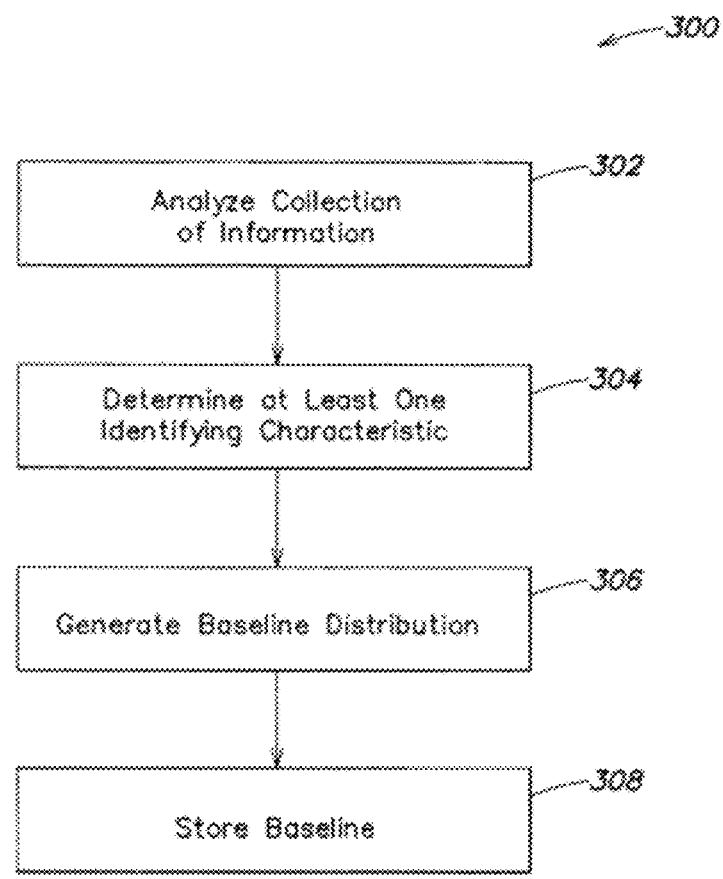
FIG. 3A shows a process for determining a baseline distribution according to one embodiment of the present invention.

Referring to FIG. 3A, a collection of information is analyzed at step 302 to determine an identifying characteristic, 304, on which to generate a statistical distribution at 306. According to one embodiment, a collection of information comprises a set of documents that is analyzed, 302, to obtain identifying characteristics, 304, to generate a baseline distribution, 306, that can be stored, 308, for later/concurrent comparison to other measurements of distinctiveness to ascertain the distinctiveness of, for example, a result set derived from a collection of information. In one embodiment, the distribution can be based on document text, metadata (e.g., categories assigned to the document), or any other information derived from the documents in the collection of information. In one embodiment, the distribution can be approximate, as long as it is representative. For example, a result set of documents can be examined for term or phrase frequency, and that frequency can be used as the statistical distribution model for the result set of documents.

In an embodiment where the distribution generated at 306 is approximate, another process may be executed to model the distribution. In one example, process 260 is executed to generate an approximation of the baseline distribution. In another example, process 260 is used to determine if the observed/measure distribution is amenable to statistical manipulation without modification. One should appreciate that a separate process need not be executed, and the functions described in process 260 may be incorporated into process 300, for example, as part of step 306.

In one embodiment, a baseline distribution for a plurality of identifying characteristics is obtained by repetition of process 300, although one should appreciate that multiple instances of process 300 may operate concurrently, each analyzing a different identifying characteristic and generating a baseline distribution for either the collection of information as a whole, or a subset of the collection of information. In one example, the baseline distribution is determined for a different result set obtained through interaction with the collection of information.

According to process 300, step 304 may be determined at, before, or after interaction with a collection of information takes place. In one example, the identifying characteristics are determined before interaction with the collection of information takes place and the determination of identifying characteristics may include analysis of candidate identifying characteristics. Such analysis may take part as part of another process, for example as process 230. Process 230 may be executed against the entire collection of information, or subsets of the collection of information to determine candidate identifying characteristics used to generate a baseline distribution, for example in process 300 at 306.

Figure 3B:
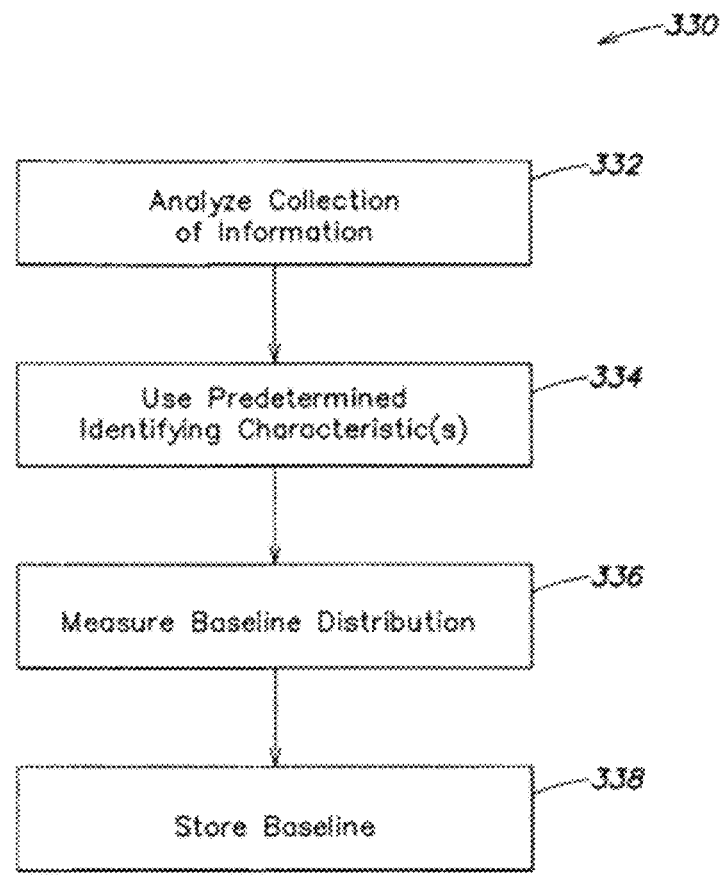
FIG. 3B shows a process for generating a baseline statistical distribution for an identifying characteristic according to another embodiment of the present invention.

Referring to FIG. 3B, shown is a process 330 for generating a baseline statistical distribution for an identifying characteristic that has already been determined. The identifying characteristic may have been determined as part of previous execution of a distinctiveness measure, or may be derived from a concurrently executing query, as examples. At step 332, the collection of information is analyzed using a predetermined identifying characteristic at 334. A baseline distribution is determined for the identifying characteristics at 336 and stored at 338. In one embodiment, the baseline distribution is determined against the collection of information as a whole. In another embodiment, the baseline distribution is determined from subsets of the collection of information. In one example, the subsets may be determined from random samplings of varying sizes taken from the collection of information. In another example, subsets may be determined from result sets obtained through interactions with the collection of information.

A scoring of the distinctiveness of a particular result of an interaction with a collection of information through, for example, process 200 provides many options in governing the interaction between end users and collections of information; in particular, the distinctiveness measure may be used to, for example, improve the result delivered to an entity interacting with a collection of information, determine similar result sets of interest to the entity/end user, provide feedback regarding the interaction with the collection of information and potential suggestions for improvement, generate options for modifying, expanding, or reworking the interaction, among other options discussed in greater detail herein.

Using a Distinctiveness Measure to Improve User Experience

A distinctiveness measure may be used to guide query interpretation. In one embodiment, a user may enter queries by way of a text box, where the search intent of such queries may be open to multiple interpretations. In another embodiment, the user may have access to a formal query language, such as SQL, but may nonetheless be unable to consistently formulate queries that clearly communicate intent.

By applying a measure of distinctiveness (e.g., using the salience measure described herein), an information access system can evaluate multiple interpretations of a user's input and determine which of these possible query interpretations lead to interesting queries. By culling the interpretations with low distinctiveness measures, the system can offer a clarification dialogue that offers the user the various high-distinctiveness interpretations as options. In some embodiments, the system may also cluster similar interpretations by computing the distinctiveness of query interpretations relative to one another.

In another aspect of the invention, a distinctiveness measure may be used to improve the summarization of a set of documents. In some embodiments, the values associated with the most significant contributions to the distinctiveness of a document set (e.g., a measure based on relative entropy, where the measure sums contributions associated with different values) may be presented to the user as part of a summary view of that document set. Because distinctiveness can be measured relative to any baseline distribution, the baseline can be selected to reflect the user's context. In one embodiment, a user submits a query to a data storage and retrieval system, which returns a query result set with associated statistical distributions for analysis. A calculation for the distinctiveness score of the query result set is made relative to a baseline distribution, in such a way that the system may subsequently retrieve information regarding the contribution of individual statistical distribution components to the result. The degree of contribution of individual components to the overall distinctiveness score of the query result set may be used to generate summary views based on relative contributions. The system returns a summarized view of the result set to a user.

Figure 18A:
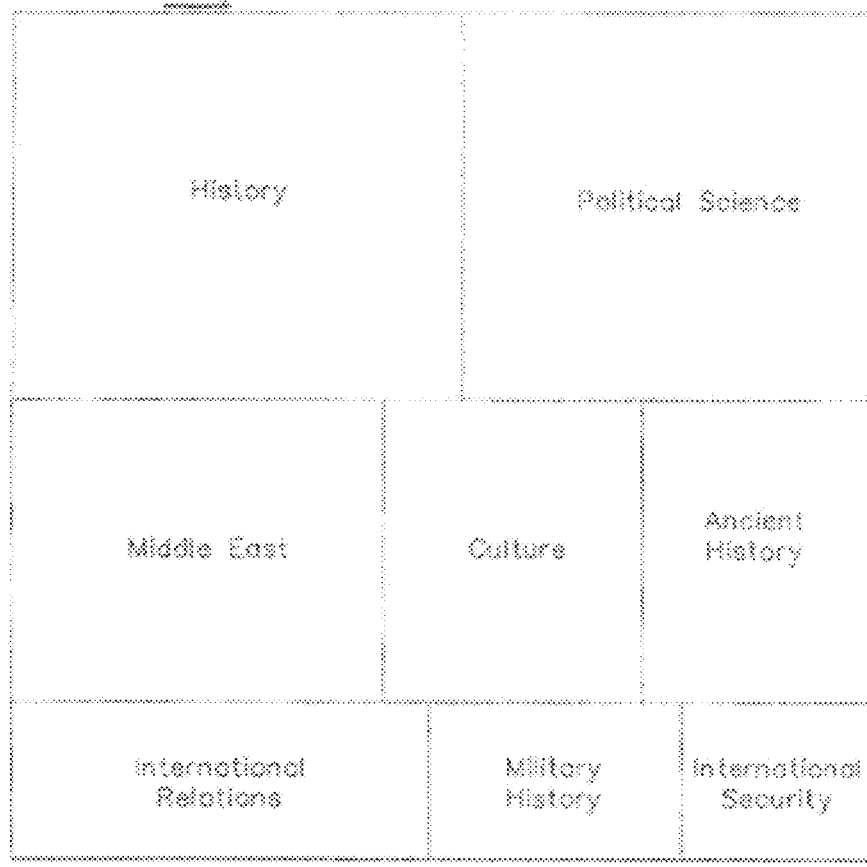
FIG. 18A illustrates a user interface presenting a summarized view to a user according to one embodiment of the present invention.

FIG. 18B illustrates a user interface presenting one form of summarized view to a user. The used entered a text based search into a search engine interface. The search was executed and returned a large number of results. Based on a distinctiveness measure, the results generated by the search were summarized, highlighting the contributors to the distinctiveness score according to their contribution. Thus, for example, "Presidential Elections (US)" is highlighted for user review based on its contribution to the distinctiveness score of the result set. Highlighting may take many forms, for example, changed font, bold, underline, bordered, background, texture, and size, among other options.

In another aspect of the invention, a distinctiveness measure may be used to guide the generation and presentation of query refinements. By definition, a query refinement is intended to take the user to a state that is different than the current query context (i.e., result set for the current query). Given a set of possible query refinements, the system can evaluate their distinctiveness relative to the current context, as well as relative to the overall document collection or any other baseline. By culling the refinement candidates with low distinctiveness measures, the system can offer a clarification dialogue that offers the user the various high-distinctiveness refinement candidates as options. In some embodiments, the system may also cluster similar refinement candidates by computing the distinctiveness of refinement candidates relative to one another.

FIG. 23 illustrates a user display indicating potential improvements for user navigation/search/querying based on distinctiveness score analysis. In one example, the user's search was unconstrained by location of search. The elements of the collection of information on which the user is searching may have been grouped in segments based on distinctiveness score, in which case, the segments that would generate more results with higher distinctiveness scores are identified, in one example at 2302. Where many options exist for modifying the search to achieve more distinct results, the similar options (that is, options that may be related to a certain interpretation) may be grouped together at 2302 and 2304. One should appreciate that many options may be summarized and presented.

In another aspect of the invention, the system can display values that are estimated to have high utility for summarizing a set of documents. In some embodiments, the estimated utility of a value for summarizing a set of documents may be proportional or otherwise positively correlated to the frequency with which the value occurs in the set of documents. In some embodiments, the estimated utility of a value for summarizing a set of documents may be proportional or otherwise positively correlated to its contribution to the salience of the set of documents relative to some baseline set, such as a corpus of which the set of documents represents a subset. In some embodiments, the estimated utility of a value for summarizing a set of documents may be inversely proportional or otherwise negatively correlated to the salience of the subset of the set in which the value occurs, relative to the set of documents.

In another aspect of the invention, the system can display values that are estimated to have high utility for refining a set of documents. In some embodiments, the estimated utility of a value for refining a set of documents may be a function of the frequency with which the value occurs in the set of documents whose size has a mean value, such as half of size of the set of documents or the square root of the set size. In some embodiments, the estimated utility of a value for summarizing a set of documents may be proportional or otherwise positively correlated to the salience of the subset of the set in which the value occurs, relative to the set of documents.

In another aspect of the invention, the system can display both summarizations and refinements of a set of documents via a unified interface. In a particular embodiment, a visual interface, such as a heat map, can be used to display the values that represent summarizations and refinements, assigning different colors from a particular color range to each to indicate different values of the distinctiveness measure, as may be seen in FIG. 18A. The same interface can utilize other visual metrics; for example, size of the document set that corresponds to a particular refinement may be communicated by the size of the visual element.

In one example, the elements of the collection are not already grouped, and the user's search triggers analysis of the collection of information based on identifying characteristics within potential results returned to the user and derived distinctiveness scores. In one example, the analysis may identify possibilities of narrowing the search based on the analysis of distinctiveness as part of the process of returning the result of the user's search.

In one aspect, as described herein, the distinctiveness of a set of documents that match a query (i.e., the query results) is used to determine query ambiguity. The distinctiveness can be relative to the overall document collection or some other baseline, such as the results of previous query in a context of iterative query reformulation. This aspect of the described subject matter is also highly flexible, allowing for distinctiveness to be measured relative to any baseline set of documents.

Typically information retrieval systems serve as an interface between human end users and automatically indexed collections, although it is equally valid to consider such IR systems being controlled by an automated process performing a sequence of actions. Thus, a query may represent a user's interaction with the IR system, or an equivalent operation as performed by an automated process in a so-called "offline" or non-user-interactive mode. In one embodiment, the primary effectiveness measure of an IR system is the extent to which it enables users to find relevant or useful information in the collection it has indexed.

Figure 6:
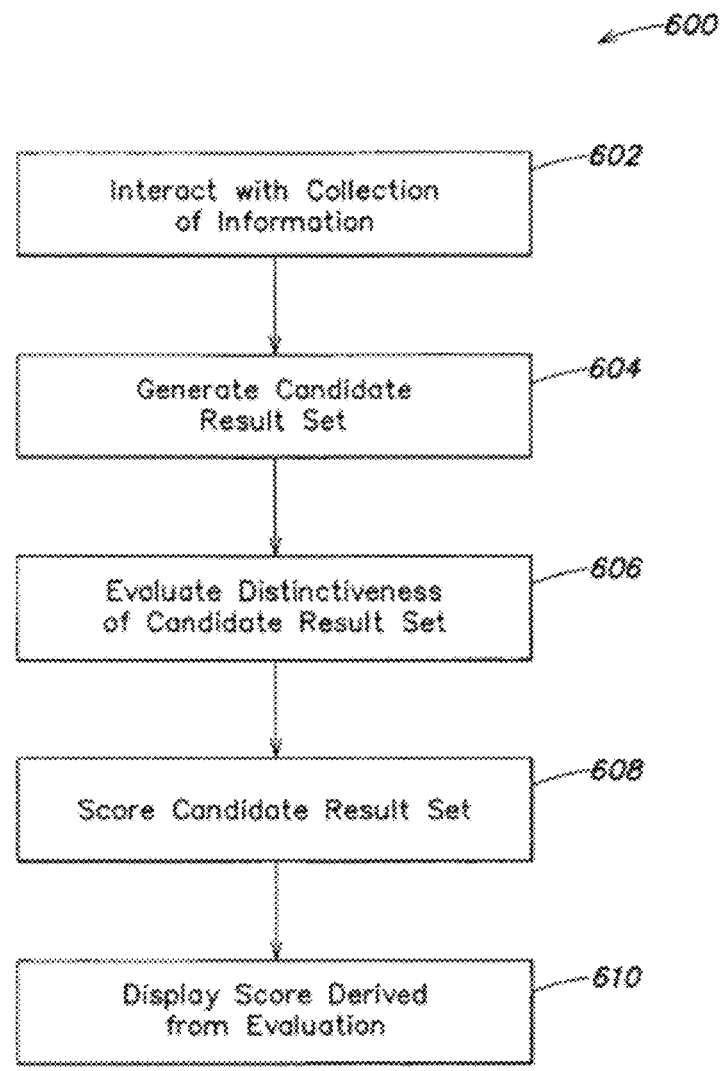
FIG. 6 shows a process for improving user interaction with a collection of information according to one embodiment of the present invention.

Referring to FIG. 6, shown is an example of a process, 600, for improving user interaction with a collection of information. One should appreciate that the improvement of user interaction applies equally to improvement of results delivered to, for example, an automated process as discussed above.

At step 602, an entity interacts with a collection of information. Typically an entity represents a user or users, but may be a process or engine, or other query mechanism that operates on a collection of information to return a result. One should appreciate that a collection of information can be virtually any collection of electronic information. Typically, a collection of information comprises information stored for later use/access, although transient data sets may be accommodated using techniques that maintain the coherence of the data set for the duration of the query interaction. Examples of such techniques include data snapshots, generational versioning, and time-stamping.

In one example, the collection of information is a database containing records that a user is performing searches on. The interaction of step 602 comprises searches performed by the user, and may include navigation within the collection of information, for example, browsing of database records (navigation may occur through intermediaries—for example, as links in a web base interface), queries executed by a query engine, sorts, and selections within the collection of information. Interaction with the collection of information should be read broadly and encompass interactions with the collection of information where a result is returned from within the collection of information.

In another example, the collection of information is a set of documents. As discussed herein, documents can be thought of in traditional sense as discrete text files but should also include other addressable and selectable media, and composite entities such as might be described using HTML and XML encoding. Individual documents and collections of documents may take many forms, including file systems, relational databases, hypertext collections (such as the World Wide Web), or the like.

In another example, interaction at step 602 with the collection of information comprises browsing by a user through an interface; the interface requests and receives information from the collection of information in response to the user's browsing, and sequence comprises the interaction between the user and the collection of information. In one embodiment, the collection of information may comprise a faceted information space, as discussed above. In yet another example, the collection of information comprises a database, and an entity interacts with the database via request for information within the database at 602.

In one example, an interaction with the collection of information will return a subset of the information contained in the collection at step 604, where that subset may range from zero results to the entire collection. It should also be noted that elements of the collection may represent excerpts or elements of larger informational data outside the collection, thus the total amount of information represented may be substantially greater than the amount of information directly available for interaction in the collection alone.

At step 604 a candidate result set is returned based on interaction with the collection of information. Rather than return the candidate result to an entity (ultimately to a user), process 600 provides for evaluation of a candidate result based on a scoring of distinctiveness of the candidate result, at 606. In one example, after a query is submitted to a collection of information which includes, for example, a database, a candidate result set is generated at 604. The candidate result set may be the result of an interpretation of the submitted query, as queries are often inherently ambiguous. The potential result may involve the generation of a plurality of result sets each representing a possible interpretation. At step 606 a distinctiveness score is determined for the potential result set. Step 606 may include separate processes for determining a distinctiveness score; in one example, process 100 may be used to return a normalized scoring of distinctiveness for a candidate result. In another example, process 100 is executed against each candidate result and the candidate results may be evaluated at 608 based on the distinctiveness score for each. In one embodiment, step 606 includes another process, for example, process 200, for determining a relative distinctiveness score of a candidate result set. One example includes using process 200 to return a relative distinctiveness score for each candidate result, and evaluation at 608 includes comparing the distinctiveness of each candidate result.

Based on the evaluation of the distinctiveness score of the candidate set an output is displayed at 610. In one example, the output includes recitation of the distinctiveness score accompanying the candidate result set. In another example, the output may include options for improving the interaction with the database accompanied by the candidate result. In another, a dialog may be initiated between, for example, an end user and a system on which process 600 is implemented. According to one embodiment, the dialog provides suggestions on how to improve the distinctiveness score of a returned result, informing the user on options that may be taken to modify, enhance, specify, or generalize, for example, a query being executed against the collection of information.

In one alternative, rather than indicating how to improve distinctiveness, similar candidate results may be presented. In one example, candidate results are grouped together and presented to a user as the displayed output at 610. A combination of groups of similar results and an indication of groups that achieved higher distinctiveness scores may also be displayed at 610.

In one embodiment, as part of the evaluation of the distinctiveness of a candidate set, a determination may be made regarding the contributions that certain elements of the result set of the interaction with the collection of information made to the distinctiveness score. For example, a user-submitted query may contain superfluous terms that contribute little or nothing to the distinctiveness of the query result set. A dialog discussed above with respect to step 610 may include suggestions on eliminating terms that don't significantly contribute to the distinctiveness of a candidate result. The dialog with a user may also involve multiple invocations of process 600, each invocation refining the interaction of the user with the collection of information. A user in response to a dialog presented at 610 may identify query terms that contributed little or no weight to an initial distinctiveness scoring, taking the interaction with the collection of information in an entirely new direction.

In one example, a distinctiveness measure is used to guide query interpretation. That is, a user may enter queries by way of, for example, a text box, where the few words he or she enters may be open to multiple interpretations. Alternatively, the user may have access to a formal query language, such as SQL, but may nonetheless be unable to consistently formulate queries that clearly communicate intent.

According to one aspect, by applying a measure of distinctiveness, an interaction with an entity can be improved by evaluating multiple interpretations of, for example, user's input to determine which of the possible query interpretations lead to interesting result sets. In one example, by culling the interpretations which lead to result sets with low distinctiveness measures, the user interaction with the collection of information is improved by offering a clarification dialogue, for example at step 612. In one example, the display of an output at 612 offers the user the various high-distinctiveness query interpretations as options to be selected. In some embodiments, the process may generate clusters of similar interpretations by computing the distinctiveness of query interpretations relative to one another.

According to another aspect, user interaction with the collection of information may also be tracked to identify patterns, i.e. relationships, between a user's intended interpretation of a query and one that would be suggested from an evaluation of distinctiveness of a candidate result. In one example, a user history may assist in a determination of the output displayed at 610.

The following provides additional details regarding various applications of the salience measure to improve user experience in interacting with data. These include, without limitation, guiding query interpretation, summarization, intelligent ranges, event detection, and hierarchy discovery.

Guiding Query Interpretation

Perhaps the biggest challenge for query interpretation is when the system has to infer the user's intent from a few words entered into a search box. Consider the problem of converting a sequence of words into a Boolean query. For example, a system can interpret the query computer science as computer AND science, computer OR science, or as the phrase "computer science". The system may include records that match the query terms in a title field, an abstract field, an author field, etc. The system may also allow one or more query expansion techniques, such as stemming and thesaurus expansion. In addition, further query modification techniques, such as spelling correction, are applicable. Combining all these options creates an explosion of candidate interpretations for a user's query.

Control over these options may be exposed to the user, but this approach is likely to overwhelm and confuse the user. For example, how does a user decide whether to search against the title or abstract field? The salience measure described herein allows the system to determine which of these possible query interpretations lead to interesting (i.e., in particular embodiments, more distinct from the overall corpus, or highly coherent) sets of results. By culling interpretations with low salience measures, the system can offer a clarification dialogue that provides the user the various high salience measure interpretations as options. Moreover, the system can cluster similar interpretations by computing their relative salience measures to one another.

Figure 16:
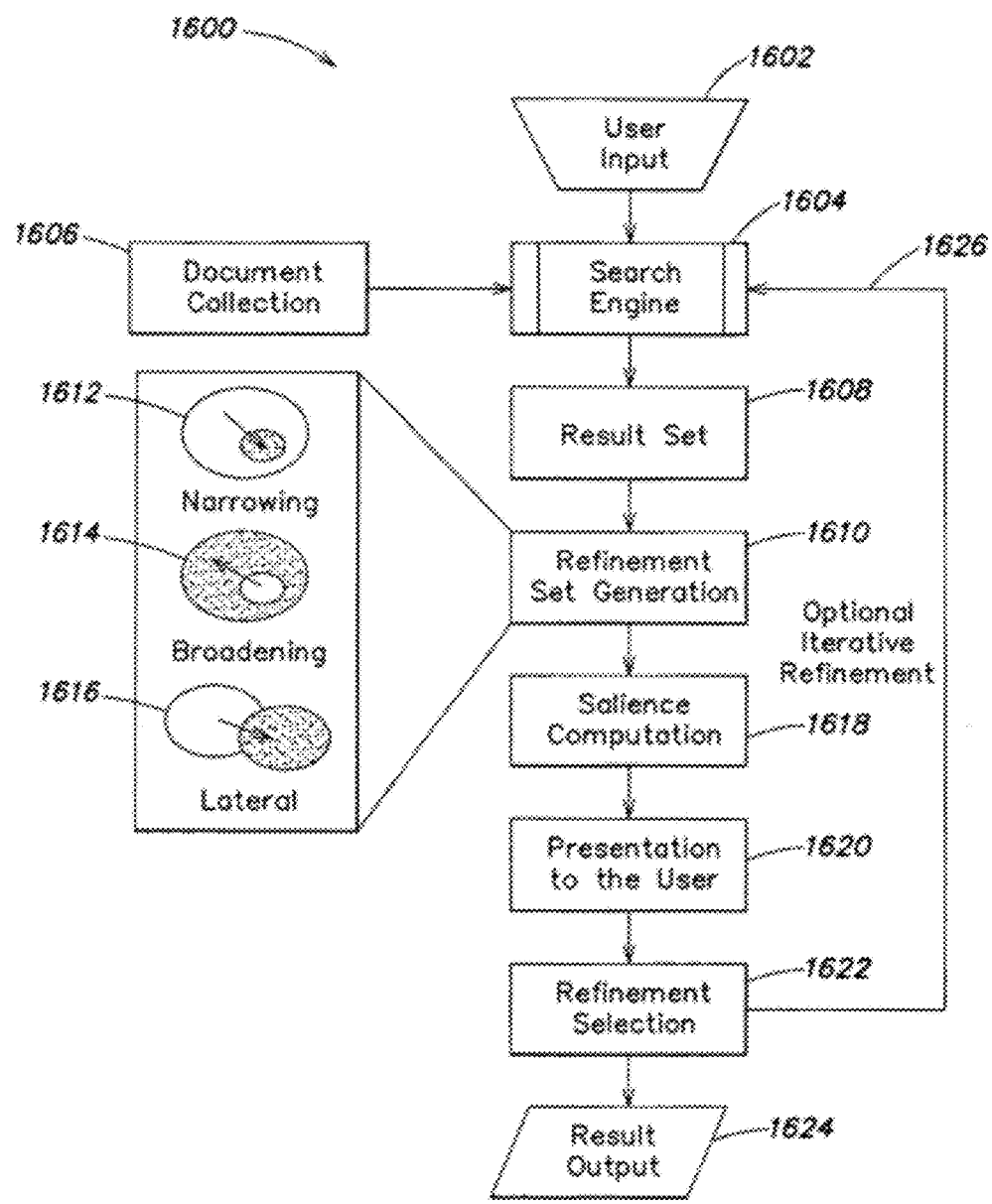
FIG. 16 shows a process for refining a returned result according to one embodiment of the present invention.

FIG. 16 illustrates an example process 1600, for refining a returned result according to one embodiment. An end user submits a raw query 1602 to a data storage and retrieval system 1604, possibly through another process or interface. The system determines possible interpretations, two examples being 1612 and 1614, for the query 1608. Each possible query is either performed or approximated to obtain statistical distributions of identifying characteristics for their respective result sets. An absolute measure of salience of the results set is determined for each query interpretation by the salience calculation module 1618; in other words, the salience measure for each interpretation is made relative to the collection of information in the data store as a whole. Optionally the query interpretations and their results (typically, summarized results) may be displayed to the user 1620, to allow user selection to control the determination of the most relevant result 1622 for optional refinement 1626; alternatively, the system may chose zero or more query interpretations based on salience scoring and display the results to the user.

FIG. 19 illustrates a user interface for displaying options regarding query interpretation and guiding. Here, a user entered a text search in an interface of a search engine; the salience score for the result set indicates that a number of options exist for improving (in this instance, presumably narrowing the space of returned results) the entered search. Candidate search terms (directed to different interpretations derived from the original search) are presented to the user. The presentation may optionally include the salience scores obtained for each possible set of results. Shown are links for the suggested modified queries to simplify the user's interaction, although one should appreciate that links need not be provided, and a user may be prompted to enter the additional terms rather than linking directly, as well as other options. The options presented in FIG. 19 provide just one example of how ambiguous searches can be potentially modified to improve user interaction.

In some embodiments, systems can utilize salience measure to perform more complicated query modifications, such as query generalizations and lateral searches.

Generalization and Lateral Search

The embodiment described above (Guiding Query Interpretation) utilizes a salience measure to compute informative narrowing refinements, for example, ways for the user to reduce the number of documents in the result set while guiding the user toward the subsets of the result record set that are more expressive of the user's search intent. Other embodiments may use the salience measure for other kinds of navigation that is aimed at capturing the user's search intent: in some embodiments, generalization and/or lateral search.

Generalization is an example of query modification that can be thought of as the inverse of refinement; in particular, the goal is to find useful supersets (rather than subsets) of the current result set. A system can generate generalization candidates from the properties of the current result set, for example, by looking at dimension values that have high frequency in a current result set and considering, for each of these values, the set of all records that contain this value as a potential broadening of the query. Such supersets can be ranked according to their salience measure (either relative to the current result set, to the entire record corpus, to other potential supersets, or other record sets); the supersets with the highest values of salience scores then can be returned to the user as possible directions of search generalization. For example, a query on "small iPod cover" can be computed to result in a lower salience measure than a search for "iPod cover", which can be suggested to the user as an improved version of the original query.

Other embodiments, allow users to perform lateral navigation, where the further steps of the iterative query modification process are directed to the record sets that partially overlap current result set. For example, the system can consider the search for text "auto" and suggest a modified search for "car" as the one that leads the user toward a similar record set of higher salience.

The implementation of lateral navigation may be similar to that of generalization, as shown in FIG. 16; in one particular example, the system creates possible lateral sets 1616 in its refinement set generation 1610. A salience measure is then used to evaluate these sets, preferably favoring candidates that have high absolute or relative salience.

FIG. 16 shows a process for refining a returned result according to one embodiment. In example process 1600, user input 1602 is processed by search engine 1604 acting upon a document collection 1606 to produce results set 1608. Refinement set generation 1610 acts upon the results set, creating refinement sets which may incorporate, as examples, a narrowing refinement set 1612, a broadening refinement set 1614, and lateral refinement set 1616. Salience computation is performed on the refinement sets, which are presented to the user for consideration. User selection may optionally be used to repeat the refinement process 1626, ultimately leading to result output 1624.

Guiding View Selection and Summarization

IR systems currently have several capabilities that offer some form of summarization of the result set, such as dimension value counts and clusters. This summarization is a view of the result set, namely, a dynamically constructed analysis of a set of records. For example, a view might be a collection of counts associated with values tagged on records in that set. Because there are often too many tags to show all of the value counts to the user, the view may only include counts for a subset of the values, such as those with high counts, or those from a specified set of dimensions. Alternatively, a view might not use explicitly assigned dimension values but instead may be a mathematical function (e.g., the average value) applied to the set of values associated with the records. The set of possible views for a result set is daunting, however. The user is often at a loss to discover a view that yields insight, and not all summaries are equally informative. An automatic generation of summary views tends to either omit informative summaries, or, conversely, overwhelm the user with too many summaries.

The salience measure as described herein allows the system to guide users to the useful view (or views) of a record set. The challenges are the same as with query interpretation, namely, culling out uninteresting views and exposing meaningful choices.

Using the salience measure, the system can measure how much each dimension value (or other summary statistic) contributes to the distinctiveness of a result set, relative to any specified baseline set. Because a summary is composed of such statistics, the system can use salience to guide users to useful summary views of a result set.

For example, there are several ways that the system can use the salience measure to guide query view selection. The system can promote dimensions that best show the distinctiveness of the current result set. For example, in a corpus of newspaper articles, a Page dimension may never be displayed, unless the user does a search on "top stories", which makes that dimension much more relevant, because the results are likely to be disproportionately from the front page. A City dimension might not be displayed until a user navigates to State: New Jersey, which increases the summarization value of the City dimension.

Alternatively, the system can use relative salience to cluster the dimension values, thus emphasizing diversity. For example, in a corpus of movies, the most frequent actors for the subset of science fiction movies may be the entire casts of the Star Trek and Star Wars movies. A set of actors who mostly participated in the same movie series are likely to have low salience relative to one another, and clustering their values allows the system to summarize the overall diversity of, for example, an Actor dimension.

According to one aspect of the invention, a distinctiveness measure may be used to summarize a set of documents returned as results of a query. In some embodiments, the values (identifying characteristics) associated with the most significant contributions to the distinctiveness of a document set (e.g., a measure based on relative entropy, where the measure sums contributions associated with different values, or a normalized measure using percentages, among others) may be presented to the user as part of a summary view of that documents set. Because distinctiveness can be measured relative to any baseline distribution, the baseline can be selected to reflect the user's context. The challenges with delivering summarization information to improve user interaction overlap with challenges posed by query interpretation, namely, culling out uninteresting views and exposing meaningful choices.

Figure 7:
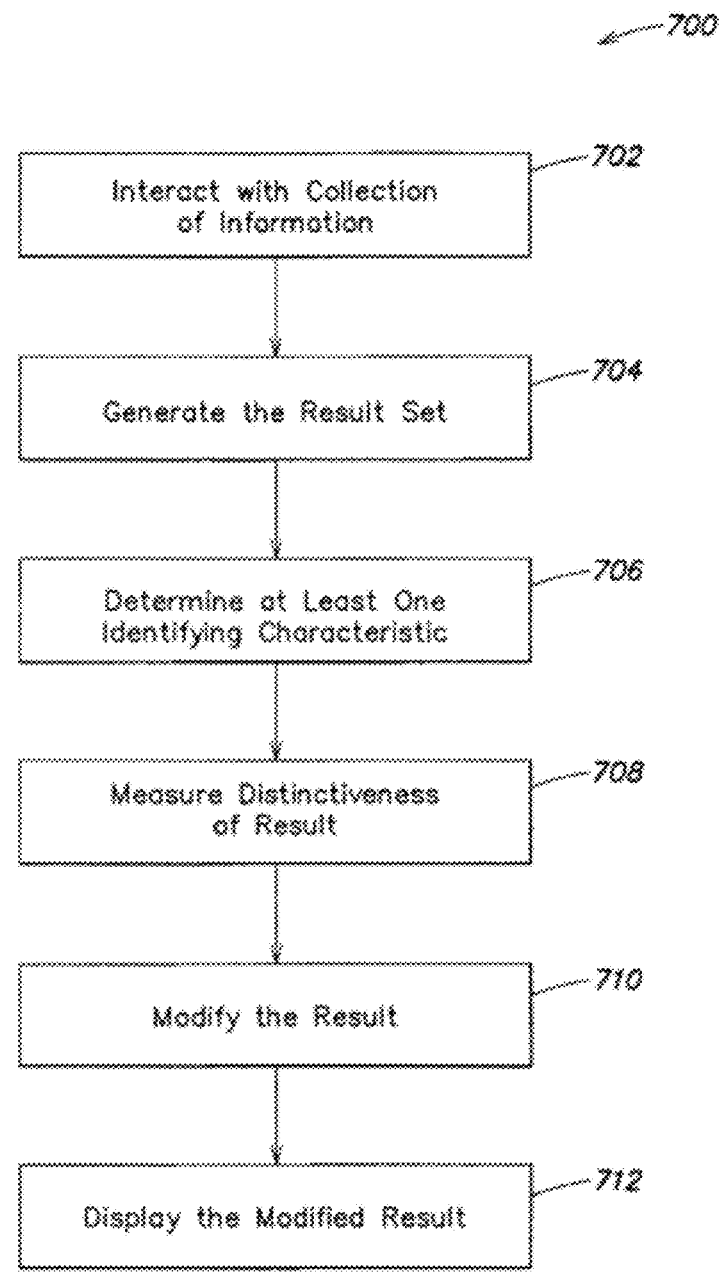
FIG. 7 shows a process for optimizing a view of a result returned to a user according to one embodiment of the present invention.

Referring to FIG. 7, shown is an example of a process, 700, for optimizing a view of a result returned to a user. At 702, a user or a user through a process, engine, or other interface, interacts with a collection of information. As discussed above, a collection of information may include a database, documents, composite entities, addressable media, metadata, as some examples. In one example, the collection of information comprises a database and a user interacts with the database by executing queries against the content of the database at 702.

According to one embodiment, it is realized that large volumes of information typically overwhelm a user. Large volumes of information frustrate the typical user, and provide little direction in how to resolve the problem of receiving too much information. In one embodiment, summarization of large amount of information into discrete elements based on a distinctiveness score improves user interaction with large amount of data by organizing and presenting smaller and possibly discrete groups within the large result returned.

In another embodiment, step 704 determines identifying characteristic(s) from within a result obtained from user interaction with a collection of information. A measure of distinctiveness for the results is determined from the identifying characteristic or characteristics at 706. The determination of the identifying characteristic at 704 and the measurement of the distinctiveness of the result at 706 may take place as part of another process. In one example, process 100 is invoked to determine at least one identifying characteristic in a result set and a normalized measure of distinctiveness derived thereof. In another example, process 200 is used to generate the identifying characteristics and a relative measure of distinctiveness. One should appreciate that steps 704-706 need not call other processes, and the steps, functions, and teachings discussed with respect to process 100 and process 200 may be incorporated into steps 704-706.

Using the measure of distinctiveness of the result, modification of the result takes place at 708. In one example, contributors to the measure of distinctiveness (i.e. the identifying characteristics or values that contributed to the measurement score) determined at steps 704-706 are highlighted so a user may observe immediately the more significant contributors to the distinctiveness of a set of results in a display of the modified results at 710. Highlighting may take the form of altered text, font, size, color, texture, background, among other options. According to one embodiment, modification of the results at 708 involves a filter on the result set that reduces the volume of the returned result by presenting summarization information about the result. In one example, the measure of distinctiveness is used to generate clusters within a result set. The presentation of clusters emphasizes the diversity within the result set, highlighting for the user potential avenues for further searching and/or refinements.

In some embodiments, where system contains data with associated dimensional values (e.g., text records with associated keywords, or map data with associated geocodes), salience can leverage the dimensionality of the data to determine the best dimension values for summarization. Moreover, salience can be used to obtain summaries of the result set's difference relative to any baseline set, such as the overall record corpus, or any of the states in the user's navigation path.

Intelligent Ranges

Because salience is a general measure for comparing sets of records, it can be used to enable refinement or summarization options that go beyond the selection of predefined dimension values. An example is an application that generates intelligent ranges. As used herein, intelligent ranges are dynamically generated range filters that break up a set of records into interesting subsets representing intervals along a specified numerical property (e.g., time or price) of the records.

For results that include ordinal data (which may be mapped in a linear sequence such as with quantities or prices, or in a multidimensional representation as would be appropriate for map locations or geocodes), a common technique to improve perceived result quality is to aggregate results into a set of pre-defined buckets or ranges. However, such buckets are not always an ideal way to partition the data. Consider pre-defined ranges of under $10, between $10 and $20, and over $20. Four items with prices of $9, $11, $19, $21 would be grouped into three subsets—$9 in one subset, $11 and $19 in the second subset, $21 in the last subset, rather than the more intuitive partitioning of $9 and $11 in one subset, and $19 and $21 in the other. Thus, a static grouping or one relying only on information in the query may result in less perceived result quality than an approach that is sensitive to the actual data results produced by the query. In general, the system cannot know what ranges will be important in the context of the search query alone. Moreover, the user might not know that some set of ranges provides insight into the result set. According to this feature, it is desired to discover the interesting ranges and present them to the user. For example, one might expect a search for Iraq against a news corpus to give at least two interesting ranges: the first reflecting the first Gulf War, and the second reflecting the more recent invasion.

Figure 20:
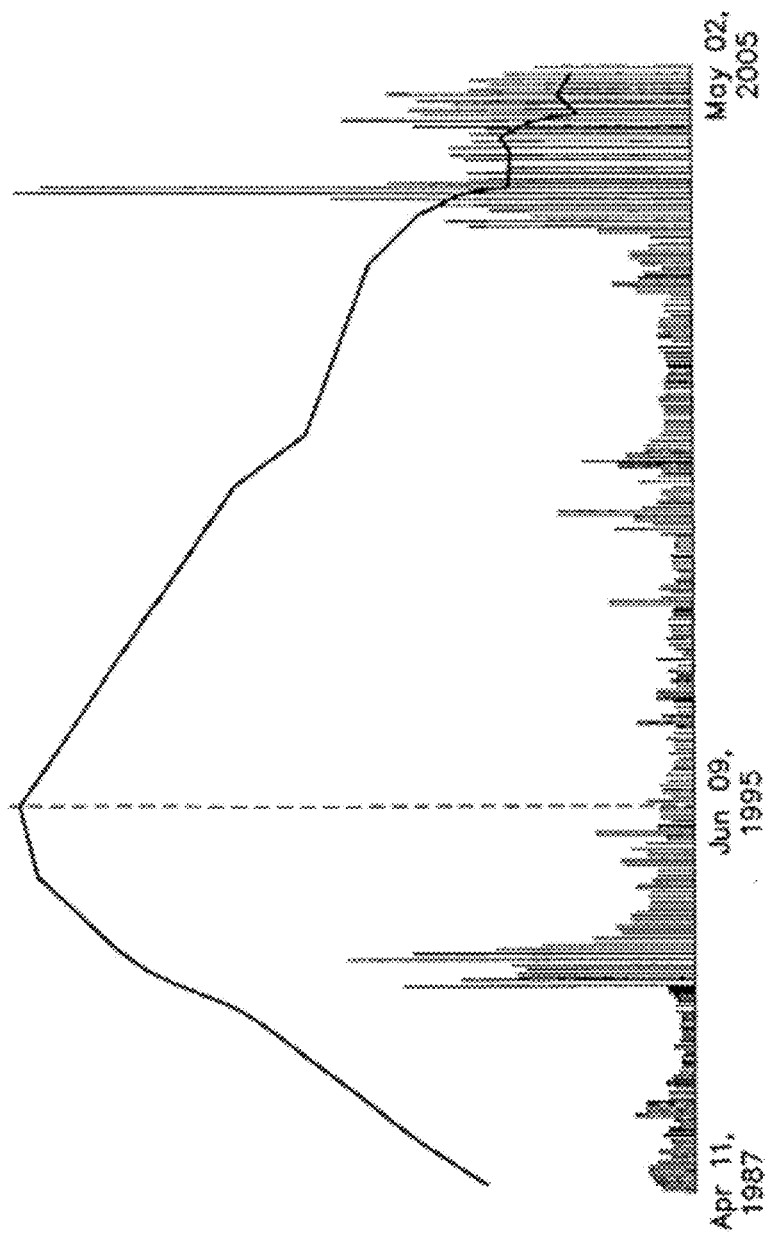
FIG. 20 illustrates a user interface presenting variation in salience over time for a collection of documents according to one embodiment of the present invention.

FIG. 20 illustrates a user interface in which segments for a collection of documents are displayed over time; each segment shown reflects possible ranges of interest to the user. Shown is a graph of the salience scores relative to time, with the baseline set being the entire set of documents matching the "Iraq" query. Some embodiments may use absolute salience, where the baseline set is the entire collection of documents. In some embodiments, inclusion of the absolute salience component may be optional. In another embodiment, inclusion of the relative salience component may be optional. Some embodiments may utilize combinations of different salience scores.

The salience measure allows the system to determine the interesting ranges of data within the current result set. In particular, the system can partition a result set into ranges such that consecutive ranges have high salience relative to one another. Moreover, the system can highlight the ranges that have high salience relative to the current navigation state, the overall collection of documents, or other baseline sets. Such an approach may not only result in an interesting partitioning of the result set, but also emphasize the subsets that are most distinctive.

Figure 17:
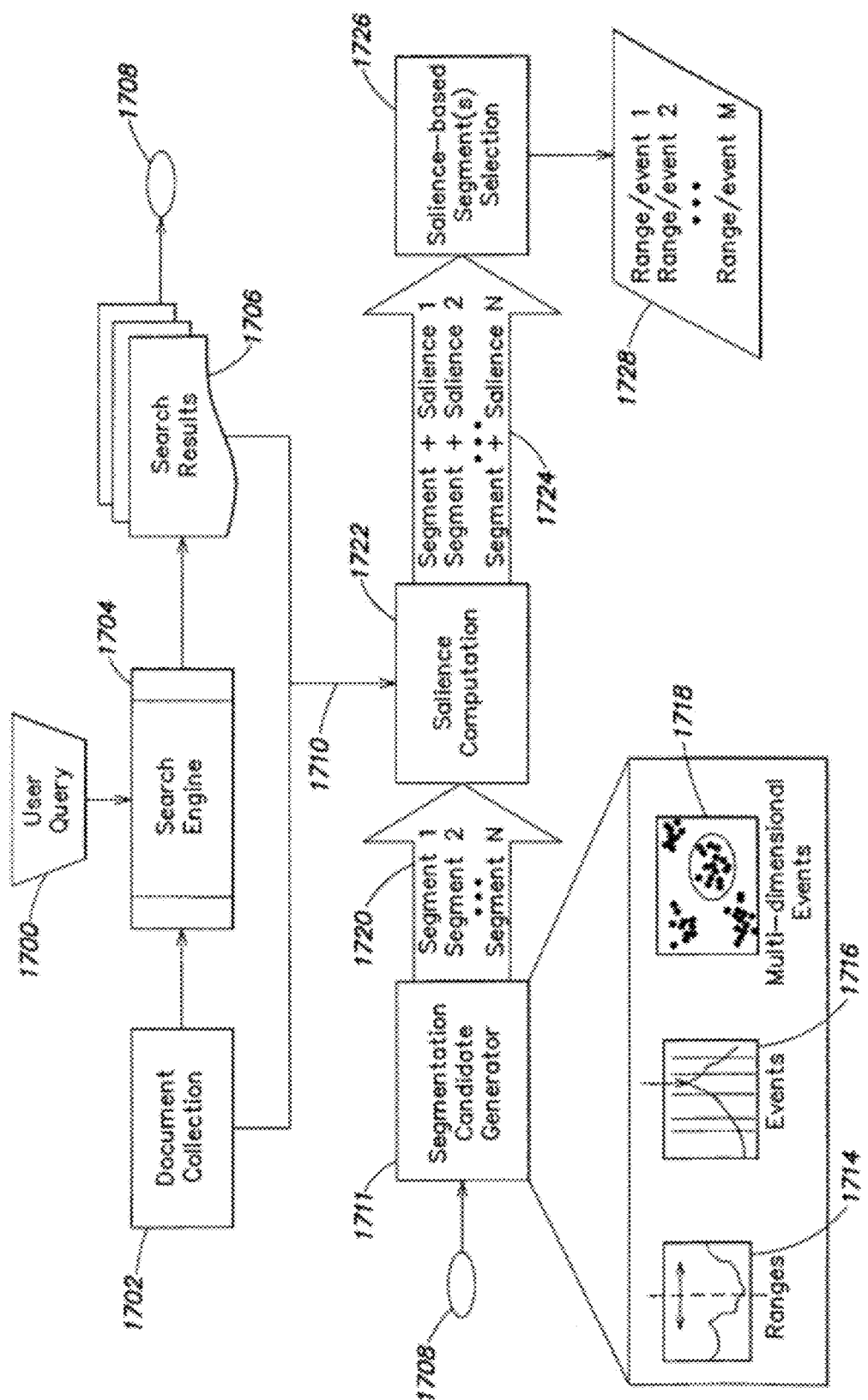
FIG. 17 shows a logical diagram for generating salience-based segments according to one embodiment of the present invention.

FIG. 17 shows a logical diagram of a system for determining ranges within a collection of documents using a salience measure. A user submits a query 1700 to the data storage and retrieval system 1704, which retrieves a query result set 1706 with its associated statistical distribution. Within the components of the result set, search results 1706 are passed 1708 and ordinal data measure(s) are identified 1711. The result set is partitioned based thereon. Range 1714/event 1716-1718 detection analysis is executed to determine candidate segment(s) 1720 which are analyzed by a salience calculation module 1722. In one example, the salience of the record set within the partition is calculated with respect to all records in the result set and/or with respect to the complete record set and/or record set(s) in other partitions 1724. The result of the application of the salience measure provides, in one example, ranges, in another example, event detection, and in another, multi-dimension event detection (e.g., population clusters on a geographic map) as salience-based segment(s) selections 1726. These determined ranges and/or events with high salience measurements are identified 1726 and stored for display to the user 1728. A detailed description of event detection is provided in a subsequent section of this document.

In one aspect, the salience measure is used to facilitate the automatic grouping of query results along one or more dimensions into buckets that are dynamically adjusted to take into account the nature and the distribution of the results.

Thus, for example, a partitioning mechanism creates a candidate breakdown of data set into candidate ranges. The way the data is broken down depends on the particular type of data: if data is linear, a set of "breakpoints" (defining ranges) can be selected, or the system can consider distinct neighborhoods of one- or multi-dimensional data. The system may determine these breakpoints in one of several ways, e.g., by looking for values where there is high relative salience between the records to the left and right of a potential breakpoint (e.g., if the dimension is time, the salience between the records before and after the potential breakpoint). The salience mechanism may then be applied to candidate partitions. In addition, salience can be used in combination with other data, such as frequency or quantity. The latter steps do not have to be performed in a strict sequence; it is possible to partition data, calculate the salience measure of candidate sets, and then re-partition the data, based on the result of the salience calculations.

Figure 8:
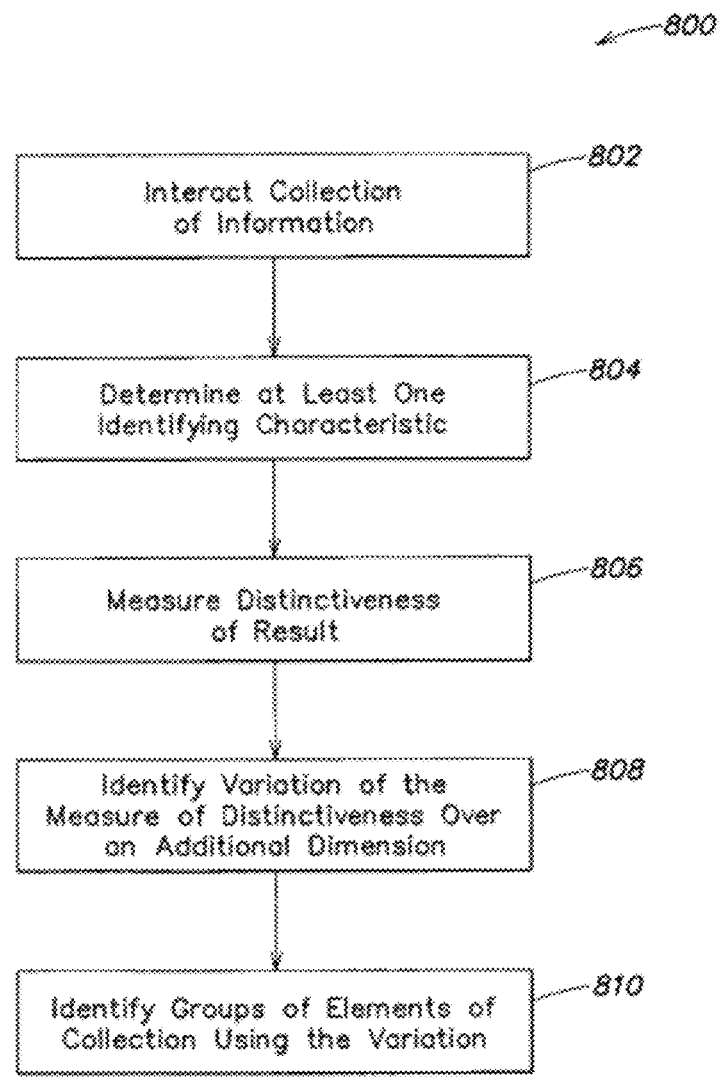
FIG. 8 shows a process for presenting groups within a collection of information according to one embodiment of the present invention.

Referring to FIG. 8, shown is an example of a process, 800, for presenting interesting characteristics within a collection of information. At step 802, the collection of information is analyzed. In one embodiment, analysis of the collection of information takes the form of user-executed queries against the collection of information, and identifying characteristics are determined from the results of the query at 804. In one example, based on the analysis of the collection of information at least one identifying characteristic is determined for the collection of information at 804. At 806, a statistical distribution for the identifying characteristic(s) is generated and used to derive a measure of the distinctiveness of elements within the collection of information. Steps 804-806 may invoke other processes for determining a measure of distinctiveness. In one example, process 100 is used to output a normalized measure of distinctiveness for elements of the collection of information. In another example, process 200 in used to generate a relative measure of distinctiveness for the elements of the collection of information. One should appreciate that steps 804-806 need not call other processes in order to determine at least one identifying characteristic and measure distinctiveness; rather, the functions, steps, and teachings discussed with respect to processes 100 and 200 may be incorporated into steps 804-806.

At 808, the distinctiveness measure may be computed over an additional dimension, for example, time, and variations in its distribution are identified. One should appreciate that the distinctiveness measure may be analyzed against a number of dimensions, for example price, quantity, time, etc; such plotting may even take place over multiple dimensions, some embodiments analyzing multi-dimensional sets of distinctiveness scores (i.e., vectors). In one example, the additional dimension may comprise other identifying characteristics within the collection of information over which variations in distinctiveness may be observed. Some embodiments may place candidate breakpoints at the local maxima of distribution scores.

At 810, using the identified variations, related elements within the collection of information are grouped. The grouping may take place based on the observed variations in distinctiveness alone or may include additional evaluations of distinctiveness with respect to the observed variations. In one example, the elements of the collection of information corresponding to an observed variation at 808 are measured for distinctiveness against each other. Groups are then generated at 810 based on a low distinctiveness score.

Event Detection

Event detection is similar to intelligent ranges, but the emphasis is on the subsets of data (selected in respect to one or more variables, or dimensions), rather than the breakpoints between ranges. This approach selects the ranges of: highest absolute salience, highest relative salience to neighboring sets, highest relative salience to previous/successive data portions, or any other interesting signatures of salience measure, including but not limited to the absolute maxima of the salience scores distribution, local maxima of the salience scores distribution, local maxima of the salience scores distribution that are located at least a certain distance from other local maxima, high values of the first derivative of salience score distributions. Specific embodiments may detect events that map to the document subsets of low, rather than high, salience.

For news corpora, it has been found that incorporating frequency information, i.e., a large number of documents concentrated in a small date range, often indicates an event around a given date. Certain embodiments may combine salience and other information measures, such as frequency.

Like intelligent rages, some embodiments may utilize event detection in case of multiple dimensions, for example using the price and quality ranking dimensions to locate the neighborhood of "good deals" products, or use coordinates or geocodes to analyze maps for interesting information.

FIG. 17 is a block diagram of a system implementing processes for determining events within a document collection. A user query 1700 is received by a search engine 1704 and executed on a document collection 1702 to obtain search results. Based on characteristics of the search results, a segmentation candidate generator 1711 identifies potential segmentation candidates 1720. A salience computation 1722 is employed on the potential segmentation candidates to refine the segmentations based on distinctiveness of the segments 1726 relative to a baseline set (in some embodiments, the result set for the user query, or the complete document set), and/or similarity within the segments (determined by lack of distinctiveness within the segment). Some embodiments may utilize additional filtering, for example, by requiring segments to achieve salience score above a certain threshold, or by ensuring they are located at least a certain distance from each other.

FIG. 21 illustrates a user display for rendering events detected within a collection of information. In this embodiment, the data set is that of news articles, and events are determined against time dimension. A salience measure is computed for the subsets of the result set for the user query and plotted over time. The appearance of local maxima in the plot is indicative, in this example, of an event that is mapped to a corresponding subset. Optionally, further analysis (of salience or other characteristics) of the segment identified and against other possible segments may be employed to confirm an indication of an event. Some of the spikes shown in FIG. 21 are not identified as events; according to one example, further analysis of those regions for mutual proximity eliminated them as events to be specifically identified.

Hierarchy Discovery

Some entity extraction techniques, such as term discovery, give rise to large, flat dimensions that are difficult to work with; for example, an entity extraction process of type "human activity" can tag records with the values of "art", "sports", "painting", "hockey", and "oil painting". Often, there are latent hierarchical and equivalence relationships among the values, but the system cannot easily obtain them except through a laborious manual process, or through an error-prone task of mapping these values to an external taxonomy.

According to another feature, the salience measure as described is used to infer these relationships among dimension values. A parent-child hierarchical relationship can be expressed as a set of heuristics on the set of relative values of salience of the candidate parent set, candidate child sets, and, in some embodiments, encompassing sets, such as the entire record corpus, or the result set of records that are returned for a given query. For example, a parent set is likely to encompass the child set and have a salience measure between that of the salience of the entire corpus and the salience of the child set. In such a way, the entities in the example above could be arranged into the following hierarchy: "art" is a parent of "painting" that is a parent of "oil painting", while "sports" is the parent of "hockey". Other embodiments may also use salience to infer sibling relationships (in the example above, "art" and "sports").

Figure 4:
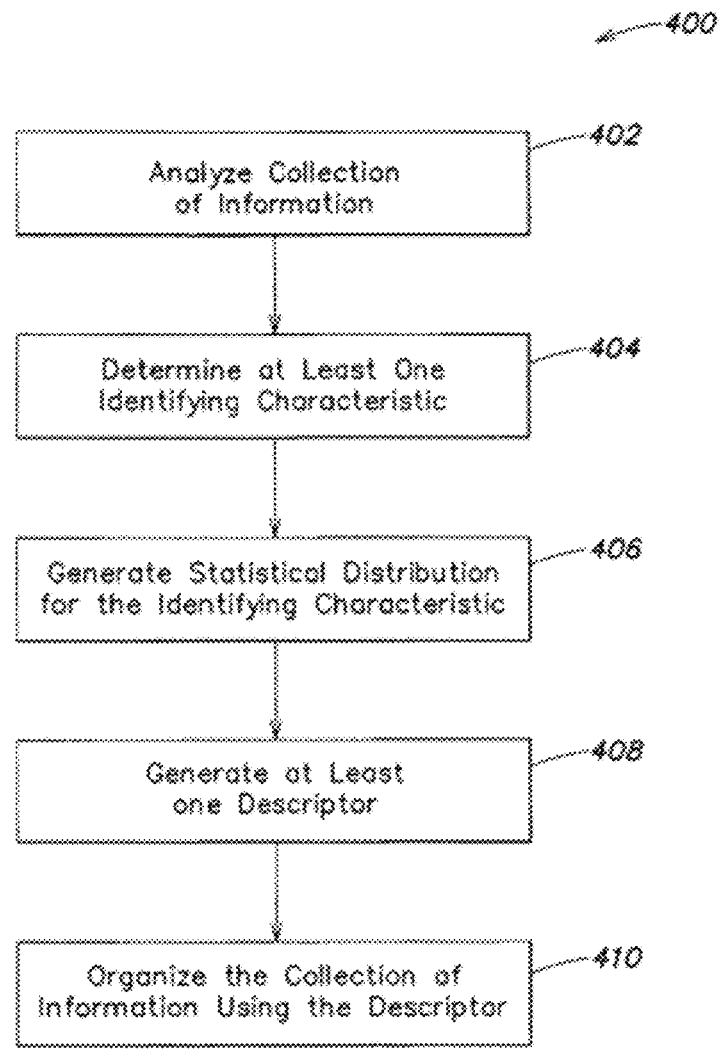
FIG. 4 shows a process for organizing a collection of information according to one embodiment of the present invention.

Referring to FIG. 4, shown is an example of a process, 400, for organizing a collection of documents. At step 402, the collection of documents is analyzed to determine at least one identifying characteristic, at 404. One should appreciate that the collection of documents can be almost any collection of electronic information. Typically, the collection of documents comprises information stored for later use/access, i.e. not a transient collection. Documents can be thought of in traditional sense as discrete text files with associated with metadata, however, a collection of documents and a document itself is intended to be more comprehensive, and should be understood to include other addressable and, selectable media, including, for example, non-textual data, such as sound and visual recordings, database records, and composite entities such as might be described using HTML and XML encoding. Individual documents and collections of documents may take many forms, including file systems, relational databases, hypertext collections (such as the World Wide Web), or the like.

According to one embodiment, the at least one identifying characteristic determined at step 404 depends, at least in part, on the make up of the collection of documents being analyzed at 402. In one example, the collection of documents is a database containing records and "traditional" documents, with text, author(s), and a subject as associated properties. The at least one identifying characteristic may be determined based on the text, the author(s), and the subject of the documents, as well as content within the database records. In one example, identifying characteristics correspond to keywords in the text of a document, author(s) of documents, the subject of the document, and/or other database record properties; in another example the identifying characteristics may correspond to any combination thereof. In one embodiment, each of the preceding identifying characteristics may be treated in more detail; for example, the presence of multiple authors may be used as an identifying characteristics, likewise regarding the presences of multiple topics, or the presence of certain key words, and/or groups of words or phrases, as well as groups of records in the database, database attributes, domains, ranges, constraints, etc. One should appreciate that the absence of certain characteristics from the collection of documents may also be used in determining the at least one identifying characteristic at step 404. The determination of the at least one identifying characteristic may include analysis of any identifying information regarding the contents of the collection of documents and any information associated with the contents of the collection of documents. In one example, the metadata associated with the content of the collection of documents is analyzed. In one embodiment, the analysis of identifying information includes consideration of date of creation, date of modification, date of last access, title, file extension, file type, file size, file composition, author(s), editor(s), keyword, containing specific information, containing a specific element, subject(s), summary information, derivable information, all or part of the file name, word or phrase within a file, location on storage media, physical location, relational information, non-textual data, as some examples. One should appreciate that information associated with and/or derivable from the collection of documents can include any information that may be stored and associated with a collection of information, including information stored by operating systems, information typically considered "metadata", and may also include other system information regarding more fundamental operations/information, for example memory location, operating system access information, associated driver and device information, as some examples.

The determination of at least one identifying characteristic and any associated analysis may occur as part of another process, example processes include process 130 FIG. 1B and process 230 FIG. 2B, wherein a candidate identifying characteristics are determined, in 130 as part of analysis of a set, and in 230 as part of analysis of a set of results obtained from a collection of information. The determination of a candidate identifying characteristic may be based on review of the possible information associated with the collection of documents; in one example this may include the metadata for the collection of documents, or may be based on a subset of the possible information associated with the collection of documents. As discussed above, certain characteristics may be expected to be found in a particular collection of documents, and those characteristics may be used in the analysis to determine identifying characteristics.

In one particular embodiment, a collection of documents may pertain to a winery, and the expected characteristics may include the type of wine, a year of bottling, the year the grapes were grown used to make the wine, weather patterns for the growing season, information on soil (nutrient content, etc.) in which the grapes were grown, and location, among a number of other characteristics. In one example, the expected characteristics may be maintained as attributes in a relational database.

In another embodiment, the collection of documents contains information on populations of men and women, and expected characteristics may include sex, age, height, weight, and other demographic information. Various subsets of the preceding expected characteristics may also be used. One should appreciate that "expected" characteristics need not be used, and the analysis of the collection of documents, its contents, and any information associated with either may exclusively determine the identifying characteristics that are used or may contribute to the determination of the identifying characteristics that are used. One should appreciate that separate processes need not be called and/or executed in order to determine at least one identifying characteristic at 404, and according to one embodiment the steps and functions discussed with respect to processes 130 and 230 are incorporated into step 404.

At step 406, the statistical distribution for the at least one identifying characteristics is determined. The determination of the statistical distribution for the identifying characteristic may involve manipulation of the collection of documents that is analyzed. In one example, a representation of the collection of documents is used that is adapted to statistical manipulation. Using a representation of the collection of documents, a statistical distribution is determined. In one example, the statistical distribution is obtained based, at least in part, on text, metadata (e.g., categories assigned to documents), or other information contained in records within a database, and may also include information derived from the collection of documents.

In another example, the statistical distribution is an approximation of the incidents of the identifying characteristic within the collection of documents. In one embodiment, the statistical distribution is determined using sampling on the collection of documents, and in another example, modification of the collection of documents is permitted without need for recalculation of the statistical distribution. In some embodiments, a threshold is established for determining when recalculation of a modified collection of documents is required. The threshold may be based on a specific number of changes made and/or a percentage of change with respect to the collection of documents (for example, percent change in size, among other examples).

Other approximation techniques that may be used to generate a statistical distribution for the at least one identifying characteristic include examining a similar collection(s) of documents and the statistical distribution(s) obtained on the similar collection(s) of documents, to provide an expected distribution for the collection of documents being analyzed. In one example, the statistical distribution is univariate, that is, based on one variable. In one embodiment, the univariate distribution is assigned a weight value. In another embodiment, the weight value constrains the distribution to reflect a probability distribution, in other words, the sum of the weights is equal to 1.

In another embodiment, the measure of distinctiveness may be determined from a multivariate distribution, that is, based on a set of values (i.e. identifying characteristics). In one example, values are represented by n-tuples, relations based on a group of values. The multivariate distribution may also be based on multiple sets of values. In one example, the collection of documents contains a plurality of identifying characteristics, for example, subject, type, and an author, thus, a set of values corresponds to each subject, type, and author. In one implementation, values are represented by both the presence and absence of the value. If a value(s) is present in 60% of the elements of the analyzed set, the absence of that value(s) occurs in 40% of the elements of that set.

According to one aspect, it is realized that reducing the computational complexity and overhead associated with determining identifying characteristics and statistical distributions is beneficial in many embodiments. In particular, the benefits achieved from approximation rather that direct or exhaustive measurement, in one example employing processes of curve fitting to the determination of statistical distribution, while introducing possible approximation error, yields benefits for some embodiments. A balancing may occur between reducing computational effort and achieving a higher level of precision.

According to another aspect, such balancing is affected by the characteristics of the set being analyzed and the activity that is being performed. In one example, determination of candidate identifying characteristics may tolerate a greater degree of possible approximation error, where the evaluation of the set based on those characteristics occurs with a greater degree of precision. In another example, correlated values for identifying characteristics are identified, and only one of the values for identifying characteristics is used for later analysis. In one example, where correlated values are determined, only one member of the correlated values is used for determining statistical distributions for the correlated values. Step 406 may include another process for obtaining a model of the distribution adapted to statistical manipulation. For example, processes 160 and 260 may be used to model the statistical distribution of the at least one identifying characteristic. One should appreciate that separate processes need not be called and/or executed in order to determine the statistical distribution for the at least one identifying characteristic at 406, and according to one embodiment the steps, functions, and relevant considerations discussed with respect to processes 160 and 260 are incorporated into step 406. As is discussed above with respect to processes 100 and 200, a measure of distinctiveness is also obtained at step 406, and in one example an absolute score of distinctiveness is employed. In another example a normalized measurement of distinctiveness is used. Other examples include relative distinctiveness scores.

At step 408, at least one descriptor is generated based on a distinctiveness scoring derived from the statistical distribution of the at least one identifying characteristic for the collection of documents. The distinctiveness score may be determined as part of another process, for example, process 100, where a normalized distinctiveness score is determined and may be used for generation of at least one descriptor within a collection of documents. In another example, process 200 may generate a relative measure of distinctiveness from which at least one descriptor may be generated at step 408. A descriptor may be stored separately from the elements of the collection of documents on which the score was determined or the descriptor may be stored with the records from which it was derived. In one example, a descriptor is stored as an attribute in a database. In another example, multiple attributes may make up a descriptor. In yet another example, the descriptor may constitute metadata and be associated with certain elements of the collection of documents to which it pertains.

At step 410, the collection of documents is organized using the descriptor. In one example, an index is created using the descriptor as a reference. In another example, the descriptor is used to generate a schema for each relation within a database. In one embodiment, the descriptor may be used to identify parent-child relationships, and from the identified relationships a logical tree may be created on which to organize the collection of documents.

According to one aspect, a process 400 may be executed for each search and/or navigation within the collection of documents, generating an adaptive database model. As more latent relationships are identified within the collection of documents, the more the database structure develops and improves interaction with the collection of documents.

In one example, process 400 may be used to determine relationships within a collection of documents. In one example, the collection of documents may be first arranged into a flat structure, that is, the one where all elements of the collection of documents appear at a same organization level. Process 400 may be used to determine a hierarchy to arrange the documents within a collection. One implementation incorporates the following features:

- Generation of hierarchical organization from flat data space
  - Exploitation of latent relationships typically found in flat data spaces
- Using distinctiveness scoring to infer the relationships amongst the collection of documents
  - Identify parent-child relationships using distinctiveness score
  - Sibling and other logical groupings may be identified using the distinctiveness score to identify similarities
- Development of a relationship tree based on distinctiveness scoring of data sets Flexible Database According to one aspect, a new class of database is architected for interactive exploration of data and content, and not for the managing of transactions that limits conventional databases. This new database is not a storage technology, similar to a data mart; instead, it improves access to data and content in the layers below, without disrupting those transactional systems. In one embodiment, the new database mode's purpose is to foster discovery by letting each user employ any kind of filtering—search, dimensional, geospatial—even if the data wasn't originally intended to be used that way. Information access applications are delivered that are independent of any specific data model, allowing each user to manipulate the information to suit his or her search intent. In other words, the database becomes organized based not only on the content but on the context it which is was accessed According to one aspect, a database architecture may be based on a simple insight with profound implications: discovery uses not just the data and content, but information about the data and content. An example architecture comprises a flexible, descriptive data model, an indexing and physical data management strategy, and a data-driven, summarizing query mechanism.

In one embodiment, the database is based on a flexible descriptive model. Flexible means that every record may be a schema unto itself—each one simply has the structure it has. In one embodiment, every record could have its own unique structure. Descriptive refers to a property whereby each value in a record is immediately accompanied by the meta-data that puts it in context. This model is conceptually related to XML, which is a departure from both relational databases and search. Conventionally, relational databases require rigid schemas where every row has to have the attributes the table dictates. Search ignores schemas, throwing away valuable context. Instead, a meta-relational model captures benefits of both conventional models, speeding initial application deployment as well as making the overall system responsive to the inevitable changes, that come about as user's needs change and evolve.

In one example, each record has its own structure and describes itself. Like XML, the data model does not require tables. Instead, it allows every record to have its own structure, if necessary. In some embodiments, each record becomes simply a collection of attributes and their values, whatever they may be. Each record describes itself by keeping the data and meta-data together in each field. In one example of this data model, a record, document, and everything in between keeps whatever fields and long-form text it may possess.

According to one aspect, the flexibility of the data model accommodates change. In one embodiment, eliminating an overarching schema in the data model'allows records to change at will. Since each record is just a collection of attribute-value pairs, each record can gain them and lose them without disturbing any of the other records or violating any overarching organization.

While a flexible data model may be essential for the unanticipated queries inherent in information access, it also introduces new challenges. In a rigid data model, the location of a particular piece of data can be mapped trivially. In a flexible data model, it is realized that its location or even existence requires the system to perform real work. For example, where in a uniquely structured record is the "FirstName" field? Does it even have a "FirstName" field? According to one embodiment, an indexing and data management strategy is employed.

In one example a unified, building-block approach to indexing is used. Since there's no way to anticipate all user queries, it's not possible to pre-compute all answers. The solution to this problem is to index the critical components that let the engine construct any answer on the fly. The indexes represent the key elements in the incoming data and content—values in records, textual content in any form, and, most importantly, multiple layers of structure within the data and content. But the index doesn't hold the intersections among these elements. Instead, these building blocks are the raw material used to produce any view of the data, including those that the user doesn't know he or she wants until they are offered. Further, the index is adaptive and responds to searches and/or queries run against a database that reveals additional relationships within the data.

In another embodiment, data management strategy assures responses at interactive speeds. In one example, a user exploring data demands immediate responses in order to continue his train of thought. To deliver speed-of-thought summaries, database engines takes advantage of the large memory spaces in modern computers and apply self-optimizing unified memory caching. In one example, caching makes room for new entries by evicting old ones that are less expensive to re-compute, take up more memory, or have not been used recently, or any combination thereof.

Figure 5:
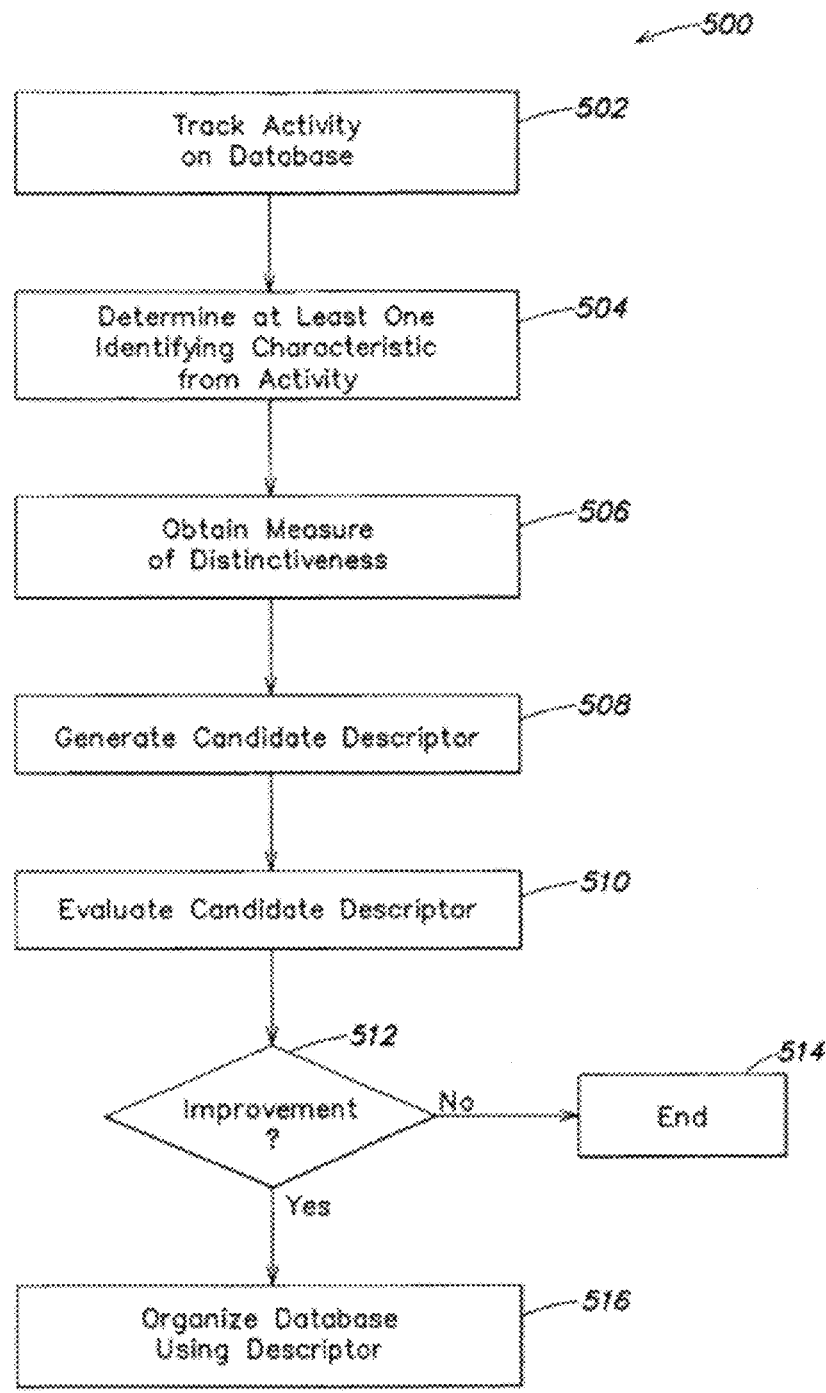
FIG. 5 shows a process for adaptively organizing a database according to one embodiment of the present invention.

Referring to FIG. 5, shown is a process 500 for adaptively organizing a database. Process 500 beings at step 502 via activity occurring on the database. Activity may take many forms, for example, access to the database, searches on the database, queries executed against the database, management activity, indexing, sorting, filtering, including, for example, statistical analysis on the database that generates distinctiveness scores, among others. Typically activity comprises access to a database that returns stored information. At step 504, an identifying characteristic is obtained from the activity performed with respect to the database. The identifying characteristics may be of many forms, and as discussed above includes information stored in database records, attributes, values, domains, constraints, as well as information stored about the information. In one example the activity on the database comprises a user generated query on the database. The query may be interpreted by a database engine and executed to return a result. Typically, the returned result will be a subset of the information stored within the database but could possibly return the entire collection. An identifying characteristic may be determined from the query, for example, at step 504. And a measure of distinctiveness may be obtained for the result of the query on the database at 506. In one embodiment, steps 504 and 506 occur as part of another process, for example, 100, which generates a normalized measurement of distinctiveness of a set based on statistical distributions of identifying characteristics within the set. In another embodiment steps 504-506 occur as part of process 200, where subsets of the database are analyzed for distinctiveness against other subsets or against the database as a whole. Each analysis of the database according to steps 504-506 yields information on the relationships between the contents of database. One should appreciate that process 500 is intended to cover interactive, concurrent, and sequential activity on a database.

Using the information on the relationships between the contents of database, candidate descriptors are generated at step 508. The candidate descriptor may simply be the measure of distinctiveness as it relates to a particular record, or the descriptor may contain additional information. A descriptor may also be an identifier for a logical grouping of similar records. In one example, a descriptor contains information on the identifying characteristics analyzed, their distributions, and the distinctiveness scoring obtained thereon. In another example, the descriptor appears as an attribute in a relation. In another example, a descriptor may be stored separately and associated with records in a database via a reference or link. One should appreciate that, while process 500 is described using a descriptor, the layout of the database itself may be used as the descriptor. In one example, the constraints imposed on the layout of a set of tables may be determined using distinctiveness scores, thus rather than the database containing a distinct descriptor record, it is implied by the organization of the data itself Thus, one should understand that the invention is not limited to creation of a separate descriptor.

In one embodiment, (not shown), candidate descriptors may simply be used to organize the database, as the computational effort in determining the distinctiveness scores of particular subsets of the database has already been expended in association with activity on the database, for example, a user query run against the contents of the database. According to one aspect, it is realized that computation burden and storage requirements may be reduced by evaluating the use of candidate descriptors at for example, at step 510. Moreover, the use of every candidate descriptor obtained without discrimination would eventually result in a database indexed and/or organized by every field appearing in the database. However, one should realize that the considerations discussed with respect to determining distinctiveness (for example, processes 100 and 200) would mitigate the possibility of indexing and/or organizing based on all fields, as distinctiveness scores and the identifying characteristics from which they are derived are determined discriminatively.

The evaluation of a candidate descriptor may involve the modeling of the use of the candidate descriptor as if it were determined to be an improvement. Improvement may include evaluation of the logical groupings obtained once the descriptor is applied. Evaluation of the logical grouping may involve comparison of the distinctiveness of the newly formed groups against each other and/or against the database as a whole to determine if distinctiveness between the groupings is improved by the use of the candidate descriptor. Alternatively, the test for improvement may involve a determination that larger grouping improves similarity within a particular grouping. A mixture of both distinctiveness evaluation and similarity evaluation may also be employed when determining if a candidate descriptor improves the organization of the database.

In one example, evaluation of a candidate descriptor at 510 leads to a determination that the descriptor does not improve the organization of the database 512(NO), and process 500 ends at step 514. In another example, evaluation of a candidate descriptor ate 510 leads to a determination that the descriptor does improve the organization of the database 512 (YES), and the database in organized using the descriptor at 516. In one embodiment, organizing the database at step 516 involves committing the modeled organization used at part of the evaluation at step 510.

In another embodiment, candidate descriptors may be stored for later evaluation and modeling; in one example evaluation and determination of improvement may occur offline, and in another example, candidate descriptors are stored until a period of reduced activity with respect to the database.

Generally, the result of analyzing portions of the database for distinctiveness according to, for example, processes 100 and 200 generates comparisons of distinctiveness for subsets of the content within a database. Based on determined similarity, i.e. low or zero distinctiveness scores with respect to each other, logical groupings may be formed. Partitions may be generated based on high levels of distinctiveness, for example, a highly distinct result returned to a user may be extrapolated against the database as a whole. According to one embodiment, the identifying characteristic(s) that were associated with the distinct result are used as an index for later accesses to the database. Further parent-child relationships may be identified using distinctiveness scores, creating a hierarchical organization within a database. Sibling relationships may also be discovered using distinctiveness scores, and tree structures may be identified and evaluated for use in organizing the database.

Concept Triggers and Interpreting User Actions

Another potential application of salience is to generalize dynamic business rule-based functionality. Rather than using query terms or navigation state to exactly satisfy a rule's trigger, the system may activate a rule when the user's current navigation state has low salience relative to the trigger. For example, an e-commerce system may suggest particular items to the users who search for particular music group. A conventional dynamic business rule system for this purpose may require creation of many such rules that correspond to the myriad ways that users may find that music group's materials, placing a high demand on its operators. Salience allows a system to create a few broad rules corresponding to results of the user's search activities, rather than the query requests they use in their search. For example, a set of records may be tagged that are representative of the category "pop music." If a user's query returns results that have low salience relative to records that are tagged with the "pop music" category, the rule can be triggered automatically.

Similarly, the system may infer the intent of a user's action by looking at the high salience terms of the user's post-action navigation state relative to a pre-action state, and then use that inferred intent to trigger a business rule.

Figure 9:
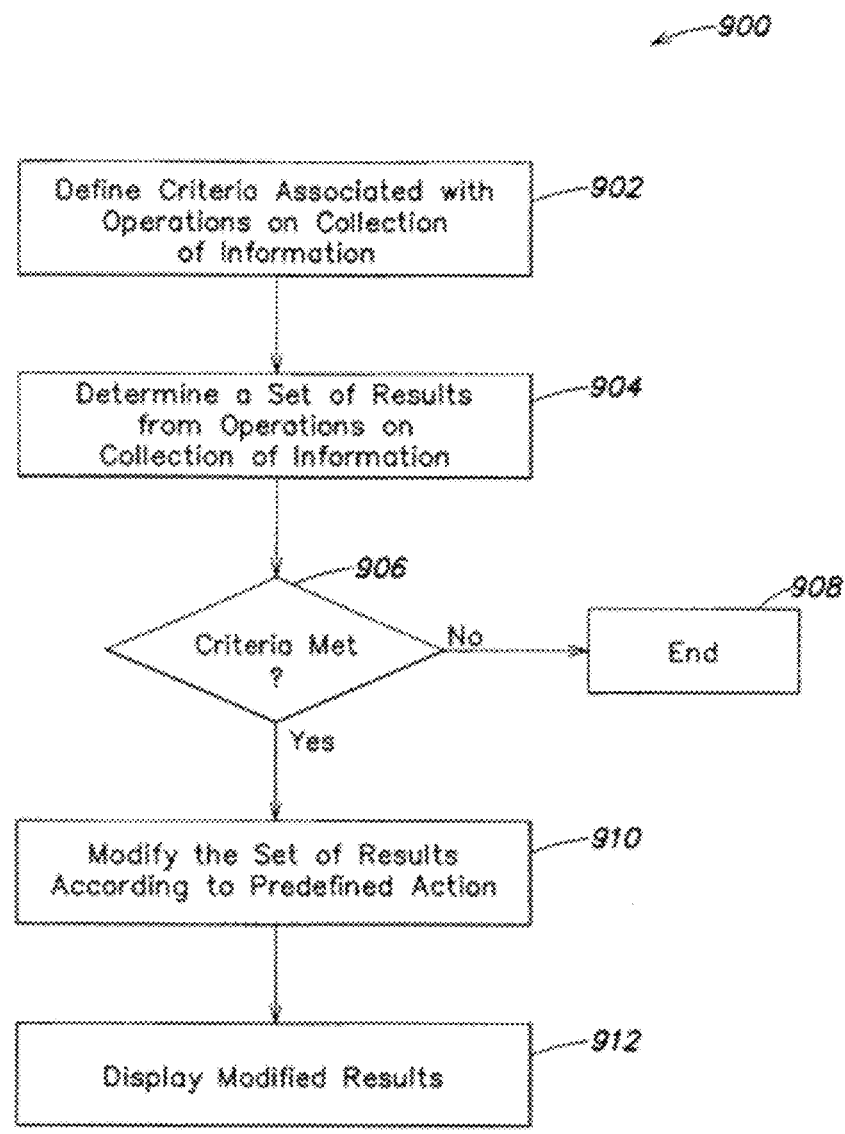
FIG. 9 shows a process for invoking rules to modify a set of results returned from a collection of information according to one embodiment of the present invention.

FIG. 9 shows a logical diagram of a system for implementing a business rule trigger. A user submits a query to a data retrieval system. A result for the query is retrieved with its associated statistical distribution. A salience calculation module determines the salience of the result set distribution relative to one or more of the business rule triggers. If the query salience satisfies the rule trigger 906, then the rule is selected and any actions associated with it are executed. Once all selected rules are applied, the results are displayed to the user.

Referring to FIG. 9, shown is an example of a process, 900, for invoking rules to modify a set of results returned from a collection of information. At step 902, an operator defines criteria for a rule associated with operations on a collection of information. An operator may be an administrator of a database, a systems engineer, database architect, or any other administrative entity responsible for maintenance of the collection of information, among other examples. The criteria may be defined as part of a business rule, indicating the certain identifying characteristics, or values to be preferred over others in specific situations. In one example, a rule may define certain identifying characteristics that are to be given more weight when they occur as a result of operation on a collection of information, at step 904. The criteria may include a threshold distinctiveness score, for example, such that portions of the result that do not meet the threshold are not returned, which may cause no results to be returned. Subsequently, other rules may also be invoked which may result in the display of information on how to obtain better results, or on how to view results suppressed by the threshold test.

In another example, rules may operate to guide interpretation of operations on a collection of information relative to a particular informational context, for example prior navigations state. In such an embodiment, a user who searches for "Mozart" after selecting music recordings will trigger a different rule from a user who makes the same search after selecting sheet music.

Criteria defined at step 902 may also include a threshold for a distinctiveness score before a modification of the set of results takes place at 908, if a check against the criteria is met at 906(YES). If the check against the defined criteria is not met 906(NO), process 900 continues to monitor operations performed on the collection of information and the set of results determined from the operations on the collection of information at 904. When criteria is satisfied at 906(YES) a rule with parameters identifying what action should be taken will operate to modify the set of results according to the predefined action, at 908. AT 910 the modified results will be output. In one embodiment, a system may be configured to apply a rule which selects subsets of results having increased distinctiveness for display, when triggered by an original result which overall met a low distinctiveness threshold. In one example, such rules may be associated with tags on documents within a set. In another example, textbooks tagged with "computer science" may be identified as a category on which a rule should operate. If user's query returns results that have a low distinctiveness measure relative to records that are tagged with the "computer science" category, the rule can be triggered automatically to return records with a higher distinctiveness score.

In another example, post-action (in one example, search) activity may trigger a rules with an associated action. According to one embodiment, after a user performed a search for "garbage", post search navigation was directed to "disposal", and "hazardous pickup days", the rule may be triggered by the now clear intent to search on garbage as it relates to waste, rather than, for example, to the musical band. The rule may include an action where any results associated with Garbage the musical band are excluded for any additional navigation.

In another example, process 900 could be employed with a rule triggered by a user query producing a significant number of results including "ThinkPad," the rule action directing that user to "brand=Lenovo", "product=laptop", rather than a previous association with the IBM brand for that product. In another example, the specific search may be associated with a rule designed to direct a user to operator-specified alternatives, for example a query on "ThinkPad" may direct a user to "laptops" generically and/or to a particular brand of laptop with which an operator may have an interest.

Figure 22:
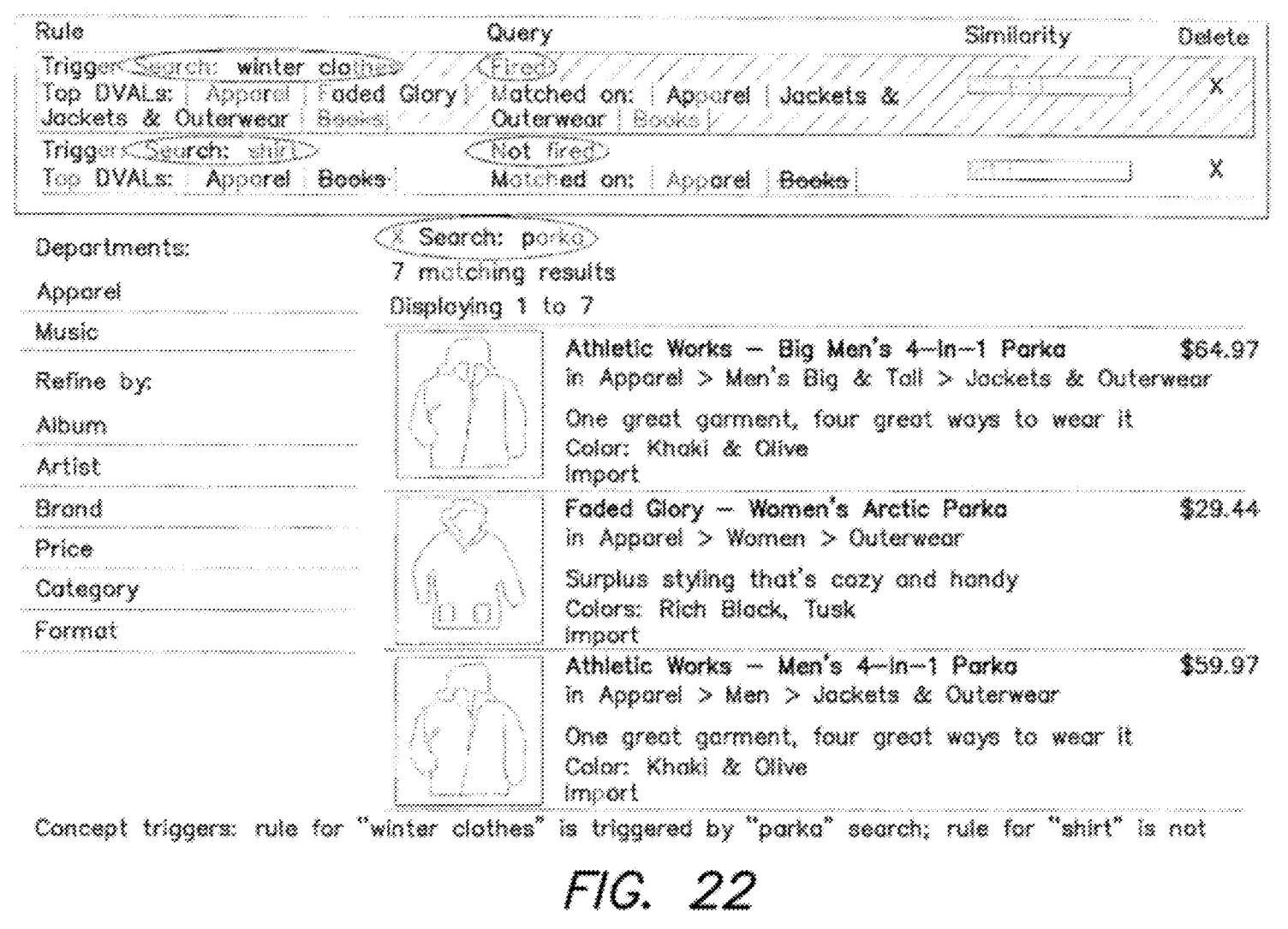

FIG. 22 illustrates a user display for displaying rules and associated triggers according to one embodiment. FIG. 22 shows a set of rules that modify displayed results. In one embodiment, the salience of the search results for "parka" is computed relative compared to results obtained for "shirts" and for "winter clothes". The relative salience is low between the results for "parka" and the results for "winter clothes", indicating the sets are similar, thus triggering the associated rule. The relative salience between the results for "parka" and the results for "shirt" is high; as those sets are distinctive, they are not similar, and the associated rule is not triggered.

Adaptive Data Mining

Another class of salience applications involves generating candidate sets of potential interest based on a current context, and then applying a salience measure to promote the most interesting candidates and relate them to one another. Such techniques can be useful to facilitate adaptive data mining.

One of the challenges of data mining is that it discovers relationships that are obvious. A system can use salience to highlight relationships that are non-obvious (e.g., because they are exposed by the user's current context) but are not evident from a global view. The salience measure can be applied to different views of the data to detect the view or views (including subsets, generalizations, or lateral sets) that possess a high salience measure (relative to a baseline set or relative to each other) and, thus, could be of an interest from the data mining standpoint. For example, in one such scenario, the head of recruiting might be looking at historical recruiting performance to see how to make that performance more effective. She notices that, on visit to a particular university, successful candidates are largely recruited by a single member of the recruiting team who is otherwise an average performer. She now can act on this information, either leveraging that person's particular effectiveness in future visits to the school, or investigating further to see what can be extrapolated from that relationship.

Discovering relationships in context allows a system to combine the interactivity of guided navigation with the deep insights of data mining.

Concept Visualization

One embodiment is a system that visualizes/graphs the space of record attributes (or "tags"), as opposed to the space of the records themselves. For example, instead of a graph of the names of people (i.e., records), embodiments might graph the professions of each person (i.e., attributes of the records). Known systems that graph data properties typically map those properties to a pre-existing structure, such as an ontology, and uses the information from the structure (e.g., hierarchical relationships between properties) to graph them. In contrast, embodiments do not require a pre-existing structure. Instead, the distances between the properties are determined from their distribution across the records. Therefore, embodiments can generate map distances between not just homogenous properties, but also heterogeneous (for example, the distance between "scientist" and "Cambridge", or "cheap" and "BMW") without requiring predefined conversion metrics.

Figure 35:
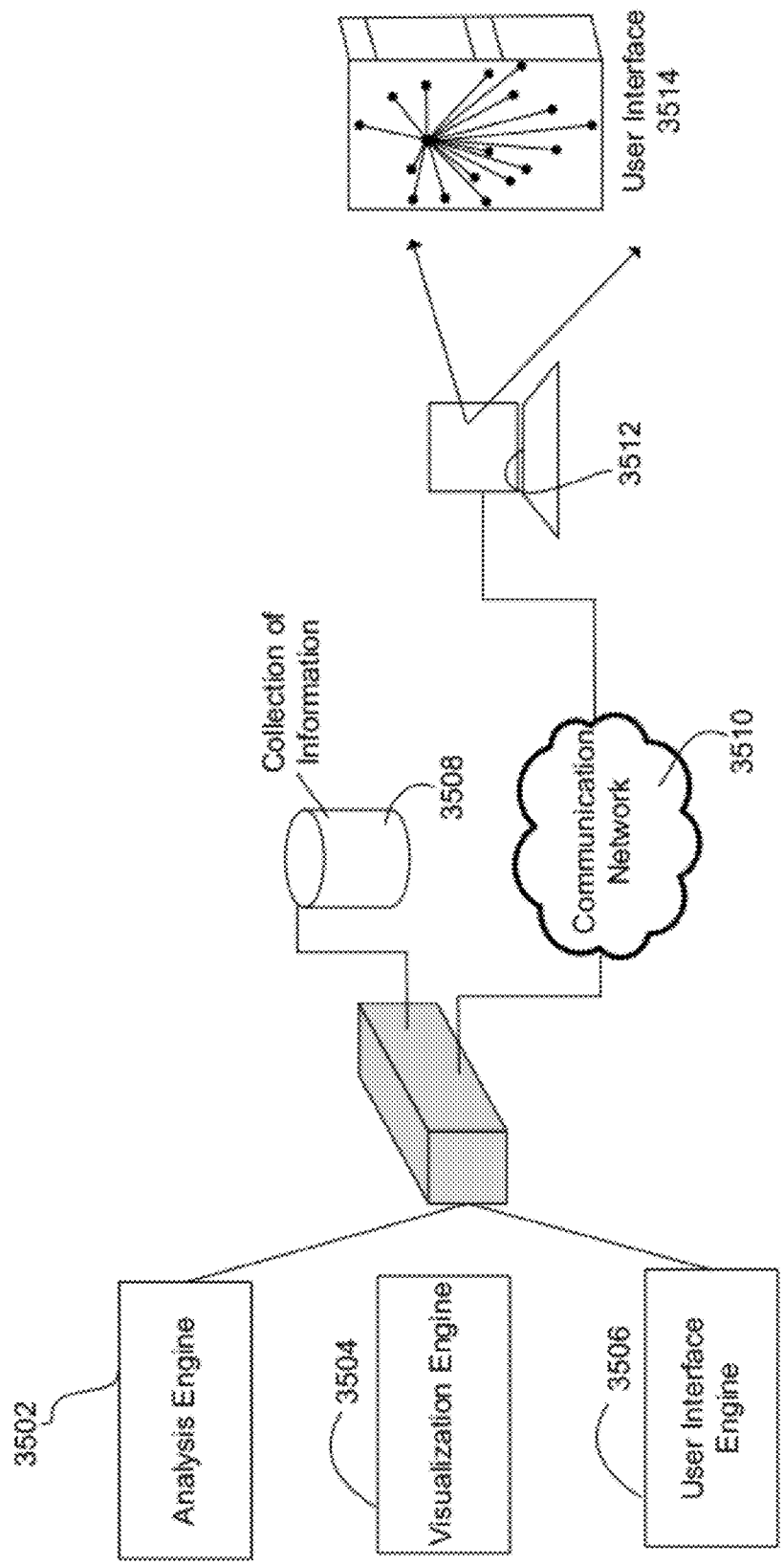
FIG. 35 shows an example architecture of an information retrieval system according to one embodiment of the present invention.

FIG. 35 illustrates an example architecture of an information retrieval system 3500 according to one embodiment. System 3500 can be configured to enable a user or other automated process to search and navigate within one or more collections of information (e.g., 3508). Searching and navigating operations, disclosed in greater detail below, can return sets of results from any collection of information stored locally or otherwise. In some embodiments, an analysis engine 3502 determines a set of materials from the one or more collections to present within a user interface displayed by a user interface engine 3506 responsive to queries or navigation operations. Each member of a set of materials determined by the analysis engine 3502 can be associated with an information-carrying set of concepts. A visualization engine 3504 is configured to graphically depict concepts within the information space defined by any and/or all the information associated with the members of the set of materials. The interface engine 3506 can be configured to render concepts within the information space as nodes in a graphical representation of the information space associated with the set of materials.

In one embodiment, the nodes are displayed in the graph relative to other nodes having display distances between the nodes reflective of the similarity between the concepts that the nodes represent. The arrangement of the nodes and the distances between them can be determined by the visualization engine and communicated to the user interface engine for generating any user interface display.

Typically, sets of results returned from a collection of information are analyzed for similarity based on their attributes. The sets of results can be grouped based on how similar each result is to other results in the result set. Other mechanism can be employed to assist end users in understanding a returned set of results. In some approaches, result analysis mechanisms are based on determining if a result in a set of results is similar to another result. Some conventional similarity approaches determine a result set's similarity to another result set based on a comparison of the result set and its attributes to another result set and its attributes. According to some embodiments, analysis engine 3502 can be configured to "invert" such conventional "result attribute" analysis by defining an attribute space associated with a returned set of materials comprising the result set or any other set of materials from the collection.

According to some embodiments, the attribute space defined can include all the information associated with the set of materials. Concepts can be identified within the attribute space and plotted as nodes on a graph. In some embodiments, the graph can be generated by a visualization engine to reflect a two dimensional view of the similarity and connections between the concepts. Connections between concepts can identify concepts shared by one or more members of the set of materials. For example, a person described as "filmmaker" and "financier" can result in a concept visualization graph with the node "filmmaker" connected in the graph to the node "financier."

In some embodiments, similarity between "filmmaker" and "financier" is determined not by comparing two nodes or concepts directly, but rather by analyzing a first subset of the set of materials associated with the first concept against a second subset of the set of materials associated with the second concept to determine similarity, and from the similarity a distance between those nodes. For example, the people in the collection having the attribute "filmmaker" can define the first subset of materials associated with the first concept, and the people in the collection having the attribute "financier" can define the second subset associated with the second concept. In one embodiment, the determination of similarity between the sets yields a distance between "filmmaker" and "financier."

The visualization engine 3504 and/or the user interface engine 3506 can be configured to render the graph of concepts as a navigable structure in user interface 3514 displayed on a host computer 3512. Selections within the navigable structure can cause the information retrieval system to transition between sets of materials selected from the one or more collections of information. Further, transitions by the information retrieval system between sets of materials, for example in response to executed queries or navigation operations, can generate transitions in any associated concept graph displayed.

Some aspects relate to the visualization of characteristics of data or attributes of data stored within collections of information. In some embodiments, a visualization engine can be configured to generate displays of, for example, interesting characteristics identified in one or more collections of information. The display can be configured to reflect the distinctiveness of the interesting characteristics as distances between the nodes in the display. In one example, interesting characteristics can be plotted in a graph with respect to other characteristics, for example, over time as discussed above with respect to intelligent range determination. In another example, characteristics of the data can be grouped, based on the measurements of the distinctiveness of the characteristics. The groups can rendered graphically with the display distance between the groups based on the distinctiveness of the characteristics.

In another embodiment, the characteristics can be measured for their distinctiveness against each other, against the collection as a whole, against subsets of the collection, against queries or query terms used to determine the subsets, against navigation selections used to determine the subsets, and/or against any element of data stored in the one or more collections of information. The baseline against which distinctiveness is determined can alter the value of distinctiveness measured, yielding additional insights in the analyzed space.

In some other aspects, common characteristics of analyzed data can be identified by an information retrieval system (e.g., system 3500 of FIG. 35). The common characteristics and associated data of the documents having them can be evaluated within the space of the attributes defined by the data having those common characteristics. The evaluation of the attribute space can be used to determine, for example, distinctiveness of concepts. In one example, an analysis engine (e.g., analysis engine 3502), discussed in greater detail below, is configured to return sets of results from a collection of information. The sets of results can be used to define an attribute space that transforms the data being analyzed in a manner akin to the operations provided by a "pivot table."

Among other functions, pivot tables can automatically sort, count, total or give the average of the data stored in one table or spreadsheet. The results of the operations are displayed in a second table (the "pivot table"), showing the summarized data. Pivot tables can enable quick creation of unweighted cross tabulations. A user can set and modify the summary's structure by dragging and dropping fields graphically. This "rotation" or pivoting of the summary table gives the concept its name, allowing the user to pivot the subject of the data operations in the table based on selection of new fields.

Rather than look at the similarity of the returned results, in one example, the analysis engine is configured to define an attribute space of all the information associated with those results, and determine the similarity of the concepts within that attribute space. A visualization engine (e.g., visualization engine 3504) can be configured to generate a graph of those concepts, with nodes in this graph having display distances reflecting their similarity.

In some approaches discussed above, measurements of distinctiveness can be applied to an attribute space to determine similarity; in addition, other similarity measures can be applied to determine whether a characteristic and/or its associated document(s) are conceptually similar to another characteristic and/or its associated document(s). Rather than evaluate the document or characteristics directly to determine similarity, some embodiments define an attribute space based on a common characteristic or a set of common characteristics. The attribute space can include the information associated with the documents having the common characteristic. Members of the attribute space can then be evaluated to determine the similarity of the members based on the similarity of any set of documents having those members as attributes. Further, a characteristic and/or its associated document(s) can be evaluated against other sets of characteristics and/or document(s) to determine their distinctiveness or similarity.

According to some embodiments, an analysis engine (e.g., analysis engine 3502) can be configured to analyze a set of materials having a shared characteristic to determine similarity within an attribute space. For example, a node in the attribute space can include an attribute of a document having the shared characteristic. Others nodes can be defined based on attributes of other documents having the shared characteristic.

In one example, the similarity between two nodes within the attribute space can be determined by calculating the similarity between the two sets of documents associated with those attributes, in effect, the inverse of the known method of comparing two documents based on commonality of attributes. In some embodiments, this inversion of the determination of similarity can be used to generate conceptual graphs of sets of materials by, for example, a visualization engine. In some embodiments, the similarity of the nodes within the attribute space can be calculated as the vector dot product of the similarity of the sets of documents sharing those attributes. For example, objects, object attributes, sets of objects, and their attributes can be defined as vectors. The vectors can be compared to determined similarity.

In one example, the vector dot product is an operation executed by a computer system that takes two sequences of numbers (e.g., the coordinate vectors) and returns a single number obtained by multiplying corresponding entries and then summing those products. Each node and any corresponding set of materials can be represented as a vector and the vector dot product can be used to obtain the cosine of the angle between two vectors to yield a measure of the similarity of the two vectors. In some embodiments, the vectors can be normalized by scaling them to have the length of each vector be constant (traditionally, one). In some embodiments, different axis in the vector space can be scaled differently, to attribute relative weights to the concepts represented in the vector space.

In some embodiments, the set of materials can include objects with associated information describing each object. Each object can be described by a faceted classification scheme. A faceted classification scheme assigns a mapping from each object in a collection to the set of facet categories that describe that object. The facets can be organized into categories or hierarchies, and each facet can define a collection of related values or categories that characterize or describe data. Objects and facets are discussed in greater detail below.

The objects in the set of materials can be represented by vectors calculated based on the information associated with each object, within a multidimensional space defined by the set of facets or categories represented in that collection of information. A vector dot product can be calculated from the object vectors by the analysis engine to obtain the cosine of the angle between two vectors. The cosine of the angle between the two vectors can be used to determine similarity of the objects.

In some embodiments, the vectors representing the materials associated with a pair of objects are compared to obtain the cosine of the angle between the two vectors to determine similarity of the material associate with the pair of objects. Another embodiment reduces the dimensionality of the vector space to approximate that similarity measure with reduced computation. Other embodiments may utilize geometric approximations to the cosine calculation in multidimensional space to reduce computation. The similarity measure can be used to plot the nodes in a graph, where the distance between the nodes is based on or approximates the value for the determined similarity measure. The visualization engine can be configured to approximate graphically the determined similarity of the set nodes. In some embodiments, the visualization engine generates a two dimensional approximation of the distances between the nodes.

In other embodiments, one or more sets of materials can include documents stored within a collection. Concepts associated with the sets of documents can be evaluated based on measurements of distinctiveness of their associated sets of documents to determine their similarity, including similarity measures as discussed with respect to processes 100-900. In one example, multivariate statistical distributions are determined for the identifying characteristic(s) within a set of documents associated with a concept. The multivariate statistical distributions can be evaluated against the entire collection, and/or any subset from the collection, to determine the distinctiveness of the multivariate statistical distributions. The measurement of distinctiveness can be reflected in a graph of the concepts and their distances relative to each other by a visualization engine.

In one example, the attribute space can be defined to include all or a subset of the data associated with a set of materials that shares a common characteristic. The common characteristic(s) can be used by the information retrieval system to analyze a set of materials (e.g., a result set) via an analysis of the attribute space associated with the set of materials. The associated attributes can be analyzed for similarity based on the similarity of the underlying sets of documents having those attributes. In one example, a node can be associated with an attribute of a document or a set of documents having that attribute. A second node can be associated with a second attribute of a document or a set of documents from the same collection of information. An analysis engine can be configured to determine the similarity of these nodes based on the similarity between the first set of documents and the second set of documents. In some examples, the determination of similarity can be based on the measurements of distinctiveness discussed herein.

Figure 29A:
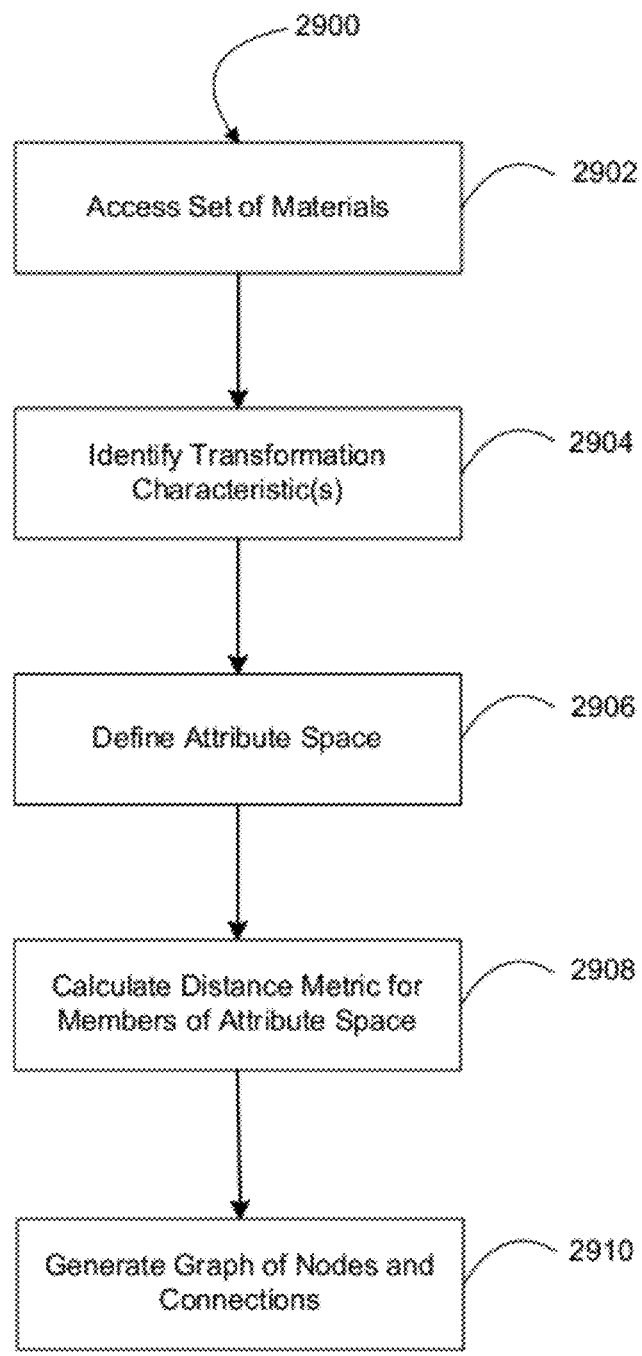
FIG. 29A shows an example process for generating and visualizing concepts within a set of materials according to one embodiment of the present invention.

FIG. 29A is an example process 2900 for generating and visualizing concepts within a set of materials. The set of materials can include documents and associated data stored in one or more collections of information. In one example, the set of materials includes documents that define objects. The objects can represent, for example, people, and contain information associated with those people objects. The one or more collections of information can also define a knowledge base accessed by an information retrieval system to return results from the one or more collections (e.g., return people living in Boston). The information retrieval system can also be configured to return results in response to queries executed by the information retrieval system and/or in response to navigation operations. Navigation operations can be executed in response to user selections made in a user interface to select sets of materials as returned results from the one or more collections. Navigation operations can be configured to generate navigation states associated with the set of returned results. The set members of the results/navigation state can be based on a particular expression corresponding to the given navigation state, and the expression can be determined from selections made in a user interface (e.g., selection of: People—Boston).

In one example, the navigation operations can provide for computer implemented interactive query refinement for locating and retrieving data from the one or more collections of information, discussed in greater detail below. The one or more collections of information can be organized based on facets, and in some examples, the one or more collections can include a faceted classification scheme. In a set of materials that includes people objects, the facets can be information that describes or characterizes the people objects (e.g., Resident of Brookline, CEO, Designer, etc.). Navigation operations can be executed by the information retrieval system to access sets of materials having, in some embodiments, any of the facets selected in a user interface. In other embodiments, the information retrieval system accesses sets of materials having all of the facets selected in a user interface.

The one or more collections of information can also include data organized in a variety of data formats, for example, data may be organized based on self-describing classifications (i.e., self-describing data), data without classification information (e.g., unstructured data), homogeneous data (e.g., data having a single organization format, which can include relational data, file system data, etc.), heterogeneous data (e.g., data organized as multiple formats), and/or any combination of formats. A set of materials can be obtained by an information retrieval system from collections having a variety of organizations or schemas, or the collections that include unstructured data. Process 2900 can be executed against any collection regardless of the underlying organization of the collection.

When executed by an information retrieval system, process 2900 begins with accessing a set of materials at 2902 which can include a subset of the data stored in the one or more collections of information. At 2904, at least one transformation characteristic can be identified. The transformation characteristic can include a common characteristic shared by at least some of the data within the set of materials. The transformation characteristic can be used by the information retrieval system to define an attribute space at 2906 for the set of materials, or any subset thereof, sharing the transformation characteristic. Thus, the information retrieval system is configured to transform the subject of analysis from conventional determinations of similarity of objects having attributes to an analysis of the attributes' similarity based on the similarity of the sets of documents that contain those attributes.

In one embodiment, an analysis engine is configured to identify the transformation characteristic and define the attribute space associated with the data sharing that characteristic (e.g., at 2904 and 2906). Once the attribute space is defined, a distance metric can be generated to quantify the similarity of members within the attribute space at 2908. Each member in the attribute space can be represented graphically as a node in graph. In one embodiment, a node in the attribute space can include facet values used to describe documents containing the transformation characteristic.

Figure 30:
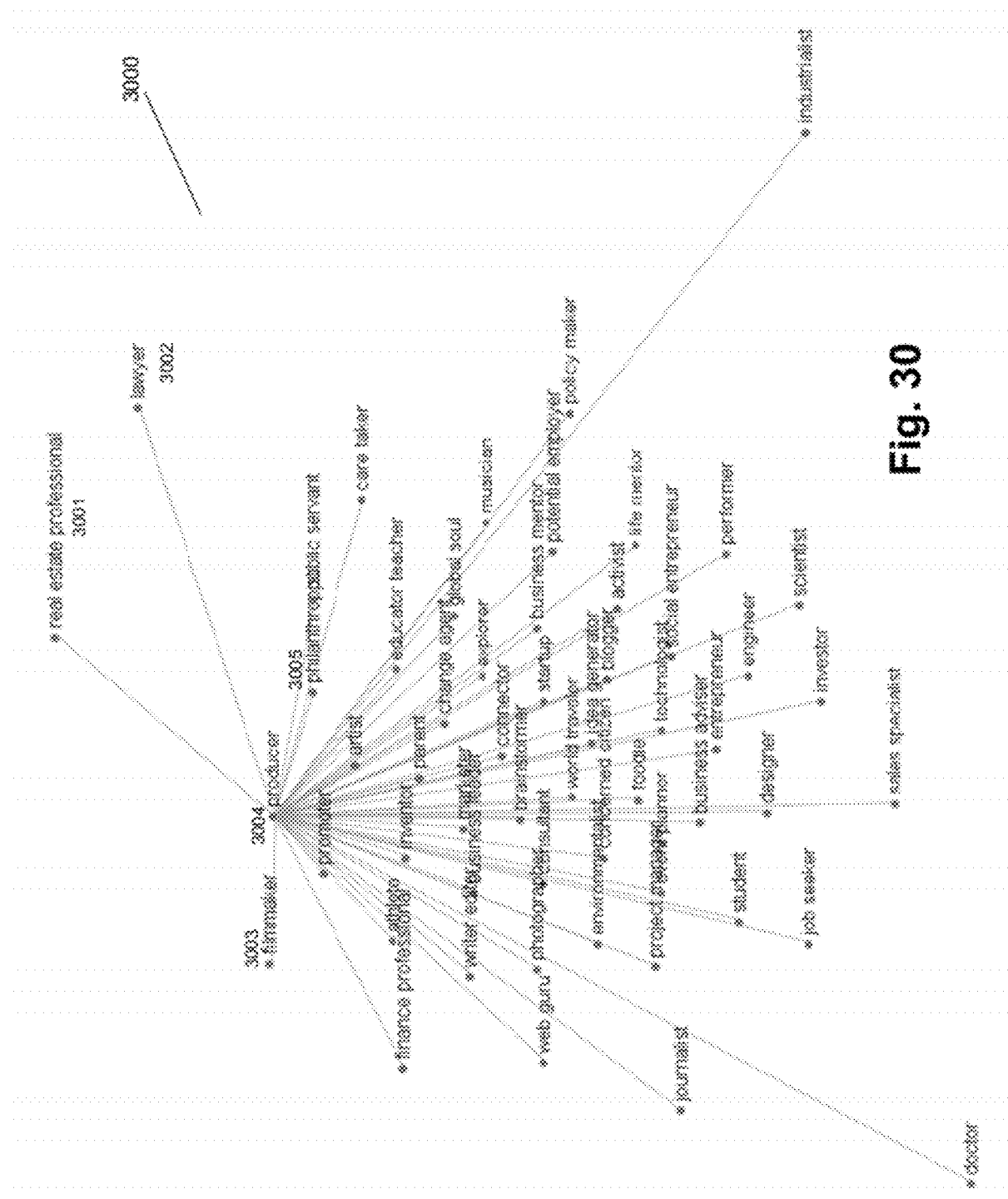
FIG. 30 illustrates an example graph of nodes of an attribute space according to one embodiment of the present invention.

FIG. 30 is an example graph 3000 of nodes of an attribute space. The nodes can define concepts within the attribute space. According to one embodiment, the distance metric calculated at 2908 quantifies the similarity (or dissimilarity) between the nodes based on a calculation of the similarity of the documents having those attributes. For example, the "filmmaker" attribute 3003 shown in FIG. 30 is associated with a set of documents, while the "producer" attribute 3004 is associated with a respective set of documents. The information retrieval system executing process 2900 can calculate the distance between "filmmaker" and "producer" by determining how similar the set of people including the "filmmaker" attribute is to the set of people including the "producer" attribute. In some embodiments, the calculation of the distance metric at 2908 includes a calculation of the similarity of a plurality of nodes based on the sets of documents having those attributes.

At 2910, a graph of the nodes within the attribute space is generated. In some embodiments, the distance between any two nodes in the graph can approximate the difference between the documents having those nodes as attributes. In generating the graph at 2910, two nodes can be connected by an edge in the graph if one or more documents share those attributes. The distance metric calculated at 2908 for the two nodes can be used to define the distance or length of the edge between the two nodes in the graph. In particular, the value for the distance metric can be used to establish a display distance for the two nodes in a graphical representation. In one example, the graph can be generated so that the distance between any two nodes is proportional to how different documents sharing those attributes are. In another example, the distance can be inversely proportional to the similarity between the documents.

The calculation of distance at 2908 can be determined, for example, for each node against every other node in the attribute space. In some embodiments, the distance calculation can be executed on a subset of the nodes in the attribute space. In some examples, the calculation of the distance metric at 2908 can be determined for connected nodes first, when the nodes are associated with one or more documents that share those attributes. In other embodiments, the values for the distance metric between nodes in the attribute space can be used to generate the initial positions in a graph of the nodes and any connections between the nodes at 2910. The initial placement of nodes and the distances between them can serve as a starting point to generate a two dimensional approximation or projection of the multi-dimensional space defined by the initial graph. In some embodiments, the distance metric is not guaranteed to follow the triangle inequality, and, thus, not be representable exactly in any multi-dimensional space; in such cases, the approximation of the graph representation is required.

In one example, the graph can be generated so that the distances rendered in the graph between the nodes are inversely proportional to the similarities between the documents sharing those attributes. For any connected nodes the information retrieval system and in particular a visualization engine can be configured to render a two dimensional representation of the nodes and edges with the length of the edges between the nodes approximating the calculated distance metric. The visualization engine can also be configured to render unconnected nodes so that their similarity is also reflected by the display distance to other nodes, whether or not an edge exists between the nodes.

In some embodiments, the generation of the graph of nodes and edges at 2910 includes fitting the multi-dimensional space of nodes and edges into a mathematical spring model to generate a two dimensional approximation of the graph. In one example, a visualization engine is configured to generate a computer model of the graph in which edges are replaced with springs having a predetermined strength and length based at least in part on the distance metric calculated in 2908. Each node of the graph is given an initial position within the computer model and the springs connecting the nodes are allowed to change the positions of the nodes within the model. According to one embodiment, the visualization engine is configured to solve the model to determine a minimum energy position for each of the nodes based on the spring connections. According to some embodiments, the solution for the minimum energy position yields a two dimensional approximation of the multi-dimensional space of the distances between the nodes. The minimum energy positions for each node can be used to generate the graph of nodes and edges at 2910.

A variety of computer models can be used to determine a spring force approximation of the graph of nodes and edges. In some models connected nodes are modeled with springs having greater strength than nodes that are unconnected. In some models even unconnected nodes are given spring connections to other nodes, and the visualization engine is configured to determine the minimum energy position within the model. In another example, the visualization engine can be configured to render a three dimensional view of the nodes, edge, and distances.

In one embodiment, a spring-force model is configured to optimize a visualization of the distance metric employed (e.g., determined distinctiveness) between all connected nodes in a display. In other embodiments, the spring-force model is acting on each pair of nodes. In yet other embodiments, n-tuples of nodes are connected with force models. The spring-force model is configured to generate a two dimensional representation of the multi-dimensional space defined by the connections between the nodes and the length of the edges defined by a distance metric. The distance metric can include a measure of distinctiveness in some examples, and in others can also include other similarity/dissimilarity measures. Other modeling processes can be employed by the visualization engine to approximate the multi-dimensional space in a two-dimensional graph of the nodes. For example, force-directed placement modeling can be employed to generate the graph of nodes and distances.

Spring modeling generates a graph by replacing connections between the nodes with a "spring" (i.e., a mathematical approximation of a spring) to form a mechanical system model. The nodes are placed in some initial layout, which can be based on the values determined by the distance metric, after which springs exert forces on the nodes, moving the system to a minimal energy state. The resulting minimal energy state represents an efficient two dimensional approximation of the multi-dimensional space. One should appreciate that other models can be used, and different calculation can be employed to determine a minimal energy state in the spring force approximations. The models and minimal energy state calculations can be selected based on computational efficiency and/or burden. In some embodiments, the spring-force model is employed to increase computational efficiency.

As shown in FIG. 30, the representation of concepts within a set of materials includes objects with attributes that describe their respective objects. In FIG. 30 the set of materials includes people objects that store information associated with their respective objects. At 3000, a navigable structure is illustrated for viewing concepts within the set of materials. In particular, tags associated with the underlying people objects are mapped in the graph as nodes (e.g., nodes 3001-3005). In graph 3000, each node displayed is associated with the tags that characterize the people objects. The distance between the tags is calculated by the information retrieval system based on the similarity/dissimilarity of the sets of people objects who were tagged with those concepts.

In some embodiments, this determination of similarity can be generated without any semantic analysis of the tags; rather, the measurement of the distance between the tags is based on the prominence of the tags in the respective sets of people associated with each tag. Example measurements for distance include measurements of distinctiveness of interesting characteristics (e.g., as discussed with respect to processes 100-900), where the statistical distributions of the tags within the sets of people can determine the qualitative distinctiveness associated with each tag. In some examples, the tags comprise the interesting characteristics and/or candidate characteristics used to calculate the measurements of distinctiveness discussed above. In some embodiments, the measure of distinctiveness between each pair of nodes in the graph can be calculated as the dot product of the feature vectors that are associated with each node. For example, the distinctiveness can be determined as part of process 2900 at 2908.

According to some embodiments, an information retrieval system can be configured to display conceptual graph 3000. Graph 3000 can be displayed as part of user interface for controlling search and navigation operations executed by the information retrieval system. In some embodiments, the information retrieval system can be configured to respond to selections within the graph. In one example, the nodes visualized in graph 3000 can be transitioned to a view of the nodes corresponding to a respective selection. The transition between views can be animated to show re-arrangements of the displayed nodes based on any selection of nodes within the graph 3000.

Selections within the graph can achieve a number of functions. For example, selection of a node within graph 3000 can cause the information retrieval system to re-render the connections illustrated in the graph to show connections to the selected node (e.g., philanthropist 3005 can be selected at FIG. 30, with the resultant graph shown in FIG. 31). In another example, selection of a node within display 3000 can execute a transition to a new navigation state based on the selected concept. In yet another example, selection of a node can cause the information retrieval system to re-render graph 3000 to show connections to the selected node and re-arrange the graphical display based on recalculation of distances. In another option, selection within the graphical display can be configured to highlight concepts determined to fall within a threshold range for similarity (e.g., shown in FIG. 32—filmmaker 3003 and producer 3004 are highlighted).

In some embodiments, node selection for graphical display can occur by default operation of the system. In some embodiments, queries executed and/or navigation operations performed can be analyzed by the system to identify terms and/or concepts within the queries or navigation selections that contribute to the interestingness of the sets of materials returned on those queries or navigation operations. Interestingness of, for example, the queries, query terms, navigation operations, and the returned sets of materials can be determined as discussed above, and used by the system to set a default selection of a node or set of nodes within a graph of the nodes and connections.

In some embodiments, a visual display of the graph can be rendered concurrently with a display in a user interface of the sets of materials returned from the one or more collections of information. As the sets of materials are modified (for example, in response to new queries, new navigation operations, refinements, generalizations, de-selection of terms, cancellation of refinements), the visual display of the graph can transition to the attribute space and the respective nodes and edges defined by the modified sets of material. In some examples, new default nodes can be selected by the system based on interestingness. In other examples, the system can be configured to render the nodes of the attribute space without connections, and in response to selection of a node or nodes, connections and distances between the nodes can be rendered by a visualization engine. In yet other examples, the last navigation selection (e.g., selection of a facet in a user interface) can be used to establish a system selection of a node or nodes on which to render connections and distances. In still other examples, query terms can also be used to establish a system selection of a node or nodes on which to render connections and distances.

Figure 31:
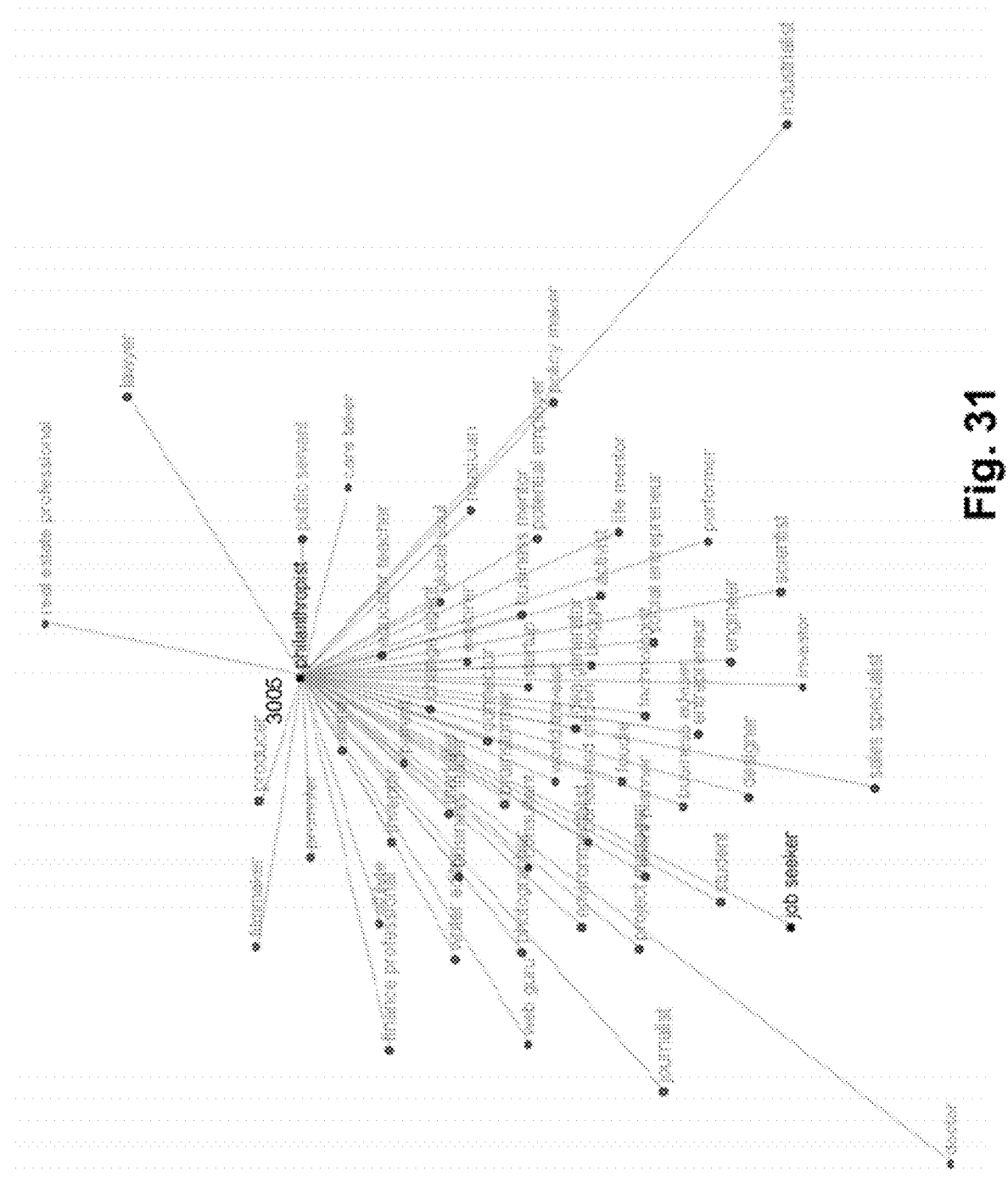
FIG. 31 illustrates an example graph of nodes of an attribute space according to one embodiment of the present invention.
Figure 32:
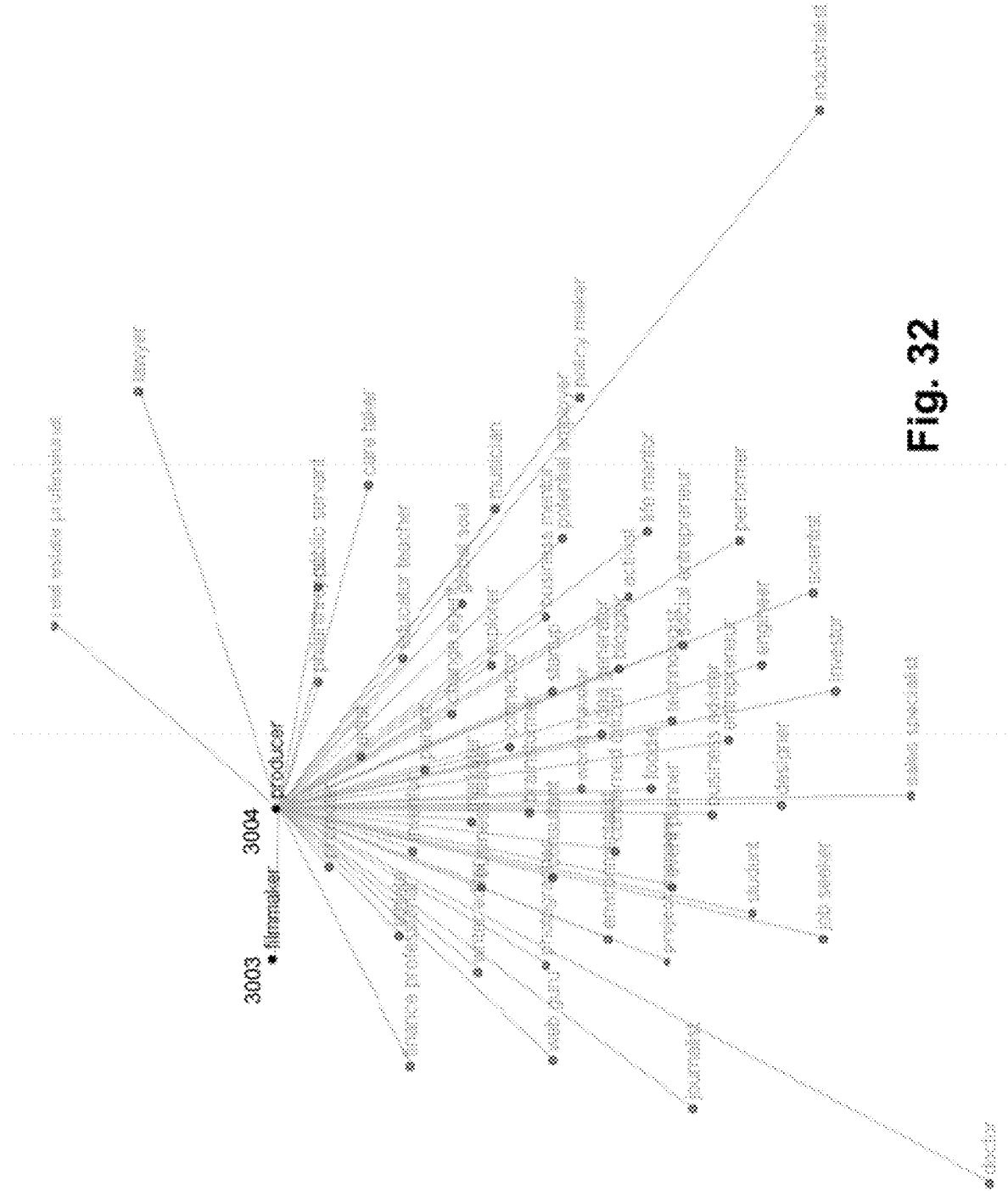
FIG. 32 illustrates an example graph of nodes of an attribute space according to one embodiment of the present invention.

In one alternative, selection within the graphic display can cause the information retrieval system to highlight nodes determined to be different (e.g., FIG. 31—philanthropist 3005 and job seeker 3049 are highlighted). Nodes exceeding a system-established threshold can be highlighted in a graphical display. Further, the information retrieval system can respond to thresholds entered via a user interface to determine which nodes should be highlighted for similarity and/or dissimilarity views. In some embodiments, modification to the displayed graph 3000 can be accomplished through a user interface displayed in conjunction and/or outside of graph 3000. For example, a user interface can accept user selections that identify specific portions of the display, highlight characteristics of the display, filter the display, and/or cause the system to execute a transition and display of another set of materials, as discussed in greater detail below.

Returning to FIG. 30, an example of a node in graph 3000 can include a descriptor for a person (that characterizes or describes that person). In another example, the set of materials can define a group of people and any information associated with those individuals. In some settings, the descriptors for a person can include reference to other sources of data, which can be captured and included as part of the description of a respective person or can be referenced during determination of an attribute space (e.g., as discussed in process 2900 at 2906).

In some embodiments, an information retrieval system can be configured to generate and visualize a concept graph with nodes including facet values describing the people, rather than some approaches which plot people as nodes with edges representative of connections between people. Inverting the attribute space to determine the similarity of the concepts people share based on the similarity of the populations of people that share the respective concept(s) enables the information retrieval system to efficiently identify and visualize connections between concepts. The spacing between the nodes or concepts in the graph can visually identify groups of concepts, and further enable a user to readily observe conceptual similarity without need of explicit computation of clusters of the rendered concepts.

Conventional clustering approaches can be significantly limited in that a concept's assignment to a cluster is typically based on direct analysis executed on members of a given cluster, with data that is determined similar placed within the cluster and dissimilar data excluded. According to some embodiments, the concept visualization approach enables rapid and intuitive shifts among concepts. Further, shifts in sets of materials being reviewed can result in transitions in the visualization of concepts. In one example, transitions between sets of materials result in the redefinition of the associated attribute space. The change in attribute space can cause a visualization engine to redraw the graph of concepts based on similarity determined within the new attribute space. In some examples, user selection can enable transitions across multiple dimensions in any attribute space.

Various embodiments overcome the limitations associated with assigning concepts to specific clusters. In some embodiments, a user interface of an information retrieval system can accept user specification of ranges for values of similarity to highlight similar or dissimilar nodes in a graph (e.g., FIGS. 31 and 32). In other embodiments, system default thresholds can be defined for values and/or ranges of values similarity for highlighting in the user interface.

Graph 3000 of FIG. 30 illustrates a plurality of concept nodes associated with underlying sets of people described by those concepts. As discussed, the distances between the nodes in graph 3000 reflect the degree of similarity between the concepts as calculated by, for example, an analysis engine of an information retrieval system. Edges between the nodes (not labeled separately) can be rendered in graph 3000 based on the two nodes describing or characterizing one or more people in the underlying sets of people. In some examples, the edges are rendered for any connections to a specific node, e.g., producer 3004. In other examples, edges can be rendered for sets of nodes.

Figure 29B:
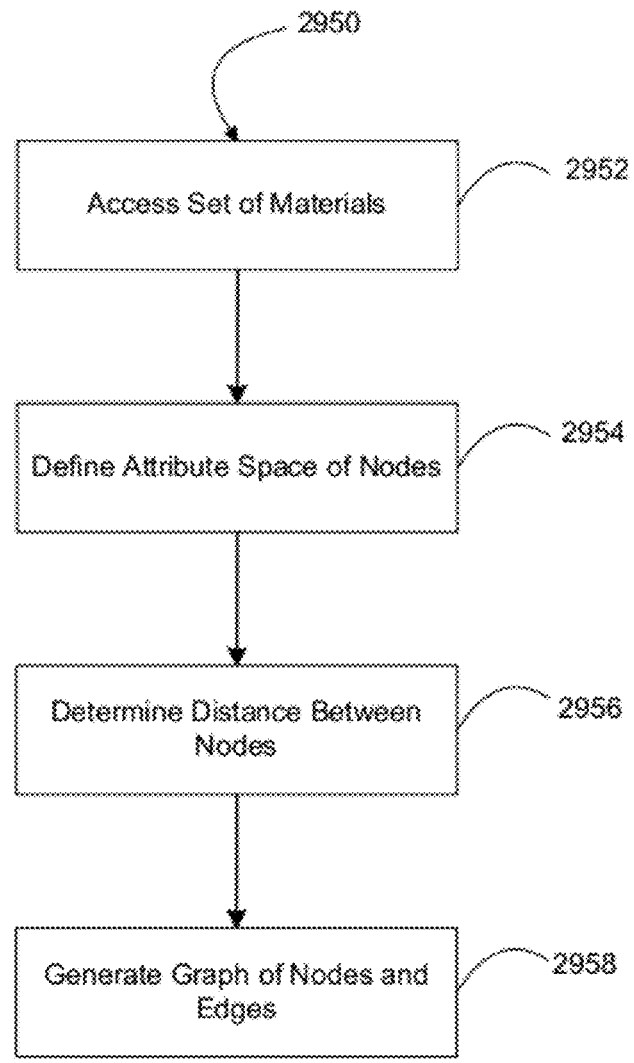
FIG. 29B shows an example process for generating and visualizing concepts according to one embodiment of the present invention.

An information retrieval system can be configured to execute a number of processes for visualization of concepts within any collection of information. Shown in FIG. 29B is an example process 2950 for generating and visualizing concepts. Process 2950 can be executed against a set of materials obtained from a collection of information by an information retrieval system. In one embodiment, a set of materials can include objects, associated with descriptive attributes. Further, the information retrieval system can be configured to capture additional information regarding objects stored in a collection from other online systems. In one example, people objects can be augmented with data retrieved from online social sites. The set of materials accessed at 2952 can be defined by the information retrieval system, for example, in response to a query or navigation selection.

In one example, the groups of people objects are returned as results from an executed query. The returned results can be used to define an attribute space at 2954. The information retrieval system can determine similarity of concepts within the attribute space associated with the groups of people objects. The attribute space can be defined at 2954 to include all the information associated with the groups of people. The information associated with the groups of people can be defined as nodes in a graphical representation of the attribute space. In some embodiments, the nodes in the attribute space can include facets that describe the people objects, attribute-value pairs that characterize or describe the people objects, and relationships defined between objects, among other examples. In one embodiment, similarity between each node in the attribute space can be determined based on comparisons of sets of people that have a given concept/attribute associated with them.

The defining of the attribute space at 2954 by the information retrieval system operates to invert the data set being examined from, for example, the set of results and how similar each result may be to another result, to an analysis of concepts associated with those results. Rather than listing or analyzing records of people with certain attributes and determining how similar people are to other people, various embodiments visualize sets of attributes those groups of people have. The inversion of the object-attribute analysis enables efficient visualization of the concepts associated with the groups of people. At 2956, the distance between the nodes in the attribute space can be determined. In one example, distance is calculated between two nodes based on measurements of distinctiveness of the set each node is associated with. For a set of materials including people objects having attributes that characterize or describe each people object, each node can be an attribute of a people object associated with the set of people having that attribute. The associated sets can be compared to determine the similarity between nodes.

Other distance metrics can be used to determine the distance between nodes, for example, Kullback-Leibler divergence, Euclidean (L2) distance, Manhattan (L1) distance, Hellinger distance, diversity difference, cosine difference, Jaccard distance, Jenson-Shannon divergence, and skew divergence can be automatically determined by the information retrieval system. Further, other similarity functions and correlation measures, such as the Pearson correlation coefficient, Dice coefficient, overlap coefficient, and Lin similarity, can be calculated by the information retrieval system to determine a distance between sets.

Each node in the attribute space can be plotted on a graph at 2958. The graph can also be generated to render each node or subsets of nodes within the attribute space. At 2958 connections between nodes are rendered in the graph as edges connecting pairs of nodes. In one example, two nodes have an edge connecting them if one or more objects from the set of materials share a common attribute.

Figure 33:
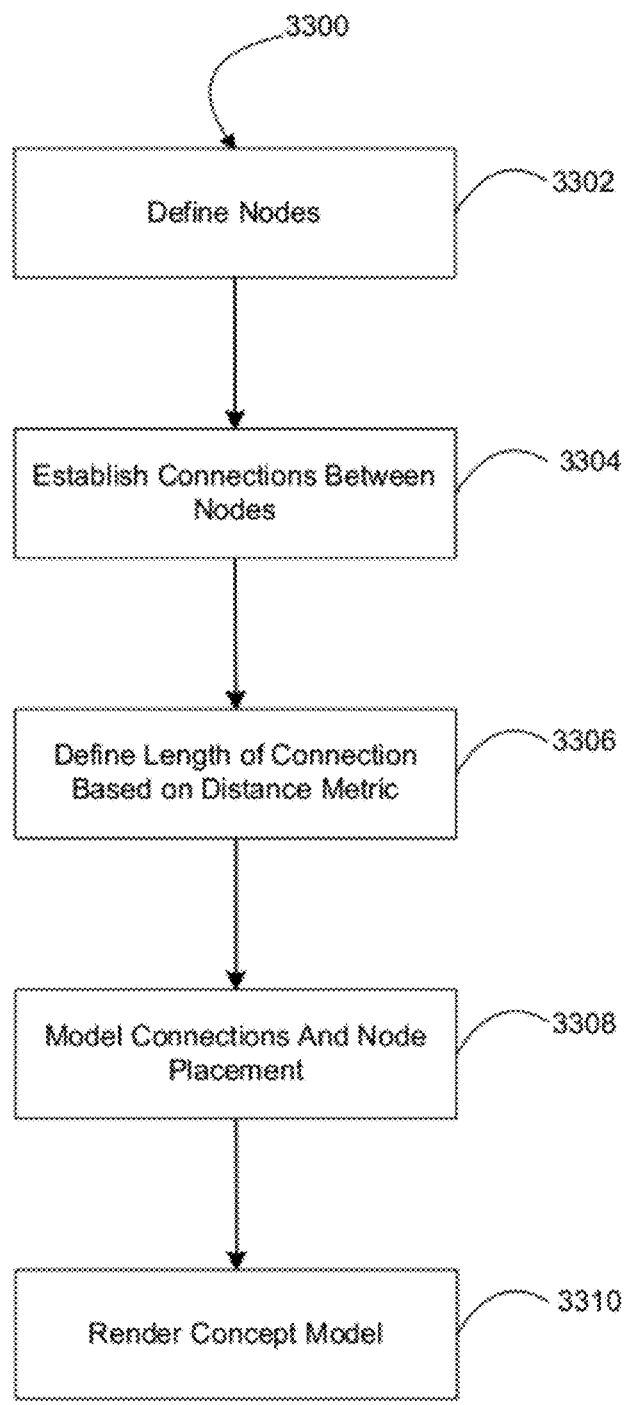
FIG. 33 shows an example process for rendering a concept model graphically according to one embodiment of the present invention.

Processes for generating and visualizing concepts within a knowledge base or a collection of information (e.g., 2900 and 2950) can include multiple sub-processes. Shown in FIG. 33 is an example process 3300 for rendering a concept model graphically. At 3302, the nodes to be graphed are defined based on a set of materials being analyzed. The nodes can be defined based on a property of the underlying set of materials. In one example, the property can be an object type. In another example, the property can include a data type, common data characteristics, sets of data types, and/or sets of characteristics of the data.

In one embodiment, the nodes are defined at 3302 to include the data associated with an analyzed set of materials. Each node can be defined based on characteristics of the underlying data, information describing the data, information within the data or data objects, and/or information characterizing the data, among other examples. Connections between the nodes can be established at 3304. Each connection between a pair of nodes can identify when one or more members of the set of materials is described by or associated with the pair of nodes. In some embodiments, the nodes and the attribute space can be established by other processes, and the definition of nodes can be reduced to accessing nodes defined for a set of materials at 3302. In some examples, the attribute space, the nodes, and their connections can also be defined by other processes, and the acts of definition of nodes and establishing connections at 3302-3304 can be executed by accessing the node and connection definitions determined from other processing.

Nodes defined at step 3302 and the connections between them established at 3304 are used to determine initial positions within a graph of the nodes and connections. The length of the connections between the nodes can be based on the calculations of a distance metric at 3306. In one embodiment, the length of each connection and a corresponding display distance is inversely proportional to how similar the nodes are. In one example, the values for the distance metric are determined as part of other processes and the definition of length of a connection between two nodes at 3306 can be executed by accessing a stored value for the distance metric.

The nodes, node connections, and lengths of respective connections are used to define a model of the graph at 3308. The model can be generated at 3308 to fit within a display boundary defined by the information retrieval system. In some examples, the scale of the visualization can be adjusted by the information retrieval system to permit the visualization of the most dissimilar (and longest distance) nodes to fit within any system defined display boundary.

In some embodiments, the graph of nodes, connections, and respective distances define a multi-dimensional graph of the nodes and edges. In some examples, modeling connections and node placement includes approximating the multi-dimensional space in a two dimensional graph at 3308. Approximating can include generating a spring-force model of the multi-dimensional space. The generation of the spring-force model can include generating a system in which nodes are given an initial position based on the distance metric and connections between the nodes are defined using equations representing the actions of springs. Each spring is given a length based on the distance metric, and a strength for each spring is defined. The system of nodes and spring connections is allowed to reach equilibrium. In other words, the system and spring connections can be solved to determine a minimum energy position which defines an approximation of the multi-dimensional space.

Once the equilibrium or minimum energy position is established, a concept graph of the nodes and edges can be rendered based on the equilibrium positions at 3310. In one example, process 3300 can be executed responsive to a user request accepted in a user interface of an information retrieval system. In one embodiment, a user interface can be configured to present selectable options within a display that, in response to selection, cause a visualization engine to render a concept graph of a set of materials. In another example, selection of concept graph within the user interface can cause the visualization engine to execute process 3300.

According to some embodiments, process 3300 can be configured to trigger or execute other processes as part of the execution of steps 3302-3310. In one example, defining the length of a connection based on a distance metric at 3306 can invoke other processes for calculating the distance metric. In one alternative; step 3306 can access a value for a distance metric generated by another process. Process 3300 can also be executed in conjunction with other processes, for example, 2900 and 2950, or as part of processes 2900 or 2950. In one example, process 3300 can be executed in conjunction with 2958 or executed, for example, as part of step 2958.

Figure 34:
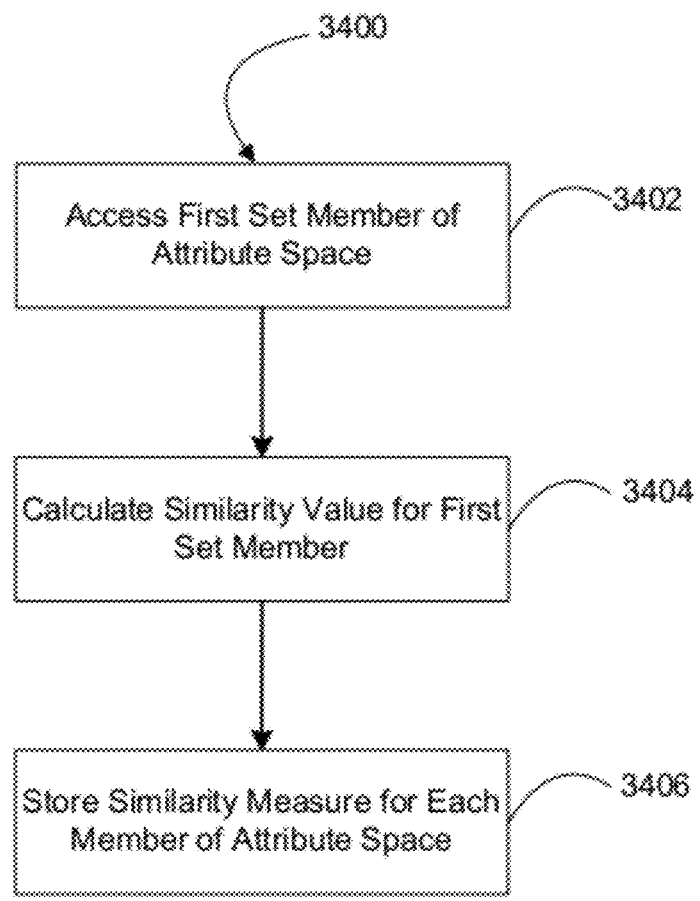
FIG. 34 shows an example process for calculating a distance value according to one embodiment of the present invention.

Shown in FIG. 34 is an example process 3400 for calculating a distance value for a node in an attribute space. As discussed above, the attribute space is defined based on information associated with a set of materials from one or more collections of information. Nodes within the attribute space can include one or more concepts within the information associated with the set of materials. At 3402, a first set member or node of the attribute space is accessed. At 3304, a similarity value for the first set member is calculated. In some embodiments, similarity is calculated pair-wise for nodes in the attribute space based on their associated sets.

In one example, each node in the attribute space is associated with a subset of the set of materials used to define the attribute space. Under a pair-wise approach, a first subset of the set of materials associated with the first set member of the attribute space is compared to a second subset of the set materials associated with a second set member of the attribute space. The similarity between the nodes is determined by comparing the first and second subsets associated with each set member. Similarity can be calculated for the first set member against the remaining set members (e.g., first and third, first and fourth, etc.) until a system-defined stopping point is reached. In one example, every node in an attribute space is compared before reaching the system-defined stopping point. In another example, nodes with explicit connections (one or more members of the set of materials defining the attribute space is associated with each of a pair of nodes) are compared until all nodes with explicit connections are compared. In some embodiments, unconnected nodes can also be compared to establish a similarity value for each node until all the connected and unconnected nodes have been compared. In another embodiment, a node is the graph can be selected in a user interface. The similarity calculations can proceed for the selected node against the other nodes in the attribute space. Further selections can cause the system to calculate similarity for the currently selected node against the other nodes in the attribute space, and render the nodes and distances accordingly.

As each similarity value is determined, the similarity measure for each member of the attribute space can be stored at 3406. In some embodiments, similarity can be determined for a node and any associated set of materials based on a determination of the distinctiveness for each node. For example, as discussed with respect to processes 100-900, measurements of distinctiveness can be employed to determine the similarity between nodes. Similarity between nodes can be calculated based on statistical distributions of identifying characteristics within respective subsets of materials. As discussed, the measurement of distinctiveness for each node can be normalized and/or calculated with respect to baseline measure.

In some embodiments, each node can be used as the at least one identifying characteristic or one of the at least one identifying characteristics in any process to determine a measurement of distinctiveness for the node. The statistical distribution(s) for the at least one identifying characteristic (e.g., node in the attribute space) can be determined and used to calculate the measure of distinctiveness for the node.

In other embodiments, similarity can be calculated based on a matrix comparison of similarities of nodes and respective subsets of associated materials. In one example, similarity can be determined from a matrix of nodes and the subsets associated with each node in the matrix. In another example, similarity is calculated as the vector dot product between the analyzed subsets of materials. In some embodiments, objects in the set of materials can be described by vectors and the vector dot product is calculated to obtain the cosine of the angle between two vectors. The cosine of the angle between the two vectors can be used to determine similarity between the objects. In some embodiments, the vectors representing the subsets of materials are compared to obtain the cosine of the angle between the two vectors and the result used to determine their similarity. The similarity measure can be used to plot the nodes in graph having a distance between them based on or approximating the determined similarity measure.

Search and Navigation with Visualization

System 3500 of FIG. 35 can be a specially configured general purpose computer system or a plurality of computer systems (e.g., as discussed with respect to FIG. 25-27) for visualizing concepts from any set of materials obtained from the one or more collections of information. System 3500 can be configured to execute any one or more of the processes discussed above with respect to visualizing concepts, determining a distance metric, and/or determining a measurement of distinctiveness of nodes in an attribute space. In some embodiments, system 3500 can be configured to visualize concepts within a collection of information 3508 responsive to requests received from a user entered in a user interface 3514 on a host computer system 3512. In other embodiments, system 3500 can be configured to visualize concepts responsive to requests received from other computer systems or in response to automated analysis of one or more collections of information.

According to some embodiments, system 3500 includes an analysis engine 3502 configured to analyze one of more collections of information (e.g., 3508). In one embodiment, the one or more collections of information can be stored in a memory of system 3500. In another embodiment, the one or more collections of information can be operatively connected to system 3500. For example, the one or more collections of information can include a plurality of database servers with associated databases for storing the one or more collections of information.

The databases and/or collections analyzed can be organized under a plurality of configurations. In some settings, structured databases can be analyzed, and sets of materials within the structured databases can be further analyzed to generate concept graphs reflective of the similarity of concepts associated with the sets of materials. In other settings, the analysis engine is configured to analyze unstructured data to identify and graph concepts within sets of materials obtained from the unstructured data. Further, the analysis engine can be configured to analyze semi-structured and/or self-describing data stored in one or more collections of information or any combination of data sets stored in the one or more collections of information.

In some embodiments, the analysis engine is configured to return results from a collection responsive to queries and/or navigation selections received from a user interface (e.g., 3514). In one embodiment, analysis engine 3502 generates results that can be rendered on a host computer 3512 in a user interface 3514 by a user interface engine 3506. The user interface engine can be configured to generate instructions that when executed by a host computer cause the host computer to render the user interface. In other settings, host computer 3512 can include a browser configured to display information communicated by user interface engine. Further, user interface engine 3506 can be configured to receive input and trigger responsive operations on system 3500 based on requests from a host computer 3512 or a browser program executed on host computer 3512. In one embodiment, user interface engine 3506 can be configured to communicate and/or stream instructions over a communication network 3510 to cause host computer 3512 to render the user interface 3514 based on information received from an analysis engine 3502.

In some embodiments, system 3500 includes a visualization engine 3504 configured to generate a concept graph from a set of materials. Visualization engine can be configured to perform any of the functions discussed above; in particular, visualization engine can be configured to execute any one or combination of processes 2900, 2950, 3300, and 3400. Visualization engine 3504 can operate in conjunction with an analysis engine 3502 to generate a graphical representation of concepts associated with a set of materials, wherein concepts are rendered as nodes within the graph having a display distance between the nodes reflective of the similarity between the concepts. Similarity between the concepts can be determined by the analysis engine 3502 based on a subset of materials associated with a respective concept as compared to another subset of materials associated with another respective concept. In other embodiments, the visualization engine can determine similarity directly, and in others can access calculations made by the analysis engine.

In some examples, a visualization engine is configured to access sets of materials established by the analysis engine and transform a view of the sets of materials into a conceptual graph of nodes and edges of the accessed sets of materials. Rather than present attributes of objects and various organizations of those objects and attributes (e.g., FIG. 36), the visualization engine inverts the analyzed space and presents a visualization of concepts based on the similarity of the objects.

The visualization engine 3504 can also be configured to transition the conceptual graph to render new views of the displayed concepts. In one example, transitions in views are executed in response to selection of a node displayed in the graph. The nodes are re-arranged based on their similarity to the selected node. Connections are rendered to the selected node. The change in position can be displayed as an animation from a first view as a starting position that transforms it into a second view of concepts.

The visualization engine 3504 can also be configured to render successive views of concepts based on transitions between sets of materials from the one or more collections. Changes in the underlying sets of materials can cause an analysis engine to redefine the attribute space, the nodes that are displayed, and the distance metric between the nodes. The visualization engine can be further configured to animate the transitions in the concept graph. In one example, refinements made to the set of materials narrows the set of materials to a subset matching the refinement. The visualization engine can render an animation using the initial concept graph as a first state and using the concept graph associated with the subset of materials as a second state. The visualization engine can animate the change in the nodes rendered, the change in the edges between the nodes, etc. In another example, selection of a node within the graph can trigger an animation that illustrates the change in focus from an initial node as the center of the graph from which edges radiate, to a new nodal center from which edges radiate (e.g., transitioning from FIG. 31 node 3005 to FIG. 32 node 3004).

In some embodiments, the visualization engine is configured to generate a computer model of the nodes and edges from data determined by an analysis engine. In some examples, the visualization engine can be configured to communicate the computer model to a user interface engine for generating the display of the model. In some embodiments, the analysis engine, visualization engine, and user interface engine can be configured to provide search and navigation operations in an information retrieval system to, for example, a user connected to the information retrieval system on host computer 3512. In other embodiments, the analysis engine and visualization engine can be configured to perform all of the operations discussed with respect to the analysis, visualization, and user interface engines, and either can be executed alone to provide for search, navigation, and visualization of concepts within collections of information.

Faceted Navigation

In one embodiment, analysis engine 3502 is configured to provide a search and navigation interface in conjunction with user interface engine 3506 to the one or more collections of information. The search and navigation interface can be configured to provided a faceted navigation platform by which information stored in the one or more collections of information can be accessed, refined, filtered, or otherwise interacted with.

A faceted navigation platform can include computer-implemented processes executed on a system configured to provide an interactive query refinement interface for locating and retrieving information from one more collections of information. In some embodiments, the information stored in the one or more collections can include documents. Documents can include data organized into objects. In some embodiments, each object can be described by a faceted classification scheme.

A faceted classification scheme is a system for classifying a collection of information using a set of facets, where each facet represents a collection of related values or categories. For example, for a collection of materials representing a catalog of books, the facets might include Author, Subject, Year of Publication, etc., and the Author facet might include values like "Herman Melville" and "Mark Twain."

Each facet consists of a collection of related values that may be used to describe a subset of the objects to be stored in a knowledge base. The values in a facet may be of arbitrary size and form. For example, the values in a facet may correspond to database rows, text, XML or SGML documents, digital images, or any combination of these elements and any other digital information.

The values in a facet may be organized hierarchically, with more general topics at the higher levels of the hierarchy, and more specific topics towards the leaves. For example, a Subject facet for books might include top-level categories such as "Business & Money" and "Computing & Internet." The "Business & Money" category might include child categories such as "Careers & Employment," "Management & Leadership," "Personal Finance," etc., and the "Computing & Internet" category might include child categories such as "Graphics & Design," "Operating Systems," and "Programming."

A faceted classification scheme assigns a mapping from each object in a collection to the complete set of facet categories that describe that object. Objects can be assigned an arbitrary number of categories from any facet. For example, a book might be assigned multiple Author categories, because books can be written by more than one Author. Yet a book might be assigned no value from the Illustrator facet, since it may contain no illustrations.

Each object is associated with a collection of facet values. An association between a facet value and an object indicates that the facet value describes or classifies the object. The assignment of a descendant facet value to an object implies that all ancestor facet values are also associated with the object. Objects may be assigned multiple values from a given facet. For example, a book about the history of music might be assigned both of the facet values Subject: History and Subject: Music. Objects may be assigned no values from a given facet.

Objects in a knowledge base may represent a heterogeneous collection of concepts. For example, in a books knowledge base, some of the objects could represent books, while others could represent people who had contributed to the books, for example as authors. A facet may be used to allow the identification of sub-collections of interest.

A knowledge base can also encode a set of relationships among contained objects. Each relationship links an object to a related object via a connection, which may be specified by a name or by some other means, e.g., the types of the source and target objects. Each object may participate in zero, one, or more relationships Faceted classification systems enable a more compact and efficiently represented taxonomic schema than traditional single-hierarchy approaches to object classification such as the Library of Congress Classification System. They are easier to extend as new dimensions of object description become necessary, compared to tree-structured systems such as the Yahoo directory.

Typically, a faceted navigation system initially makes available a complete set of facet categories that describe any object in a collection. The user of a faceted navigation system may select from these facet categories to narrow the set of selected objects. After the user makes a selection, the set of facet categories presented by the system is pruned to display only those assigned to the remaining filtered objects. That is, the system only presents categories for which there exists an object described by both that category and all other previously selected categories.

Such an interface allows the user to select parametric query refinements incrementally, and in the process to narrow down the set of selected objects, effectively searching the database for some subset of interest. The search process can be made more efficient and less frustrating by the removal of invalid facet categories that would lead to empty sets of selected objects, which can be an undesirable result in most database search applications. In some embodiments, faceted navigation can be provided with a query interface, that accepts and executes, for example, user entered queries on the collection. The queries can include specification of facets, categories, and/or may refine a set of selected objects based on any information associated with the set of objects.

In some embodiments, the faceted navigation system can include both navigation and search functionality. The navigation functionality can be configured to present faceted navigation operations and may organize the presentation of facet categories that are part of a hierarchical facet. For example, a faceted navigation platform might show only the highest-level facet categories initially available in each facet, and provide controls for the user to expand to lower levels of the hierarchy. U.S. patent application Ser. No. 09/573,305, entitled "Hierarchical Data-Driven Navigation System and Method for Information Retrieval," and U.S. patent application Ser. No. 11/271,036, entitled "System and Method for Information Retrieval from Object Collections with Complex Interrelationships," both of which are herein incorporated by reference, disclose systems and methods for implementing a faceted navigation platform.

Analysis Engine

In some embodiments, the analysis engine operates in conjunction with the user interface engine to permit incremental parametric query refinements to be executed on the one or more collections of information. In other embodiments, the analysis engine can be configured to generate and communicate any display information required to cause host computer 3512 to display user interface 3514 of FIG. 35.

Figure 36:
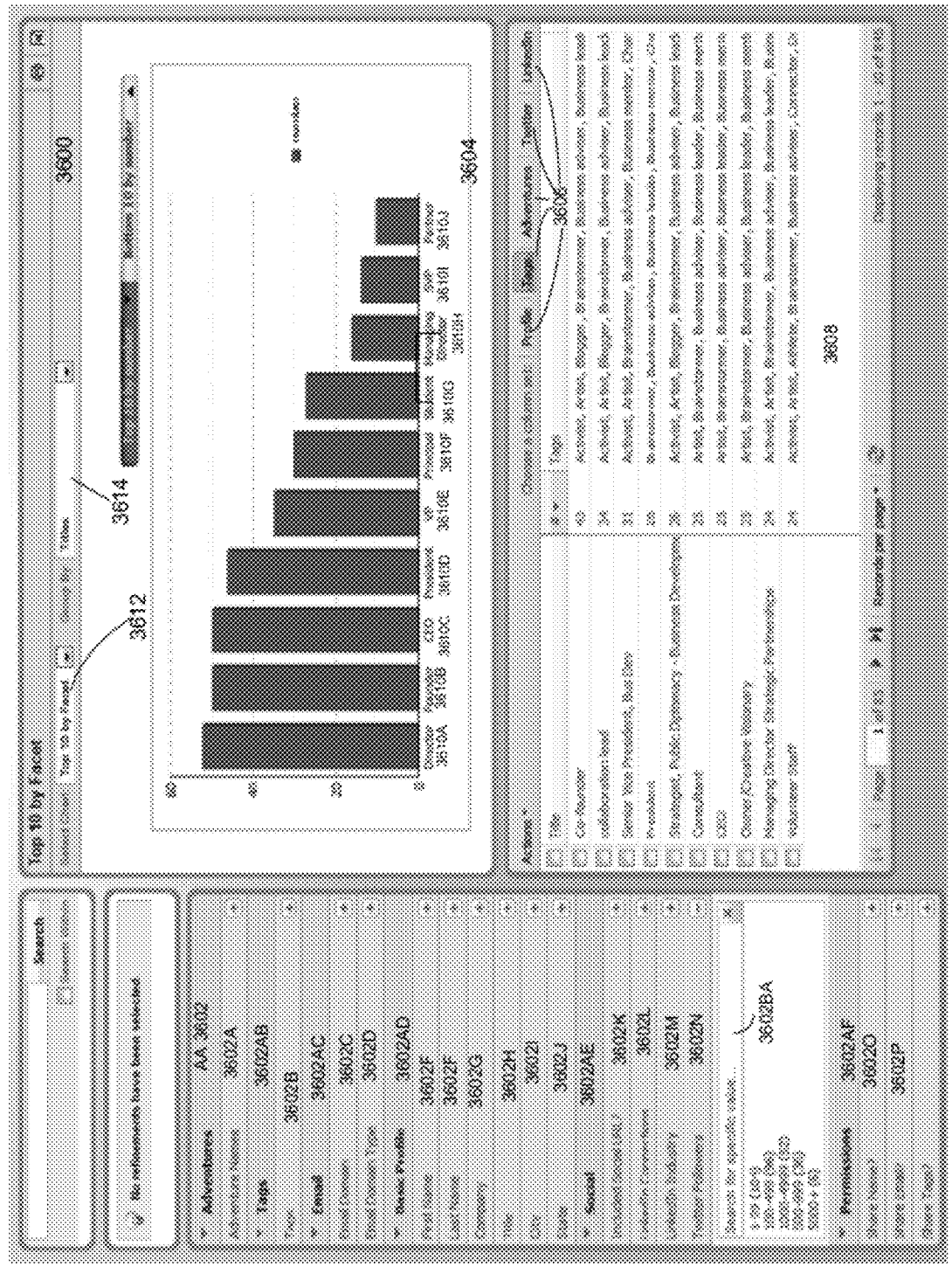
FIG. 36 shows an example dashboard for a user interface according to one embodiment of the present invention.

In some embodiments, the analysis engine can be configured to execute queries and/or navigation operations that return results from the collection of information including documents, objects, or other data storage units. The analysis engine can be configured to execute queries or navigation operations based on user input received from a user interface. For collections of information organized based on facets and/or a faceted classification scheme, the analysis engine can also be configured to return faceted classifications for results instead of or in conjunction with the documents or objects that make up a set of results. Shown in FIG. 36 is an example dashboard 3600 which can be displayed as part of a user interface. Dashboard 3600 provides a user based portal for accessing the information stored and retrievable by an information retrieval system.

In some embodiments, analysis engine 3502 can be configured to provide analytic information including, for example, rankings of facets and/or facet values associated with a set of objects in a collection displayed in dashboard 3600 at 3604. Analytic information can be determined in conjunction with generating a set of results, determined in advance, among other options. Dashboard 3600 can also be configured to render a concept graph at 3604 based on user selections in dashboard 3600. For example, FIG. 30 illustrates an example concept graph of nodes and edges that can be rendered in dashboard 3600 at 3604.

In some settings, the user interface engine is configured to display selectable facets in a user interface displayed on a host computer system. Column 3602 can include objects, facets categories (3602AA-AF), and facets (3602A-P) among other examples. In some embodiments, the dashboard 3600 is configured to present sets of materials within a collection of information and/or information about a current set of materials at 3604. Selections within column 3602 can cause an information retrieval system to refine the current set of materials being displayed. In addition dashboard 3600 can include search functionality, for example, at 3602BA. In some embodiments, the search functionality can be based on selections of ranges within facet values. For instance, the ranges can be determined by an analysis engine identifying intelligent ranges within the collection. The ranges and/or intelligent ranges are presented, for example, in drop down menu 3602BA.

In other embodiments, search functionality can include entry of queries, query text, query syntax, etc. for searching within a current set of materials or to expand the current set into the overall collection based on any results of the query executed against the entire collection. Some embodiments are also configured to enable query based searching within a current set of objects being displayed.

Each object, facet category, and/or facet (e.g., 3602A-P and 3602AA-AF) can be displayed with a plus symbol that is configured to expand a view of the information associated with the object, facet category, and/or facet. The expanded view can be collapsed by selection of a minus symbol display. In particular, dashboard 3600 can be configured to display each facet or facet value associated with a facet category or facet upon selection of an expand operator, and contract the expanded view in response to selection of a contraction operator.

Selection within the facet categories can cause the system to execute refinements on the current set of materials being displayed. In one example, the analysis engine executes the refinement operations and communicates the results to a user interface engine for display. The analysis engine can also be configured to provide analytic information on the current set of materials. In one example, the analytic information can be accessed through drop down menus at 3612 and the information displayed organized by selection in drop down menu 3614. An example view of analytic information appears at 3604. Shown at 3604 are the top ten tags (e.g., 3610A-3610J) assigned to people objects in the accessed set of materials organized by facet. Other facets can be selected for analysis and display. At 3606 are illustrated examples of selection options "Profile," "Tags," "Adventures," "Twitter," and "LinkedIn". Other views of the facets, facet categories, and facet values can be displayed, for example, at 3608. The information displayed can be organized based on facets, facet values, and facet categories that are associated with the current set of materials. Dashboard 3600 can be configured to be responsive to selection of any of the facets, facet values, and facet categories to reorganize the display, for example, at 3606.

Drop down menu 3612 can also be configured to allow a user to select a concept graph within menu 3612. Selection of a concept graph can cause the system to generate a visualization of the concepts associated with the current set of materials. In some embodiments, the visualization presents a two dimensional approximation of the similarity of each of the concepts within the set of materials based on the display distance between the nodes in the graphs. Edges can be shown in the graph based on one or more objects in the current set of materials having the same concepts (e.g., FIG. 30). The concepts visualized can be defined by an analysis engine, and the positions within the display defined by a visualization engine based on similarity analysis (e.g., as discussed in processes 2900 and 2950).

Dashboard 3600 can also be configured to separately display a search and/or query interface. The search and/or query interface can be configured to execute user defined queries and/or search terms in, for example, a text box displayed in the user interface 3514. Both approaches for interacting with one or more collections of information can be supported by system 3500, and in one embodiment, any associated operations on the set of materials can be executed by an analysis engine.

In some other embodiments, selections within dashboard 3600 can define a set of materials from a collection of information. The defined set of materials can be used by the analysis engine to define the attribute space to analyze. In one example, the attribute space includes all of the information associated with the defined set of materials. The similarity between concepts in the attribute space can be determined, for example, by the analysis engine. In one example, the attribute space can be defined based on a characteristic within a set of materials.

In one example, a common characteristic (or set of characteristics) can be employed by the analysis engine to establish an attribute space for a group of documents. The attribute space can be analyzed to determine conceptual similarity within the attribute space. As discussed, the attribute space can include one or more attributes of the documents, information associated with the documents, facets, facet-value pairs, information contained within the documents, etc. for any of the documents that have the common characteristic. In some embodiments, the analysis engine can be configured to identify concepts within the attribute space and a visualization engine can be configured to render the concepts graphically based on the similarity of the analyzed data in the attribute space. In some embodiments, the analysis engine transforms the subject of the similarity analysis using the common characteristic. The analysis engine can define an attribute space, for example, based on all the information associated with a characteristic or a set of characteristics. In some examples, the information analyzed for similarity can include any queries used to establish a characteristic or set of characteristics and/or any navigation selections made to modify a set of materials returned by an information retrieval system.

In another example, an information retrieval system can be configured to include any element of data within a collection. The distinctiveness of the elements of data and/or their associated documents can be represented graphically as spacing between nodes in a graph which can be defined by the elements of data and/or their associated documents. The nodes in such a graph can be illustrated with connections between pairs of nodes when the pair of nodes are associated with a common characteristic. The length of the connections and any distance between nodes can be configured to reflect the similarity of the nodes by the inverse of the distance between them. In some examples the greater the distance between any two rendered objects, the greater their dissimilarity.

Navigable Visualization

In another aspect, the visualization engine 3504 can be configured to generate data used by the interface engine 3506 to render a navigable structure in a computer display. In one example, the navigable structure can include a graph of nodes and respective positions calculated by the visualization engine. In some embodiments, the nodes can be defined based on attributes of documents stored in a collection or any subset of the documents. In other embodiments, each of the nodes can be defined based on sets of documents and/or associated attributes. In yet other embodiments, the nodes can include any query, queries, or query terms performed on the collection and/or any navigation operations used to navigate through elements of data stored in the collection.

The navigable structure can be configured to permit selection of any displayed node. Selection of node in a user interface can be configured to execute navigation operations through the elements of data stored in the collection, by facet, facet category, object, document, document attribute, etc. Navigation can occur on, for example, interesting or identifying characteristics determined from analysis of the collection. In one embodiment, selection of a given node can include re-calculation of the similarity of the displayed nodes as a user navigates within the structure.

In one example, navigation within the displayed structure can refine, generalize, or shift a displayed set nodes (and their associated of attributes of documents) based on the node selected. Selection of a node that is defined on a set of documents and/or attributes can transition the display into a rendering of the components of that set of documents and/or attributes. Each of the nodes within the displayed set can include other sets, individual attributes, etc.

In another example, each node in a displayed graph can represent attributes that an analyzed set of documents have. In some embodiments, the nodes in the graph can include connections between the nodes based on, for example, an underlying document sharing those attributes. The length of the connection rendered in the display or the distance between the connected nodes is configured to visually indicate similarity and/or distinctiveness of the connected nodes.

In some embodiments, the visualization engine can be configured to generate an isometric view for display on a computer. The isometric view can be configured to be responsive to selection within an interface displayed on the computer.

In response to the selection of a node in the display, the visualization engine can be configured to render a new set of nodes. In some embodiments, selection of a node causes the visualization engine to render a new set of nodes which represent a new set of materials from the collection. In one example, the new set of materials is determined based on an association with the selected node. A change in the displayed set of nodes can trigger recalculation of any distance metric based on the currently viewed population of nodes and their characteristics. For example, distinctiveness can be recalculated for any node relative to the currently rendered set, interesting characteristics can be determined within the current set using statistical distributions measured relative to and/or normalized against the current set. Relative measures of distinctiveness can likewise change based on a change in set under evaluation.

In another aspect, the visualization engine can be further configured to generate a navigable visualization of concepts based on a determination of the distance between the concepts. In some embodiments, concepts can be determined from the identification of interesting characteristics or the execution of the processes to identify interesting characteristics. According to one embodiment, a visualization engine is configured generate a display of concepts for a user interface, wherein the display of concepts is responsive to selection within the user interface. The generation of the display can include plotting of nodes in a graph. In some settings, each node can reflect a concept in a set of materials. Connections between the nodes can be determined based on underlying materials in the set of materials sharing concepts.

In one example, the set of materials includes documents defining information about people. Each document can store information about a person as attributes of the document. Rather than visualize the people within the set of materials for selection in the user interface (with the distances between the people nodes identifying the similarity and/or dissimilarity between them), the visualization engine can be configured to display the set of attributes describing those people and establish in the graph the similarity between concept associated with those people based on the distances calculated between respective attributes.

In another aspect, the visualization engine is configured to animate a graph of concepts associated with a set of material shown in a user interface. As a currently selected set of materials is transitioned to a new set, the graph of nodes can transition to a new set of nodes associated with the new set of materials. For example, as an information retrieval system executes search and/or navigation operations, a set of materials being accessed changes, for example, as refinements are made or the set of materials is expanded by eliminating refinements. The changes in the accessed set of materials can be reflected concurrently in a graphical display of the concepts associated with the selected set of materials.

According to one embodiment, as a set of materials accessed by the information system changes, the corresponding concept graph of nodes and edges can change. New nodes can be rendered within the display and existing nodes can be removed. Edges can be drawn and erased from the display as the navigable visualization transitions from a first set of nodes and edges to another set of nodes and edges. In one embodiment, the visualization engine can be configured to be responsive to transitions between sets of materials, and can also be configured to automatically transition the graphical display to a new state based on the executed transitions.

In one embodiment, the user interface can be configured to accept user selection of concepts, documents, objects, object facets, facet categories, etc., within the graphical display. The visualization engine can be configured to modify and/or highlight the graphical display based on selections within the user interface. Some example system responses to user interface selection can include:

Pick facet—change orientation of graph to selected facet

Pick facet category—narrow graph of nodes and edges to selected facet category

The system can optionally re-calculate similarity based on the new set of nodes and edges or orientation of graph Example Process and Data Flow FIG. 28A is an example of a conceptual model of process flow and data interactions that can occur in generating a navigable data structure for concept visualization. Shown is one of more collections of information 2802 operatively connected to an information retrieval system. The information retrieval system can be configured to access the collection to return information stored therein. The information retrieval system can be configured to accept and process queries against the one or more collections and/or the information retrieval system can be configured to allow navigation through any of the elements of data stored in the one or more collections. Navigation and query operations can access and return, for example, documents stored in a collection. In addition, navigation and query operations can return attributes of the documents stored in a collection, among other options. In some embodiments, various combinations of documents and attributes can be accessed and returned in response to queries and navigation operations. The returned documents and/or attributes can be generated and communicated as a set of results or a navigation state including a set of materials from the one or more collections. In other embodiments, sets of materials can be organized by the information retrieval system based on automated data analysis and/or data mining operations. The automatic analysis of the one or more collections can provide sets of materials from the collections, that can be analyzed to identify and visualize concepts.

The one or more collections of information (e.g., 2804) can store data, for example, documents 2806 for retrieval by the information retrieval system. Documents can include discrete text files that may also be associated with metadata, such as a name, author, and date of creation. Documents can include attributes 2808-2814 that characterize the document, or can be associated with attributes 2808-2814 that characterize the documents. Documents may also represent other addressable and selectable media, including non-textual data, such as sound and visual recordings, database records, and composite entities such as might be described using HTML and XML encoding. Similarly, although the term "document set" may describe the entire collection of documents, it may be applied equally well to a subset of the whole; for example, all documents permitted to be accessed within a currently active security, privacy or confidentiality regime, or a collection of documents previously selected by the user to be manipulated by an information retrieval system. Thus, both individual documents and collections of documents may take many forms, including file systems, relational databases, hypertext collections (such as the World Wide Web), or the like. The documents attributes may likewise be contained within the documents, and/or associated with the documents. In some examples document attributes can be extracted from the documents.

Sets 2816A-D can be generated from any of the data or elements of data stored in the collection. Further sets 2816A-D can include information used by the information retrieval system to access the collection. In some examples, the elements of data can include the documents stored in the collection, the attributes associated with the documents, text from a query, navigation operation, results from a query, results from a navigation operation, among other examples. Sets 2816A-D can also be obtained as part of generation of a result set in response to a query executed on the collection. In other examples, sets 2816A-D can be generated as a result of processes for measuring distinctiveness as discussed herein. In one setting, sets 2816A-D can be the result of groupings identified based on measurements of distinctiveness of the elements that make up sets 2816A-D (e.g., documents, document attributes, etc.).

Sets 2816A-D can include documents and attributes associated with the documents they describe. In other embodiments, the groupings and/or sets can be more granular, and some sets can include attributes and/or document characteristics without documents within the group. Further, other groups can include terms from queries executed on the collection, complete queries, multiple queries, navigation selections, multiple navigation selections, etc. In yet other embodiments, sets 2816A-D can also include any combination of documents, document attributes, document associations, document relationships, etc.

As discussed, sets 2816A-D can be generated from evaluations of distinctiveness at 2820. The sets can also be analyzed to determine the distinctiveness of the sets relative to each other. For example, the distinctiveness of sets 2816A-D can be analyzed as a whole or against subsets of interesting characteristics within sets 2816A-D. The distinctiveness analysis of sets 2816A-D can be used to partition the elements of the sets (e.g., documents and document attributes) that make up the sets based on the distinctiveness analysis at 2822. The sets 2816A-D can also be determined and/or modified based on the distinctiveness of the sets themselves. In some embodiments, the processes discussed above can be employed by an analysis engine to optimize distinctiveness of the sets with respect to each other, with respect to the collection, with respect to one or more collections, with respect to a set of results, with respect to a baseline set, etc. Such processes can result in the modification of the sets, partitioning of the sets, movement of elements within the sets, as examples.

In some embodiments, an information retrieval system includes an analysis engine configured to determine a distance metric between elements of data in a collection. In some embodiments, the analysis engine can determine a distance metric between sets of elements. The analysis engine can be configured to determine the distance metric based on a calculation of similarity between the sets and/or elements In some embodiments, the analysis engine can be configured to determine the distance metric based on a measurement of distinctiveness. As discussed above, the analysis can also be configured to automatically identify interesting characteristics from any element of data stored in the one or more collections of information 2802 (e.g., by executing any one, part or combination of processes 100-900). The analysis engine can communicate the identified interesting characteristics and a distance metric between the characteristics and/or sets that are associated with the interesting characteristics to the visualization engine, which can generate a navigable display based on the received information. For example, the determined distance metrics 2824A-C (which can be, for example, a measurement of distinctiveness) between sets 2816A-D can be communicated to a visualization engine to process into a graph of nodes and edges. The nodes can be defined based on sets 2816A-D, and connections between the sets drawn as edges connecting the nodes.

The visualization engine can be configured to position the nodes in a graphical display based on the distance metrics calculated for each node. Shown at 2824A is a calculation of a distance metric between A-B, B-C, and C-D. One should appreciate that these measurements are not exclusive and in some examples an analysis engine can generate pair-wise measures of distance against every combination of A-D, further the analysis engine can generate a distance measure from a matrix of the comparisons between sets A-D, and in other examples the analysis engine can generate a distance measure from subsets of the set members of sets A-D. In some embodiments, the distance metric is calculated by an analysis engine based on determination of a measurement of distinctiveness (e.g., as discussed with respect to processes 100-900).

In some embodiments, the nodes to be rendered in the display 2828A-D can be based on members of sets 2816A-D. In other embodiments, the nodes to be rendered 2828A-D can be based on subsets of the elements comprising sets 2816A-D. In yet other embodiments, the nodes to be rendered 2828A-D can be based on attributes of documents or objects within sets 2816A-D.

In some embodiments, the subsets can be selected based on the determination of the distance metric. In one example, elements within sets 2816A-D that contribute to the measure of distinctiveness for the sets can be selected for use by the visualization engine in rendering nodes 2828A-D.

In one embodiment, the visualization engine is configured to render nodes 2828A-D in a graphical display. According to one architecture, the visualization engine positions the nodes within a display boundary based on the distance metric determined by the analysis engine. In another, the visualization engine can be configured to determine the distance metric value.

The visualization engine can be configured to generate the final positions of nodes by applying a spring-force modeling approximation. As discussed, the spring-force modeling approximation is configured to assign initial positions to the nodes to render the nodes 2828A-D within any graphical boundary defined for a display. Each pair of nodes has a connection if one more underlying elements in the sets share the nodes. In one example, the length of the connection between each of the nodes represents their similarity.

In one embodiment, the visualization engine is configured to optimize a visualization of the distance metric employed (e.g., determined distinctiveness) between each connected node in a display. A spring-force model is generated by the visualization engine. The model can be configured to generate a two dimensional representation of the multi-dimensional space established by the connections and the respective lengths of those edges. The length of the edges is initially defined by a distance metric. The distance metric can include a measure of distinctiveness in some examples, and in others can also include other similarity/dissimilarity measures.

Other modeling processes can be employed by the visualization engine to approximate the multi-dimensional space in a two dimensional graph of the nodes. The nodes are placed in some initial layout, which can be based on the values determined by the distance metric, and then the visualization engine determines a minimal energy state from the initial layout base on equations modeling springs that exert a forces on the nodes. The computation of the resulting minimal energy state represents an efficient two dimensional approximation or projection of the multi-dimensional space. One should appreciate that other modeling approaches can be used having greater or lesser computational burden. In some embodiments, the spring-force model is select to increase computational efficiency for generating a two dimensional approximation of multi-dimensional space.

In some embodiments, the visualization engine can be configured to generate an three dimensional view. In one example, the visualization engine generates an isometric view for display on a computer. The isometric view can be configured to be responsive to selection within an interface displayed on a computer.

Figure 28B:
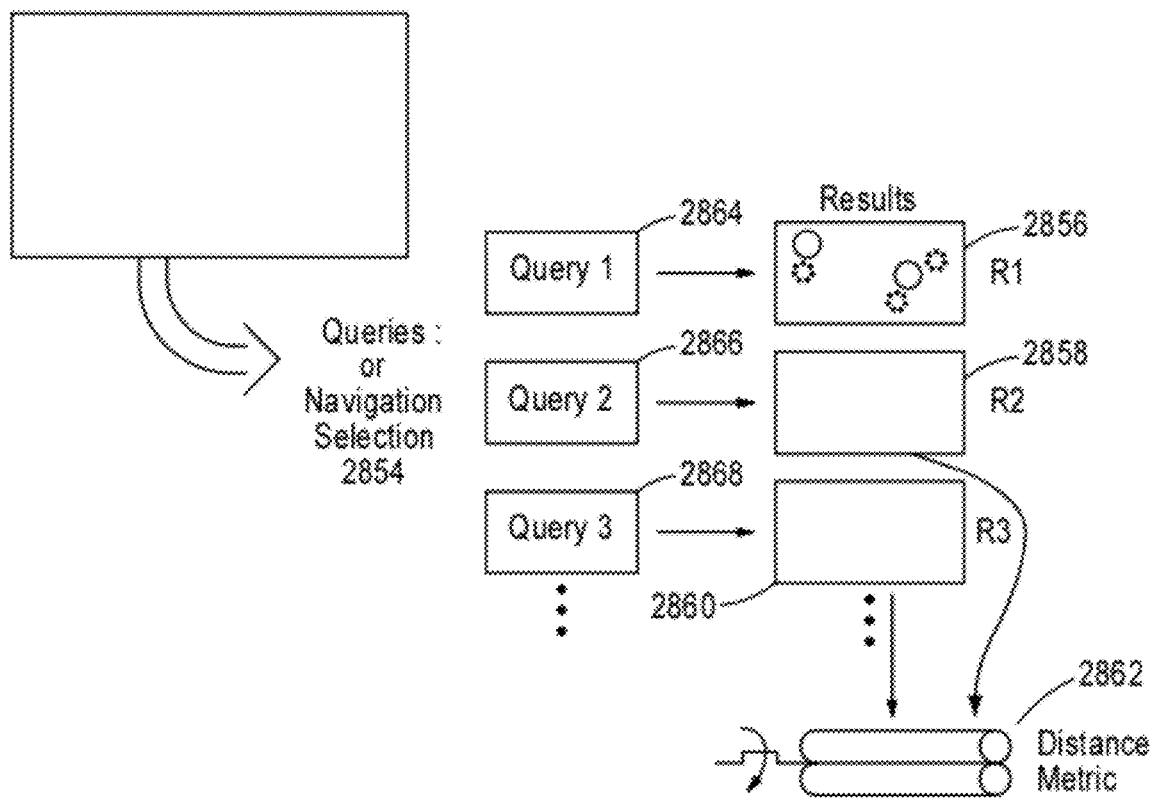
FIG. 28B illustrates an example of a conceptual model of process flow and data interactions according to one embodiment of the present invention.

Shown in FIG. 28B, is another example of a conceptual model of process flow and data interactions that occur in generating a navigable data structure for concept visualization. One or more collections of information 2852 can be accessed through an information retrieval system. The information retrieval system can be configured to execute queries 2864-2868 and/or search operations at 2854 to return results 2856, 2858, and 2860. The results 2856-2860 can be analyzed to generate an attribute space, and the attribute space can be rendered as nodes in graph of concepts. The display distance for each node can be based on a distance metric at 2862 calculated against any member or combination of the set(s) of results, any queries, any navigation selection, and any combination thereof at 2870.

Some example applications include measuring the distance between characteristics of 2858 against 2860, elements within the result sets 2858 against 2860, and/or query 2866 against 2868 at 2872. According to some embodiments, the attribute value space can comprise concepts. Each concept can be associated with one or more elements of the sets of results, query terms used to generate them, and/or navigation selections. The elements returned in the set of results can depend on the organization of the collections of information being accessed and may include, for example, documents, objects, or other units of organization for stored data. Each unit of organization of data can be expressed as a vector of the attributes, characteristics, facets, etc., that are associated with the unit of organization. The vectors can be compared to determine a distance or similarity of sets of document, objects, etc. Other approaches can be also used in other embodiments, including comparisons of multivariate distributions described herein to determine distinctiveness, which can be used as a distance metric.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic. Various embodiments of the invention can include the teachings discussed with respect to other embodiments, and at least some of the examples and the embodiments discussed herein are intended to complement and integrate with each other.

Various systems can take the form of an entirely hardware embodiment, an entirely software embodiment that executes on at least one hardware component, or an embodiment containing both hardware and software elements. One preferred embodiment takes the form of software executing in one or more server machines connected by a network. The invention (or portions thereof) may take the form of a computer program product accessible from a computer-usable or computer-readable medium providing program code for use by or in connection with a computer or any instruction execution system. A computer-usable or computer readable medium can be any device or apparatus that can include, store or communicate the program for use by or in connection with the instruction execution system, apparatus, or device. The medium can be an electronic, magnetic, optical, or the like. Examples of a computer-readable medium include a semi-conductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Figure 25:
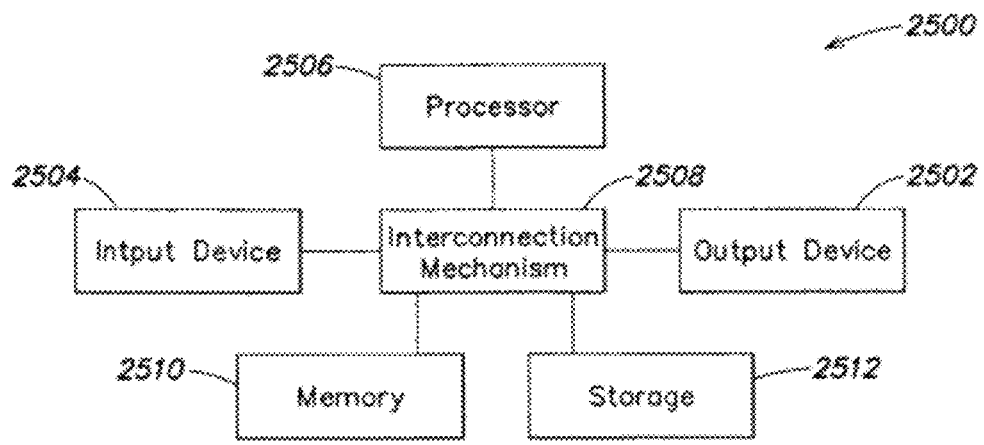
FIG. 25 is a block diagram of a general-purpose computer system upon which various embodiments of the invention may be implemented.

FIG. 25 shows a block diagram of a general purpose computer system 2500 in which various aspects of the present invention may be practiced. A general-purpose computer system according to one embodiment of the invention is configured to perform any of the described functions, including but not limited to determining a statistical distribution of an identifying characteristics within a collection of information and/or a set of documents, storing statistical distribution(s), deriving a measurement of distinctiveness, normalization of the measurement of distinctiveness, generation of comparison set(s), generation of sampled set(s), generating a representation of a set, approximating a statistical distribution within a collection of information and/or a set, sampling, assigning a weight value, employing the weight value in distinctiveness calculations, establishing thresholds, establishing and evaluating a relevance threshold, smoothing statistical distribution (s), determining relative entropy, determining similarity, receiving requests for content of a collection of information, processing request for content of a collection of information, determining a baseline distribution, storing calculations and values determined for determining a measurement of distinctiveness. Additional functions may also include, for example, generation of a descriptor for a group of elements, organizing a database using the descriptor, manipulation of size of evaluated sets, caching data, optimizing cached data, adaptively organizing a database, evaluating a set of results using a measure of distinctiveness, interpreting interaction with a collection of information, generation of candidate sets, guiding navigation, guiding query generation, guiding query interpretation, providing users interesting options from a collection of information, summarizing results returned from interaction with a collection of information, determining correlated elements within a collection of information, modifying views of results returned, clustering similar elements, determining a value for elements of a result set, grouping elements within a collection of information, evaluating the group of elements internally, evaluating the group of elements with respect to other groups, generation of partitions, generating absolute measurements of distinctiveness, creating rule (s), modifying a set of results based on the rule, storing criteria for a rule, generating another set, defining an action to take associated with a rule, tracking a state variable, and modification of the state variable, etc., and the invention is not limited to having any particular function or set of functions.

Further additional functions can also include, for example, generation of sets of results, execution of navigation operations, defining an attribute space, analysis of members of the attribute space, determining similarity of concepts based on document sets associated with the concepts, executing an analysis engine, executing a visualization engine, executing a user interface engine, and performing the operations discussed for each.

Figure 27:
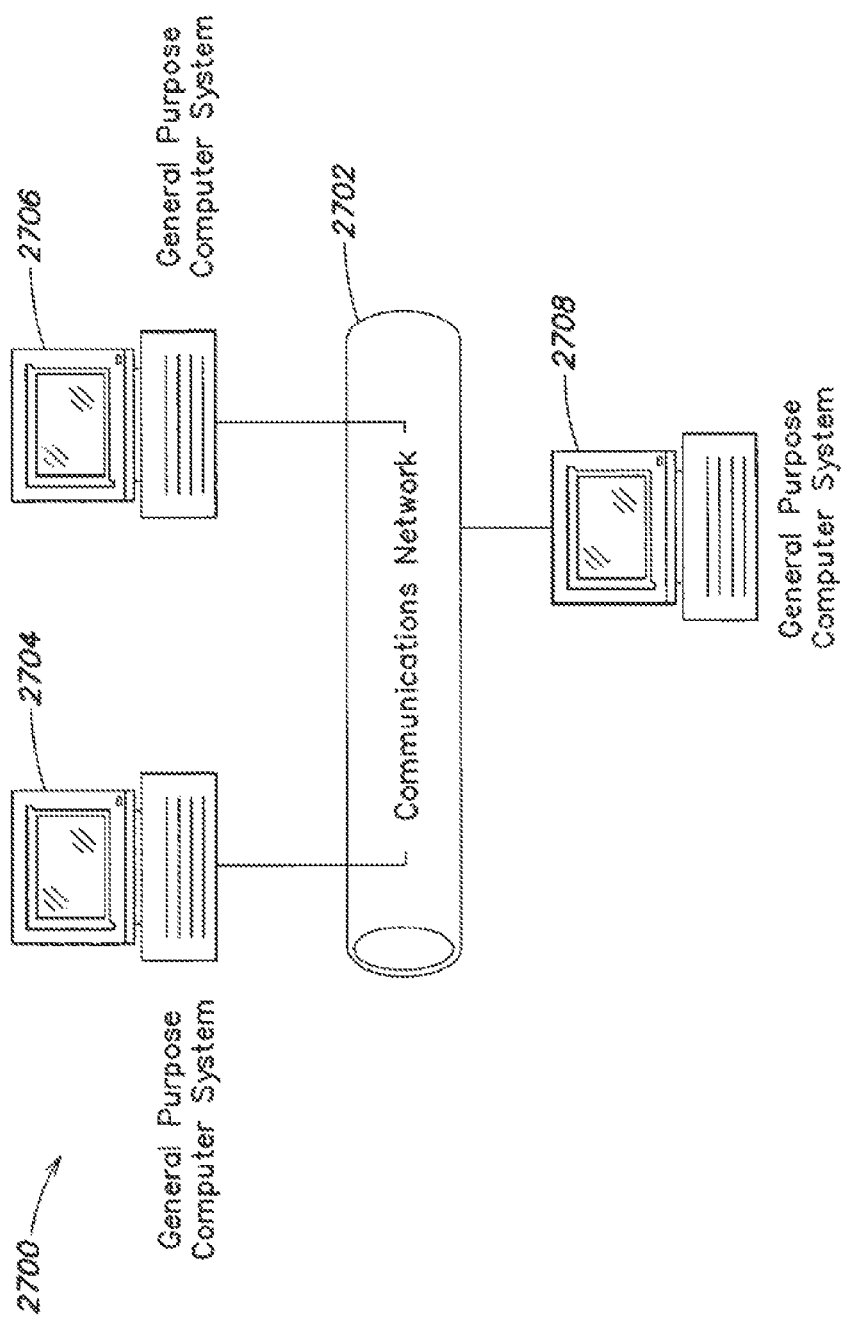
FIG. 27 is a block diagram of a system for generating a measurement of distinctiveness upon which various embodiments of the invention may be implemented.

For example, various aspects of the invention may be implemented as specialized software executing in one or more computer systems including general-purpose computer systems 2704, 2706, and 2708 communicating over network 2702 shown in FIG. 27. Computer system 2500 may include a processor 2506 connected to one or more memory devices 2510, such as a disk drive, memory, or other device for storing data. Memory 2510 is typically used for storing programs and data during operation of the computer system 2500. Components of computer system 2500 may be coupled by an interconnection mechanism 2508, which may include one or more busses (e.g., between components that are integrated within a same machine) and/or a network (e.g., between components that reside on separate discrete machines). The interconnection mechanism enables communications (e.g., data, instructions) to be exchanged between system components of system 2500.

Computer system 2500 may also include one or more input/output (I/O) devices 2504-2506, for example, a keyboard, mouse, trackball, microphone, touch screen, a printing device, display screen, speaker, etc. Storage 2512, typically includes a computer readable and writeable nonvolatile recording medium in which signals are stored that define a program to be executed by the processor or information stored on or in the medium to be processed by the program.

Figure 26:
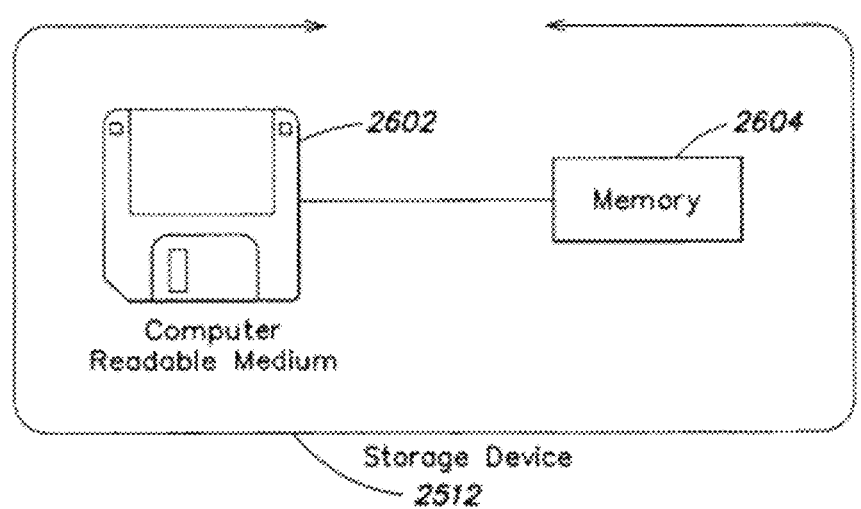
FIG. 26 is a block diagram of a computer data storage system with which various embodiments of the invention may be practiced.

Processes and methods associated with various embodiments, acts thereof and various embodiments and variations of these methods and acts, individually or in combination, may be defined by computer-readable instructions tangibly embodied on a computer-readable medium, 2602, FIG. 26, for example, a non-volatile recording medium, an integrated circuit memory element, or a combination thereof. Such signals may define instructions, for example, as part of one or more programs that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium, 2602, may be transportable such that the instructions stored thereon in memory 2604, can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

As disclosed, one embodiment visualizes/graphs the space of record attributes (or "tags"), as opposed to the space of the records themselves. In contrast with known systems that graph data properties by mapping those properties to a pre-existing structure, such as an ontology, embodiments do not require a pre-existing structure. Instead, the distances between the properties are determined from their distribution across the records. Therefore, embodiments can generate map distances between not just homogenous properties, but also heterogeneous properties without requiring predefined conversion metrics.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer implemented method for visualizing concepts within a collection of information, the method comprising:
    analyzing, by a computer system, a set of materials from at least one collection of information;
    defining, by the computer system, an attribute space associated with the set of materials;
    determining automatically, by the computer system, similarity of members of the attribute space, by determining a measurement of the distinctiveness for the members of the attribute space based on a statistical distribution of at least one identifying characteristic within the respective sets of materials associated with respective members of the attribute space;

normalizing, by the computer system, the measurement of distinctiveness by determining an amount by which the measurement of distinctiveness exceeds a mean score for one or more sets of materials of a similar or identical size; and generating, by the computer system, a graphical model of the members of the attribute space, wherein generating the graphical model includes generating a display of the members of the attribute space, each of the members having a respective display distance from other respective members of the attribute space reflective of the determined similarity.

2. The method according to claim 1, further comprising transitioning from a first set of materials from the at least one collection of information to a second set of materials from the at least one collection of information.

3. The method according to claim 2, further comprising defining a second attribute space associated with the second set of materials, and generating a second graphical model of the members of the second attribute space based on similarity of members of the second attribute space.

4. The method according to claim 3, further comprising generating instructions configured to animate a transition from the graphical model to the second graphical model in a user interface.

5. The method according to claim 1, wherein the determining the similarity of the members of the attribute space comprises determining the similarity between members of the attribute space based on a determination of the similarity of a first set of materials associated with a first set member of the attribute space and at least one additional set of materials associated with a respective at least one additional member of the attribute space.

6. The method according to claim 1, wherein the measuring distinctiveness based on the statistical distribution of the at least one identifying characteristic comprises determining the statistical distribution of the at least one identifying characteristic within a respective set of materials against a statistical distribution of the at least one identifying characteristic of another set.

7. The method according to claim 1, further comprising generating a graph of nodes and edges, wherein the nodes are associated with members of the attribute space, and the edges represent connections between nodes.

8. The method according to claim 7, further comprising identifying connections between a pair of nodes in response to one or more members of the set of materials having the pair of nodes as attributes.

9. The method according to claim 7, further comprising generating a two dimensional representation of the graph of nodes and edges.

10. The method according to claim 1, wherein the at least one collection of information comprises objects described by facets, and wherein each facet describes or characterizes the object to which it is associated; and the method further comprises determining the set of materials in response to at least one of navigation selections and queries executed against the at least one collection of information.

11. The method according to claim 1, further comprising:
accepting from a host computer selection of the members within a user interface display on the host computer of the members of the attribute space; and
modifying the graphical model responsive to the selection of the members.

12. The method according to claim 11, wherein modifying the graphical model responsive to the selection of the members comprises generating a second graphical model having nodes for each member of the attribute space, wherein the display distance between each node is based on the similarity between a selected node and the members of the attribute space.

13. A non-transitory computer-readable medium having instructions stored thereon that, when executed by a processor, cause the processor to visualize concepts within a collection of information, the visualize concepts comprising:
analyzing a set of materials from at least one collection of information;
defining an attribute space associated with the set of materials;
determining automatically similarity of members of the attribute space, by determining a measurement of the distinctiveness for the members of the attribute space based on a statistical distribution of at least one identifying characteristic within the respective sets of materials associated with respective members of the attribute space;
normalizing the measurement of distinctiveness by determining an amount by which the measurement of distinctiveness exceeds a mean score for one or more sets of materials of a similar or identical size; and
generating a graphical model of the members of the attribute space, wherein generating the graphical model includes generating a display of the members of the attribute space, each of the members having a respective display distance from other respective members of the attribute space reflective of the determined similarity.

14. A system for visualizing concepts within a collection of information, the system comprising:
at least one processor operatively connected to a memory, the processor when executing is configured to provide:
an analysis engine configured to analyze a set of materials from at least one collection of information, wherein the analysis engine is further configured to:
define an attribute space associated with the set of materials;
determine automatically similarity of members of the attribute space, by determining a measurement of the distinctiveness for the members of the attribute space based on a statistical distribution of at least one identifying characteristic within the respective sets of materials associated with respective members of the attribute space;
normalize the measurement of distinctiveness by determining an amount by which the measurement of distinctiveness exceeds a mean score for one or more sets of materials of a similar or identical size; and
a visualization engine configured to generate a graphical model of the members of the attribute space, wherein the visualization engine is further configured to generate a display of the members of the attribute space, each of the members having a respective display distance from other respective members of the attribute space based on the determined similarity.

15. The system according to claim 14, wherein the analysis engine is further configured to determine the similarity between members of the attribute space based on a determination of the similarity of a first set of materials associated with a first set member of the attribute space and at least one additional set of materials associated with a respective at least one additional member of the attribute space.

16. The system according to claim 14, wherein the analysis engine is further configured to determine the statistical distribution of the at least one identifying characteristic within a respective set of materials against a statistical distribution of the at least one identifying characteristic within another set.

17. The system according to claim 14, wherein the visualization engine is further configured to generate a graph of nodes and edges, wherein the nodes are associated with members of the attribute space, and edges represent connections between nodes.

18. The system according to claim 14, wherein the at least one collection of information includes objects described by facets, and wherein each facet describes or characterizes the object with which it is associated; and the processor when executing is further configured to provide a user interface engine configured to respond to at least one of navigation selections and queries received from host computer systems, and wherein the analysis engine determine the set of materials in response by executing the navigation selections and queries against the at least one collection of information.

* * * * *